US007822667B1

(12) United States Patent
Smith, III et al.

(10) Patent No.: US 7,822,667 B1
(45) Date of Patent: Oct. 26, 2010

(54) DISTRIBUTION OF CASH DEPOSITS AND WITHDRAWALS IN MULTI-STYLE MANAGED CLIENT INVESTMENT ACCOUNTS

(75) Inventors: Charles Raymond Smith, III, Hoboken, NJ (US); Michael John Everett, Fair Haven, NJ (US); Danette Kay Ponce, Chicago, IL (US); Lavinia Shao-Hui Zyvith, Belle Mead, NJ (US); Reo A. Gonzales, Jersey City, NJ (US); Heidi Renee Derstine, Chicago, IL (US); Mirjana Ristovic, Ridgefield, NJ (US)

(73) Assignee: CheckFree Corporation, Norcross, GA (US)

( * ) Notice: Subject to any disclaimer, the term of this patent is extended or adjusted under 35 U.S.C. 154(b) by 1472 days.

(21) Appl. No.: 10/372,709

(22) Filed: Feb. 25, 2003

(51) Int. Cl.
 *G06Q 40/00* (2006.01)
(52) U.S. Cl. ...................... 705/36 R; 705/35
(58) Field of Classification Search ............... None
 See application file for complete search history.

(56) References Cited

U.S. PATENT DOCUMENTS

| | | | |
|---|---|---|---|
| 4,346,442 | A | 8/1982 | Musmanno |
| 5,132,899 | A | 7/1992 | Fox |
| 5,193,056 | A | 3/1993 | Boes |
| 5,604,849 | A | 2/1997 | Artwick et al. |
| 5,774,881 | A | 6/1998 | Friend et al. |
| 5,784,696 | A | 7/1998 | Melnikoff |
| 5,806,047 | A | 9/1998 | Hackel et al. |
| 5,812,987 | A * | 9/1998 | Luskin et al. ............. 705/36 R |
| 5,819,238 | A * | 10/1998 | Fernholz .................. 705/36 R |
| 5,978,778 | A | 11/1999 | O'Shaughnessy |
| 5,999,918 | A | 12/1999 | Williams et al. |
| 6,021,397 | A | 2/2000 | Jones et al. |
| 6,029,148 | A | 2/2000 | Zurstrassen |

(Continued)

OTHER PUBLICATIONS

Business Wire, Citigroup Asset Management and Manulife Financial Bring Wider Choice to Multi-Style Managed Accounts, New York, Sep. 18, 2002, pp. 1-3.*

(Continued)

*Primary Examiner*—Alexander Kalinowski
*Assistant Examiner*—Gregory Johnson
(74) *Attorney, Agent, or Firm*—Sutherland Asbill & Brennan LLP

(57) ABSTRACT

An investment account is managed having associated assets, including shares of different securities, transacted in accordance with a plurality of different investment styles. A cash deposit into such a multi-style investment account and a request for a cash withdrawal from the multi-style investment account are handled differently but efficiently across the different investment styles in the investment account. When cash is deposited into the investment account, the cash deposit is placed into a temporary "cash bucket" in the investment account common across different investment styles. The cash is then distributed individual "cash buckets" each associated with an investment style in the investment account in accordance with a selected cash deposit allocation. When cash is to be withdrawn from the investment account, the cash amounting to the requested amount from individual "cash buckets" each associated with an investment style in the investment account is withdrawn in accordance with a selected cash withdrawal allocation. As a result, the cash can be deposited into the investment account or withdrawn from the investment account with proper allocation across different investment styles.

20 Claims, 60 Drawing Sheets

U.S. PATENT DOCUMENTS

| | | | |
|---|---|---|---|
| 6,154,732 | A | 11/2000 | Tarbox |
| 6,161,098 | A | 12/2000 | Wallman |
| 6,275,814 | B1 | 8/2001 | Giansante et al. |
| 6,282,520 | B1 | 8/2001 | Schirripa |
| 6,317,726 | B1 | 11/2001 | O'Shaughnessy |
| 6,338,047 | B1 | 1/2002 | Wallman |
| 6,484,152 | B1 | 11/2002 | Robinson |
| 6,513,019 | B2 | 1/2003 | Lewis |
| 6,516,303 | B1 | 2/2003 | Wallman |
| 6,601,044 | B1 | 7/2003 | Wallman |
| 6,928,418 | B2 | 8/2005 | Michaud et al. |
| 7,117,175 | B2 | 10/2006 | Arnott |
| 7,147,313 | B2 | 12/2006 | Godil et al. |
| 7,149,713 | B2 | 12/2006 | Bove et al. |
| 7,174,313 | B1 | 2/2007 | Martinez |
| 7,249,080 | B1 | 7/2007 | Hoffman |
| 7,373,324 | B1 | 5/2008 | Engin et al. |
| 7,472,084 | B2 | 12/2008 | Damschroder |
| 7,596,523 | B2 | 9/2009 | Sobel et al. |
| 7,634,384 | B2 | 12/2009 | Eryurek et al. |
| 2001/0042037 | A1 | 11/2001 | Kam et al. |
| 2002/0035527 | A1 | 3/2002 | Corrin |
| 2002/0038271 | A1 | 3/2002 | Friend et al. |
| 2002/0038273 | A1 | 3/2002 | Wherry et al. |
| 2002/0059127 | A1 | 5/2002 | Brown et al. |
| 2002/0091605 | A1 | 7/2002 | Labe et al. |
| 2002/0095364 | A1 | 7/2002 | Russell et al. |
| 2002/0107735 | A1 | 8/2002 | Henkin et al. |
| 2002/0107770 | A1 | 8/2002 | Meyer et al. |
| 2002/0111891 | A1* | 8/2002 | Hoffman et al. ............. 705/36 |
| 2002/0120541 | A1 | 8/2002 | D'Ambrosio et al. |
| 2002/0138299 | A1 | 9/2002 | Nations |
| 2002/0138381 | A1* | 9/2002 | Tomecek .................... 705/36 |
| 2002/0138383 | A1 | 9/2002 | Rhee |
| 2002/0152150 | A1 | 10/2002 | Cooper et al. |
| 2002/0152151 | A1 | 10/2002 | Baughman et al. |
| 2002/0174045 | A1* | 11/2002 | Arena et al. ................ 705/36 |
| 2002/0174047 | A1 | 11/2002 | Fernholz |
| 2003/0004851 | A2 | 1/2003 | Kiron et al. |
| 2003/0009400 | A2 | 1/2003 | Kiron et al. |
| 2003/0009404 | A2 | 1/2003 | Kiron et al. |
| 2003/0050877 | A1 | 3/2003 | Blasnik et al. |
| 2003/0078867 | A1 | 4/2003 | Scott et al. |
| 2003/0093352 | A1 | 5/2003 | Muralidhar et al. |
| 2003/0093353 | A1 | 5/2003 | Ward et al. |
| 2003/0105697 | A1 | 6/2003 | Griffin et al. |
| 2003/0110113 | A1 | 6/2003 | Martin |
| 2003/0120575 | A1 | 6/2003 | Wallman |
| 2003/0191703 | A1 | 10/2003 | Chen et al. |
| 2003/0220870 | A1 | 11/2003 | Bayrooti et al. |
| 2003/0225662 | A1 | 12/2003 | Horan et al. |
| 2003/0225663 | A1* | 12/2003 | Horan et al. ................. 705/36 |
| 2004/0002910 | A1* | 1/2004 | Mizukami .................... 705/36 |
| 2004/0054610 | A1 | 3/2004 | Amstutz et al. |
| 2004/0177020 | A1 | 9/2004 | Alderman et al. |
| 2004/0186738 | A1 | 9/2004 | Reisman |
| 2006/0248016 | A1 | 11/2006 | Ginter et al. |

OTHER PUBLICATIONS

The Vanguard Group, IRA Adoption Agreement, Nov. 1999, p. 1-4.*
David M. Stein, "Overlay Portfolio Management in a Multi-Manager Account", Senior Consultant, vol. 5, No. 6, Nov./Dec. 2002, pp. 1-8.*
The University of Tennessee, Benefit & Retirement, 403(b) Company Forms via http://humanresources.tennessee.edu/benefits/docs/Forms/Deferred/403b/403b_company_forms.html.*
Fidelity_403b_Distribution.pdf via http://humanresources.tennessee.edu/benefits/docs/Forms/Deferred/403b/Fidelity%20403b%20distribution.pdf.*
TIAA_403b_Enrollment.pdf via http://humanresources.tennessee.edu/benefits/docs/Forms/Deferred/403b/TIAA403b.pdf.*
PR Newswire: Placemark Introduces Overlay Management Services, Dec. 23, 2003, pp. 1 and 2.
CheckFree Investment Services, Press Release, Dec. 21, 2003, pp. 1-3.
FPA Journal—The Multiple-Equity Fund Portfolio Investment Strategy, Part 1, Dec. 21, 2003, pp. 1-13.
Stein, et al., Parametric Portfolio Associates, Research Brief, Overlay Portfolio Management in a Multi-Manager Account, pp. 1-17.
M. Schott, The Tower Group, Inc. 2003, Chasing CheckFree: Portfolio Management Systems for Multidiscipline Accounts, Jul. 2003, pp. 2-16.
Luxenberg, Stan. "The Mutual Fund Killer?" Registered Rep, Sep. 2002, vol. 26, issue 9, pp. 64-66 (2 pages).
Winks, Stephen C. "Overlay Management: The Whole Product Solution?" Senior Consultant, Nov./Dec. 2002, vol. 5, No. 6.
Non-Final Office Action mailed Dec. 10, 2007 for related U.S. Appl. No. 10/372,647, filed Feb. 25, 2003.
Non-Final Office Action mailed Dec. 11, 2007 for related U.S. Appl. No. 10/372,708, filed Feb. 25, 2003.
Final Office Action mailed Dec. 12, 2007 for related U.S. Appl. No. 10/372,706, filed Feb. 25, 2003.
Non-Final Office Action mailed Jan. 4, 2008 for related U.S. Appl. No. 10/372,705, filed Feb. 25, 2003.
Final Office Action mailed Feb. 13, 2008 for related U.S. Appl. No. 10/372,715, filed Feb. 25, 2003.
Final Office Action mailed Feb. 21, 2008 for related U.S. Appl. No. 10/372,724, filed Feb. 25, 2003.
Final Office Action mailed Mar. 17, 2008 for related U.S. Appl. No. 10/372,650, filed Feb. 25, 2003.
Non-Final Office Action mailed Mar. 17, 2008 for related U.S. Appl. No. 10/372,707, filed Feb. 25, 2003.
Final Office Action mailed Mar. 19, 2008 for related U.S. Appl. No. 10/372,673, filed Feb. 25, 2003.
Final Office Action mailed Apr. 15, 2008 for related U.S. Appl. No. 10/757,728, filed Jan. 15, 2004.
Non-Final Office Action mailed May 29, 2008 for related U.S. Appl. No. 10/372,706, filed Feb. 25, 2003.
Non-Final Office Action mailed Jun. 25, 2008 for related U.S. Appl. No. 10/757,709, filed Jan. 15, 2004.
Non-Final Office Action mailed Jun. 25, 2008 for related U.S. Appl. No. 10/372,651, filed Feb. 25, 2003.
Final Office Action mailed Jul. 24, 2008 for related U.S. Appl. No. 10/757,726, filed Jan. 15, 2004.
Non-Final Office Action mailed Jul. 31, 2008 for related U.S. Appl. No. 10/372,715, filed Feb. 25, 2003.
Final Office Action mailed Aug. 5, 2008 for related U.S. Appl. No. 10/989,608, filed Nov. 17, 2004.
Final Office Action mailed Aug. 5, 2008 for related U.S. Appl. No. 10/757,548, filed Jan. 15, 2004.
Final Office Action mailed Aug. 14, 2008 for related U.S. Appl. No. 10/372,705, filed Feb. 25, 2003.
Non-Final Office Action mailed Sep. 17, 2008 for related U.S. Appl. No. 10/757,728, filed Jan. 15, 2004.
Final Office Action mailed Dec. 1, 2008 for related U.S. Appl. No. 10/757,709, filed Jan. 15, 2004.
Final Office Action mailed Dec. 10, 2008 for related U.S. Appl. No. 10/372,706, filed Feb. 25, 2003.
Final Office Action mailed Dec. 22, 2008 for related U.S. Appl. No. 10/372,651, filed Feb. 25, 2003.
Final Office Action mailed Jan. 22, 2009 for related U.S. Appl. No. 10/372,715, filed Feb. 25, 2003.
Non-Final Office Action mailed Jan. 22, 2009 for related U.S. Appl. No. 10/757,548, filed Jan. 15, 2004.
Non-Final Office Action mailed Jan. 22, 2009 for related U.S. Appl. No. 10/757,726, filed Jan. 15, 2004.
Non-Final Office Action mailed Jan. 23, 2009 for related U.S. Appl. No. 10/372,647, filed Feb. 25, 2003.
Final Office Action mailed Feb. 5, 2009 for related U.S. Appl. No. 10/372,705, filed Feb. 25, 2003.
Final Office Action mailed Apr. 14, 2009 for related U.S. Appl. No. 10/757,728, filed Jan. 15, 2004.
Non-Final Office Action mailed May 29, 2009 for related U.S. Appl. No. 10/372,706, filed Feb. 25, 2003.

Non-Final Office Action mailed Jul. 22, 2009 for related U.S. Appl. No. 10/372,715, filed Feb. 25, 2003.

Non-Final Office Action mailed Jul. 22, 2009 for related U.S. Appl. No. 10/372,649, filed Feb. 25, 2003.

Non-Final Office Action mailed Jul. 24, 2009 for related U.S. Appl. No. 10/372,647, filed Feb. 25, 2003.

Final Office Action mailed Jul. 28, 2009 for related U.S. Appl. No. 10/757,726, filed Jan. 15, 2004.

Final Office Action mailed Sep. 3, 2009 for related U.S. Appl. No. 10/372,705, filed Feb. 25, 2003.

"Implementing a Successful Currency Overlay System." Pensions Week, Sep. 17, 2001, pp. 1-4.

"Investment Styles—Avoid the Pitfalls of Style Investing." Pensions Management, Jun. 1, 2002, pp. 1-3.

Agache, Kristof. "The European Equity Investment Process, Statistical Data Included." Journal of Investing, Dec. 22, 2001, vol. 10, No. 4, pp. 1-10.

Definition of "dividend"—<www.investopedia.com>.

Definition of "record date"—<www.investopedia.com>.

Disclosure under 37 C.F.R. §1.56.

Stein, David M. "Overlay Portfolio Management in a Multi-Manager Account." Senior Consultant, Nov./Dec. 2002, vol. 5, No. 6, pp. 1-8.

Thornthwaite, Warren. "Brace for Incoming." Intelligent Enterprise San Mateo, Aug. 31, 2001, p. 24, vol. 4, issue 13.

"Morgan Keegan Launches New Diversified Portfolio Program"—Business editors. Business Wire, Jan. 27, 2003, p. 1, New York.

Anti, et al. "As Easy as ASP." Euromoney, Feb. 2001, p. 160, Issue 382, London.

Blake, Rich. "Opt In." Institutional Investor, Sep. 2002, p. 183, vol. 36, Issue 9, New York.

Willens. "After the Market's Slide, Avoiding the Wash Sale Rule Becomes Job One for Investors." Journal of Taxation, Dec. 2002, p. 325 (7 pgs.), vol. 97, Issue 6, New York.

Ziv. "How to Use Hedge Funds." Trusts and Estates, Feb. 2001, p. 22 (6 pgs.), vol. 140, Issue 2, Atlanta.

Downes, et al. "Dictionary of Financial and Investment Terms, Fifth Edition." Barron's Educational Series, Inc., 1998.

Hamilton, Walter. "Wall Street, California; Street Strategies; Stock-Mutual Fund Hybrid Attracting Traders, Investors. [Home Edition]" Los Angeles Times, Jun. 6, 2000, p. 1, Los Angeles, California.

Jorion, Philippe. "Mean/Variance Analysis of Currency Overlays." Financial Analysts Journal, May/Jun. 1994, p. 48 (9 pgs), vol. 50, Issue 3, Charlottesville.

Lauricella. "Making Rebalancing Automatic—Firms Now Offer an Option Many Investors Find Hard to Carry Out on Their Own." Wall Street Journal (European ed.), Feb. 17, 2003, p. M4, Brussels.

Pressman. "Swaps: Student Loan Issuers' Answer to Fiscal Mismatch." Bond Buyer, Nov. 2, 1993, p. 3A, vol. 306, Issue 29271, New York.

"Manulife Financial Enters the Managed Account Business with Manulife Private Account." Business Wire, Sep. 18, 2002, 4 pgs.

"Total Return: An Overlooked Style: As the World Integrates, Real Opportuntiy to Diversify is Through Style." 2002 Global Investment Conference, Sep. 2002, 2 pgs.

Notice of Allowance mailed Jan. 17, 2010 for related U.S. Appl. No. 10/372,705, filed Feb. 25, 2003.

Final Office Action mailed Feb. 18, 2010 for related U.S. Appl. No. 10/372,649, filed Feb. 25, 2003.

Notice of Allowance mailed May 27, 2010 for related U.S. Appl. No. 10/372,647, filed Feb. 25, 2003.

* cited by examiner

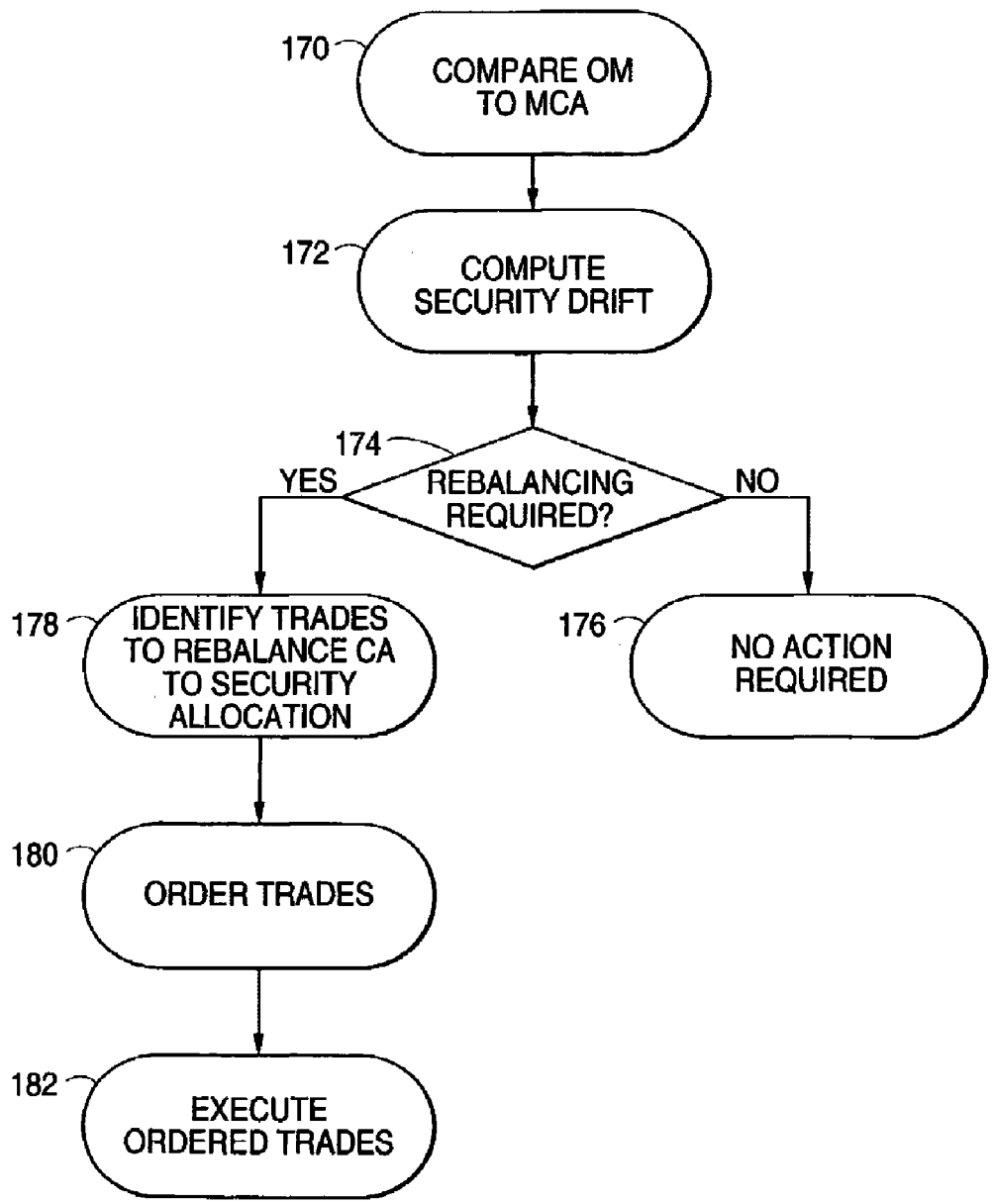

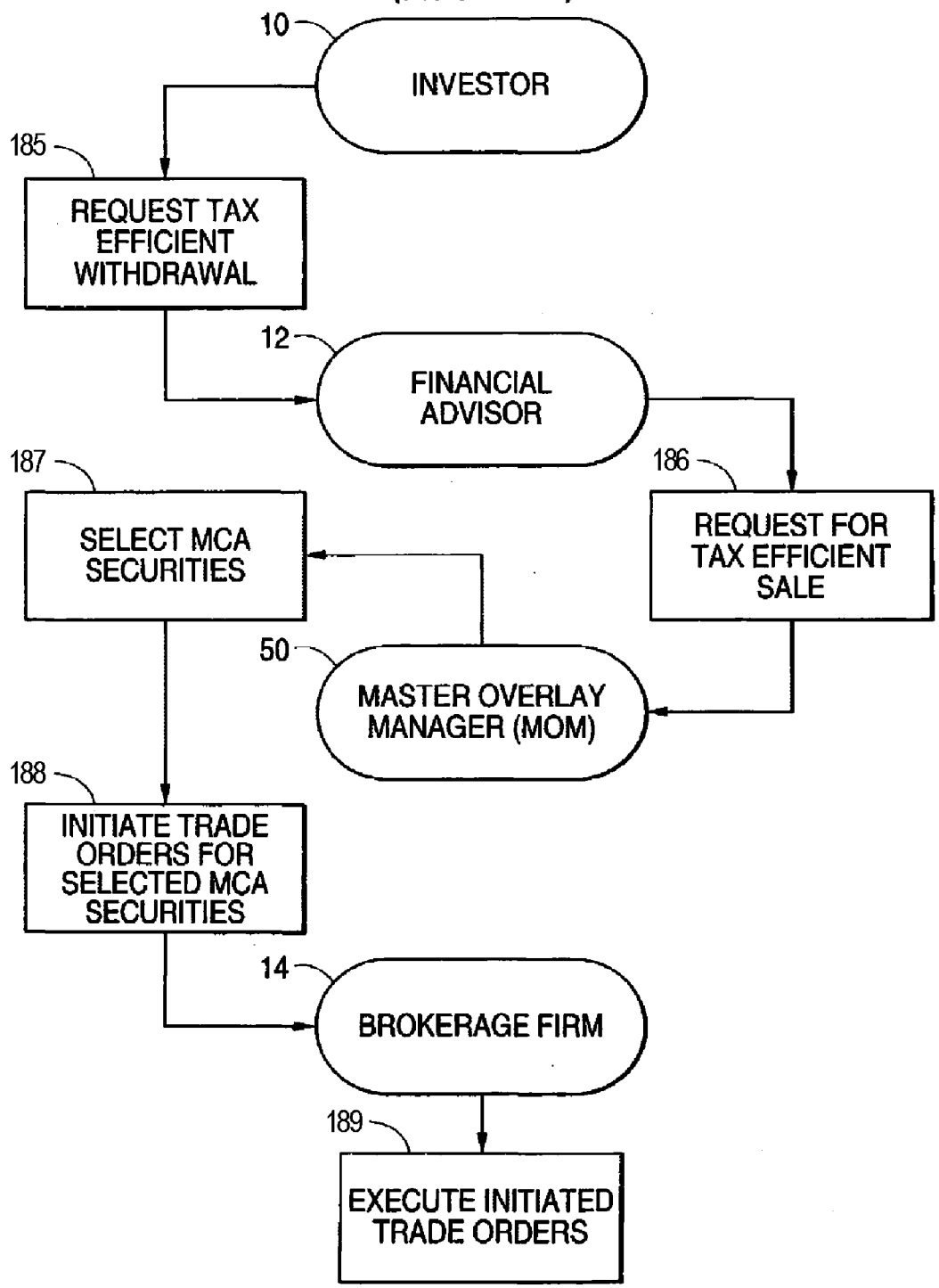

FIG. 9
(PRIOR ART)

| OVERLAY MODEL (OM) | | | |
|---|---|---|---|
| STYLE #1 | STYLE #2 | STYLE #3 | STYLE #4 |
| IBM$^1$ (5%)  CKFR$^1$ (4%) | KO$^2$ (8%)  PFE$^2$ (3%) | C$^3$ (1%)  F$^3$ (6%) | T$^4$ (2%)  GM$^4$ (3%) |
| ⋮  ⋮ | ⋮  ⋮ | ⋮  ⋮ | ⋮  ⋮ |

FIG. 9A
(PRIOR ART)

| MASTER CLIENT ACCOUNT (MCA) | | | |
|---|---|---|---|
| SECURITY IDENTIFIER | # OF SHARES | TAX LOT # | PURCHASE DATE |
| IBM | 100 | KTFC | 1/3/85 |
| CKFR | 200 | CHFP | 1/5/2003 |
| KO | 50 | HUFV | 11/9/2002 |
| PFE | 50 | THSS | 3/12/2002 |
| C | 100 | XAYC | 10/5/2002 |
| F | 300 | ZKXB | 2/12/2003 |
| T | 75 | ACGH | 8/7/2002 |
| G | 25 | FVOM | 4/30/2002 |
| ⋮ | ⋮ | ⋮ | ⋮ |
| CASH | $10,000 | | |

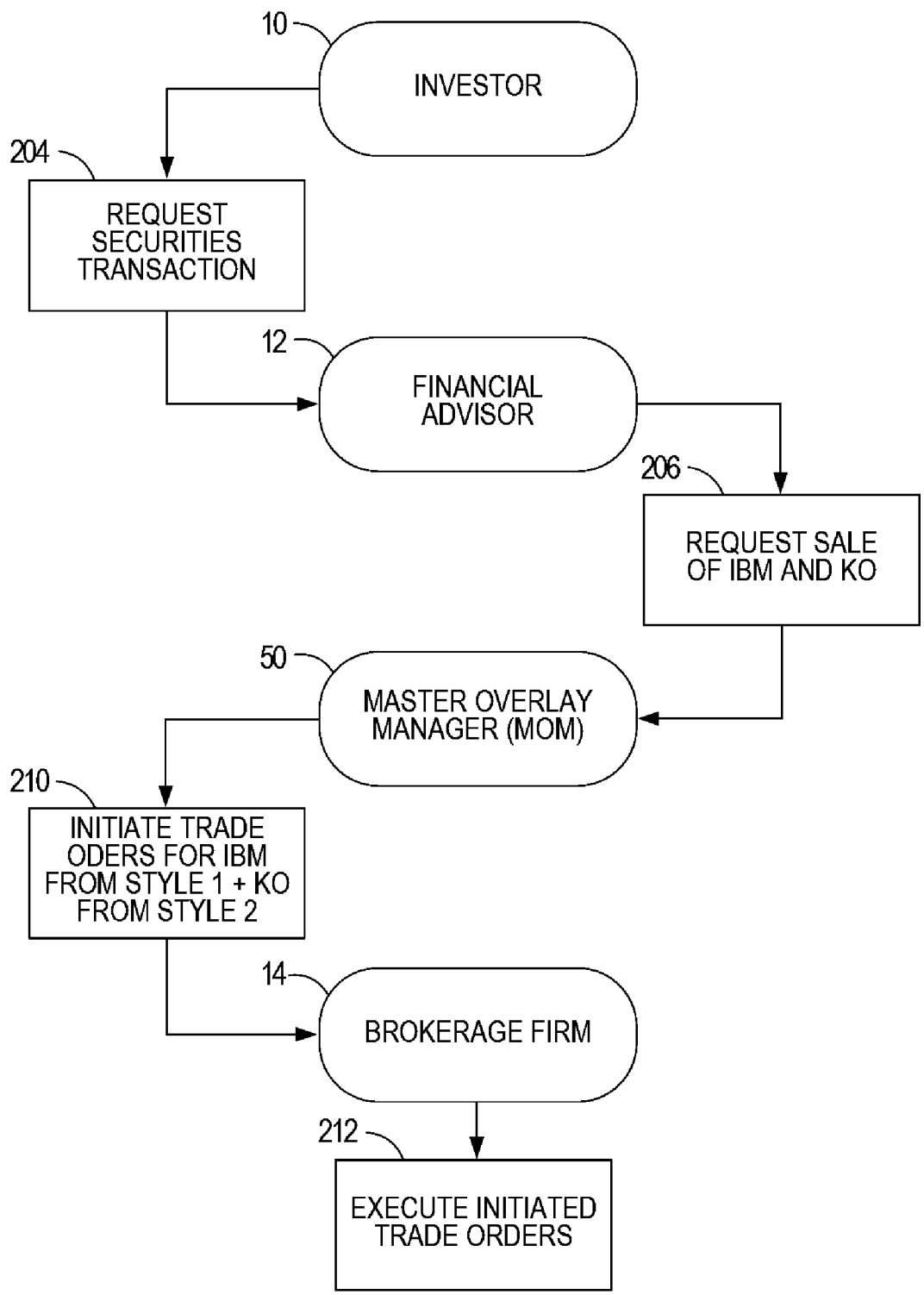

FIG. 15A

CHECKFREE INVESTMENT SERVICES

CSMSTR-     CS NEW MASTER MODEL

| SUBMOD CODE | SUBMODEL DESCRIPTION | % | % CASH |
|---|---|---|---|
| ---- | ---- | ---- | ---- |
| AAAVAL | VALUE SUB MODEL | 40.0 | 40.000 |
| MSPCS1 | CCCGRO SUBMODEL | 40.0 | 40.000 |
| BBBSM | SMALL CAP SUBMODEL | 20.0 | 20.000 |

FIG. 15B

CHECKFREE INVESTMENT SERVICES

PRODUCT: CSMSTR - CS NEW MASTER MODEL
EDIT CORRESPONDING SUB-MODELS TO CHANGE SECURITY ALLOCATION

| SECURITY | % | DATE OUT | RELATED SECURITY | ACTION | ACTION DATE | SUB MODEL |
|---|---|---|---|---|---|---|
| DELL | 6.000 | 0 | | | 0 | AAAVAL |
| HPQ | 4.000 | 0 | | | 0 | AAAVAL |
| JNJ | 12.000 | 0 | | | 0 | AAAVAL |
| MMM | 4.000 | 0 | | | 0 | AAAVAL |
| MSFT | 4.000 | 0 | | | 0 | AAAVAL |
| XOM | 10.000 | 0 | | | 0 | AAAVAL |
| AXP | 3.000 | 0 | | | 0 | BBBSM |
| CASH-1 | 2.000 | 0 | | | 0 | BBBSM |
| CAT | 2.000 | 0 | | | 0 | BBBSM |
| CSC | 4.000 | 0 | | | 0 | BBBSM |
| IBM | 5.000 | 0 | | | 0 | BBBSM |
| ORCL | 1.000 | 0 | | | 0 | BBBSM |
| TSA | 3.000 | 0 | | | 0 | BBBSM |
| AIG | 1.200 | 0 | | | 0 | CCCGRO |
| CASH-1 | 2.000 | 0 | | | 0 | CCCGRO |
| DELL | 6.800 | 0 | | | 0 | CCCGRO |
| DIS | 4.000 | 0 | | | 0 | CCCGRO |
| KO | 8.000 | 0 | | | 0 | CCCGRO |
| MSFT | 6.000 | 0 | | | 0 | CCCGRO |
| PG | 4.000 | 0 | | | 0 | CCCGRO |
| SEBL | 4.000 | 0 | | | 0 | CCCGRO |
| WB | 4.000 | 0 | | | 0 | CCCGRO |

FIG. 15C

FREE INVESTMENT SERVICES

NAME:   MSPCS1 - CCC GROW

| ITY | % | DATE OUT | RELATED SECURITY | ACTION | ACTION DATE |
|---|---|---|---|---|---|
| 1 | 3.000 | 0 | | | 0 |
|  | 5.000 | 0 | | | 0 |
|  | 17.000 | 0 | | | 0 |
|  | 10.000 | 0 | | | 0 |
|  | 20.000 | 0 | | | 0 |
|  | 15.000 | 0 | | | 0 |
|  | 10.000 | 0 | | | 0 |
|  | 10.000 | 0 | | | 0 |
|  | 10.000 | 0 | | | 0 |

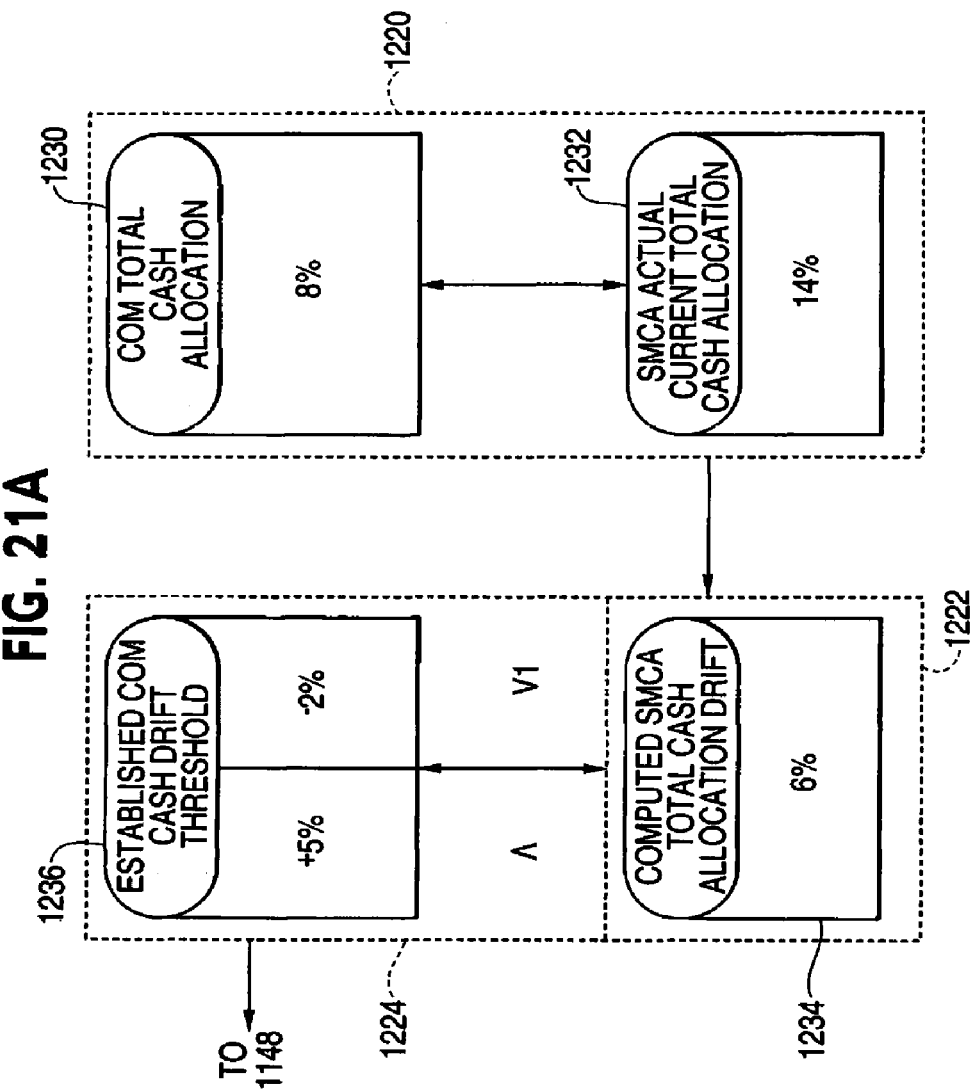

FIG. 23

| COMPILED OVERLAY MODEL (COM) | | | | |
|---|---|---|---|---|
| STYLE #1 | | STYLE #2 | STYLE #3 | STYLE #4 |
| IBM (5%) | CKFR (4%) | KO (8%) PFE (3%) | C (1%) F (6%) | T (2%) GM (3%) |
| • | • | • • | • • | • • |
| • | • | IBM (11%) • | • • | • • |
| • | • | • • | • • | • • |
| • | • | • • | • • | • • |

| STYLIZED MASTER CLIENT ACCOUNT (SMCA) | | | | |
|---|---|---|---|---|
| SECURITY IDENTIFIER | # OF SHARES | TAX LOT # | TRANSACTION DATE | CASH |
| PIBM[1] | 100 | KTFC | 1/3/85 | |
| PCKFR[1] | 200 | CHFP | 1/5/2003 | |
| PKO[2] | 50 | HUFV | 11/9/2002 | |
| PPFE[2] | 50 | THSS | 3/12/2002 | |
| PC[3] | 100 | XAYC | 10/5/2002 | |
| PF[3] | 300 | ZKXB | 2/12/2003 | |
| PT[4] | 75 | ACGH | 8/7/2002 | |
| PGM[4] | 25 | FVOM | 4/30/2002 | |
| IBM[2] | 75 | TUVY | 1/10/2003 | |
| IBM DIV[1] | | | 2/15/2003 | $10.00 |
| IBM DIV[2] | | | 2/15/2003 | $7.50 |
| INTEREST[1] | | | 2/18/2003 | $20.00 |
| INTEREST[2] | | | 2/18/2003 | $10.00 |
| INTEREST[3] | | | 2/18/2003 | $40.00 |
| INTEREST[4] | | | 2/18/2003 | $30.00 |
| SGM[4] | 20 | | 2/4/2003 | |
| PIBM[2] | 75 | YUUY | 1/10/2003 | |
| WCASH[3] | | | 2/27/2003 | ($100.00) |
| DCASH[1] | | | 2/27/2003 | $100.00 |
| TOKO[1] | 50 | HUFV | 1/9/2003 | $2500 |
| TIKO[2] | 50 | HUFV | 1/9/2003 | ($2500) |
| ⋮ | ⋮ | ⋮ | ⋮ | ⋮ |
| STYLE #1 ALLOCATED CASH | | | | $2000.00 |
| STYLE #2 ALLOCATED CASH | | | | $1000.00 |
| STYLE #3 ALLOCATED CASH | | | | $4000.00 |
| STYLE #4 ALLOCATED CASH | | | | $3000.00 |

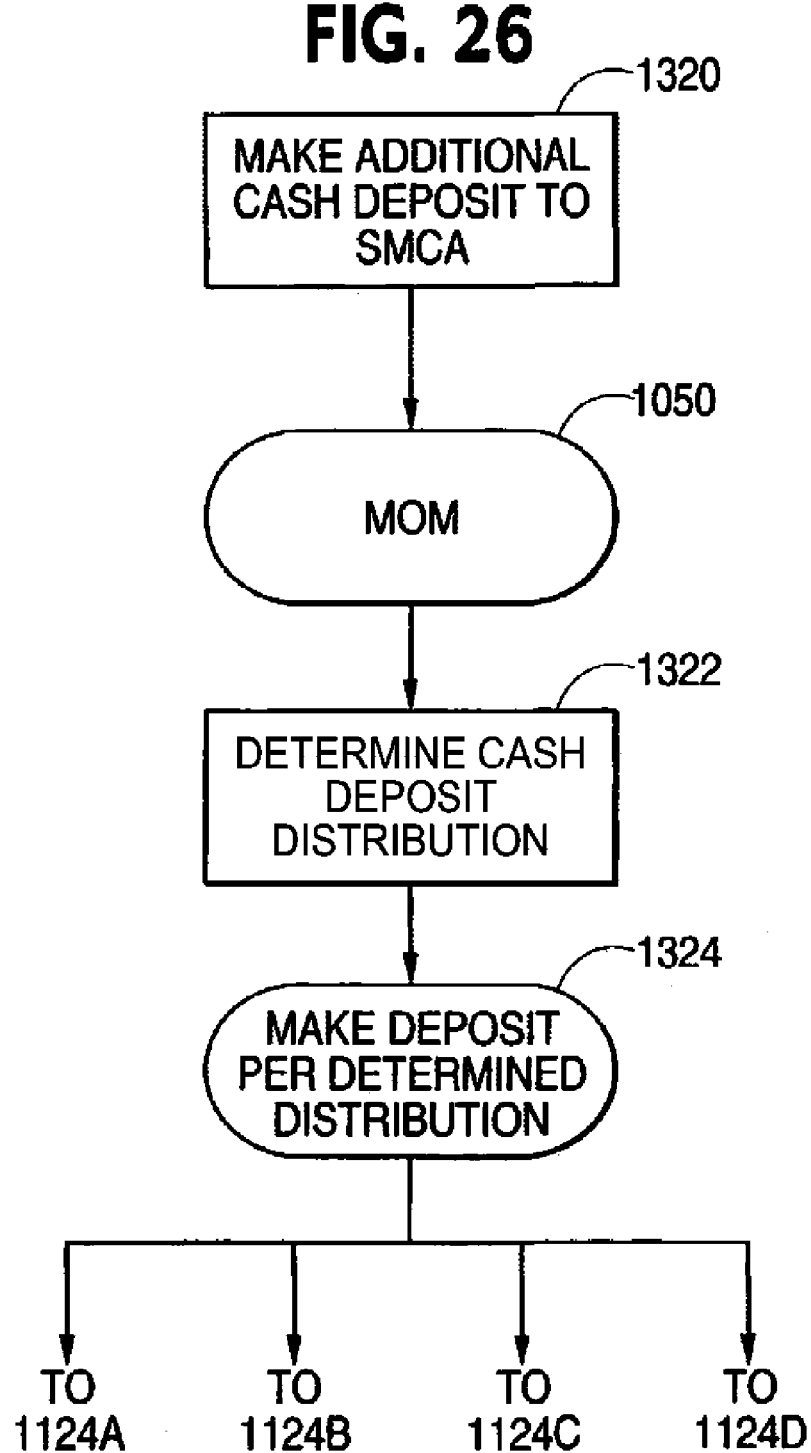

FIG. 27

CASH DEPOSITS BASED ON ALLOCATION FOR MODEL
− CASH WITHDRAWALS BASED ON ALLOCATION

UNTAGGED CASH
+ DIVIDENDS + INTEREST(+/−) + FLOWS(+/−) FOR MODEL

UNTAGGED + TAGGED CASH
− PURCHASES FOR MODEL
+ SALES FOR MODEL

CASH BALANCE FOR MODEL

FIG. 28

| COM 1280 | SMCA 1282 | | | MOM 1050 | | |
|---|---|---|---|---|---|---|
| MODEL | ALLOCATION | CASH | MARKET VALUE SECURITIES | TOTAL | REBAL-ANCING ACTION | RESULTING CASH BALANCE | FLOW |
| MODEL #1 | 25% | 5K | 245K | 250K | NONE | 5K | NONE |
| MODEL #2 | 25% | 0K | 240K | 240K | +5K | -5K | +5K |
| MODEL #3 | 25% | 5K | 255K | 260K | -10K | 15K | -5K |
| MODEL #4 | 25% | 5K | 245K | 250K | NONE | 5K | NONE |

TARGETS
5K  245K  250K
2%  98%  100%

FIG. 29

| COM | | SMCA | | | MOM 1050 | | |
|---|---|---|---|---|---|---|---|
| MODEL | ALLOCATION | CASH | MARKET VALUE SECURITIES | TOTAL | REBAL- ANCING ACTION | RESULTING CASH BALANCE | FLOW |
| MODEL #1 | 25% | 5K | 245K | 250K | NONE | 5K | NONE |
| MODEL #2 | 25% | 0K | 240K | 240K | +5K | -5K | +10K |
| MODEL #3 | 25% | 5K | 255K | 260K | -10K | 15K | -10K |
| MODEL #4 | 25% | 5K | 245K | 250K | NONE | 5K | NONE |

TARGETS
  5K   245K   250K
  2%   98%   100%

FIG. 33

| DAY 1 | TOTAL | | VALUE | | GROWTH | | SMALL CAP | | FIXED | |
|---|---|---|---|---|---|---|---|---|---|---|
| | C | $ | C | $ | C | $ | C | $ | C | $ |
| DEPOSIT $100K | $100K | $0 | | $0 | $40K | $0 | | $0 | | $0 |
| BUILD CASH BUCKETS | $100K | $0 | $40K | $0 | $40K | $0 | $10K | $0 | $10K | $0 |
| TRANSACT ACCT | ($96K) | $96K | ($38K) | $38K | ($40K) | $40K | ($9K) | $9K | ($9K) | $9K |
| POST TRADES | $4K | $96K | $2K | $38K | $0K | $40K | $1K | $9K | $1K | $9K |
| FLOW CASH | | | $-1K① | | $1K② | | | | | |
| REBUILD CASH | $4K | $96K | $1K | $38K | $1K | $40K | $1K | $9K | $1K | $9K |
| DAY 1 + n | | | | | | | | | | |
| MARKET VALUE CHANGES | | | | | | ($84K) | | $3K | | |
| DAY 1 + n VALUES | $4K | $95K | $1K | $38K | $1K | $36K | $1K | $12K | $1K | $9K |
| REBALANCE OF FLOW | | | | | $3K② | $3K | ($3K)③ | $3K | | |
| POST TRADE VALUES | $4K | $95K | $1K | $38K | $1K | $39K | $1K | $9K | $1K | $9K |

FIG. 34

DAY 1 + n

| | TOTAL | | VALUE | | GROWTH | | SMALL CAP | | FIXED | |
|---|---|---|---|---|---|---|---|---|---|---|
| | C | S | C | S | C | S | C | S | C | S |
| POST TRADE VALUES | $4K | $95K | $1K | $38K | $1K | $39K | $1K | $9K | $1K | $9K |
| DEPOSIT | $10K | | $4K | | $4K | | $1K | | | |
| TOTALS | $14K | $95K | $5K | $38K | $5K | $39K | $2K | $9K | $1K | $9K |
| MANUAL CASH FLOW | | | ($3K)① | | | | | | | |
| MANUAL SECURITIES FLOW | | | $4K① | ($4K) | ($4K)② | $4K | $3K③ | | | |
| TOTALS | $14K | $95K | $6K | $34K | $1K | $43K | $5K | $9K | $2K | $9K |
| TAX AWARE TRADES | ($10K) | | $4K | ($4K) | $4K | ($4K) | $2K | ($2K) | | |
| TOTALS | $24K | $85K | $10K | $30K | $5K | $39K | $7K | $7K | $2K | $9K |

FIG. 35

| | TOTAL | | VALUE | | GROWTH | | SMALL CAP | | FIXED | |
|---|---|---|---|---|---|---|---|---|---|---|
| | C | $ | C | $ | C | $ | C | $ | C | $ |
| TOTALS | $24 | $85 | $10K | $30K | $5K | $39K | $7K | $7K | $2K | $9K |
| TRADES-NET | | | $2K① | ($2K) | ($4K)① | $4K | | | | |
| TOTALS | $22 | $87 | $12K | $28K | $1K | $43K | $7K | $7K | $2K | $9K |

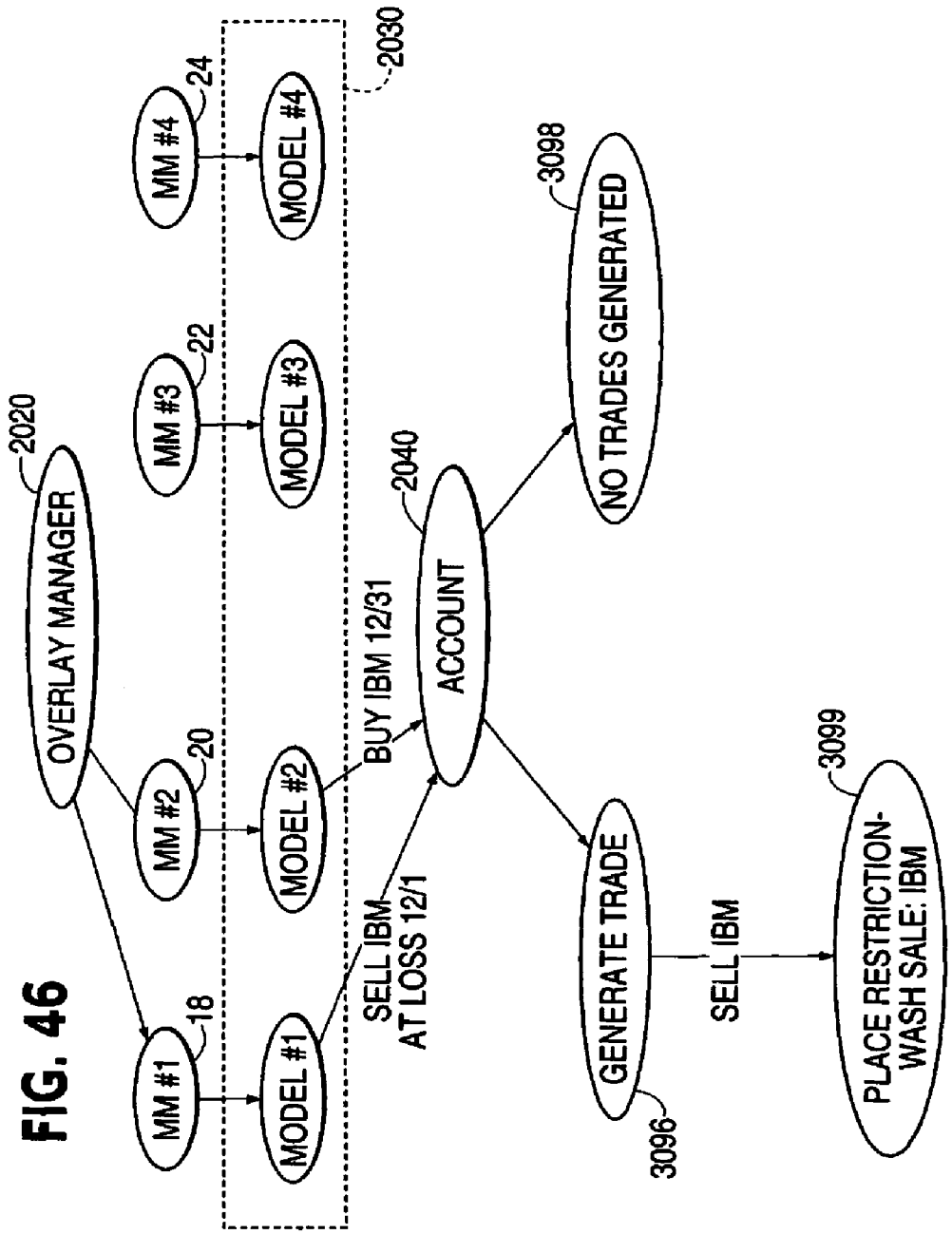

DISTRIBUTION OF CASH DEPOSITS AND WITHDRAWALS IN MULTI-STYLE MANAGED CLIENT INVESTMENT ACCOUNTS

CROSS-REFERENCE TO RELATED APPLICATIONS

The present application relates to pending U.S. patent application Ser. No. 10/372,724, filed Feb. 25, 2003, for "MULTI-STYLE CLIENT INVESTMENT MANAGED ACCOUNTS WITH TRANSACTION" (abandoned); U.S. patent application Ser. No. 10/372,647, filed Feb. 25, 2003, for "DRIFT DETERMINATION IN MULTI-STYLE MANAGED CLIENT INVESTMENT ACCOUNT" (pending); U.S. patent application Ser. No. 10/372,726, filed Feb. 25, 2003, for "TAX EFFICIENT TRADING OF MULTI-STYLE MANAGED CLIENT INVESTMENT ACCOUNTS" (abandoned); U.S. patent application Ser. No. 10/372,707, filed Feb. 25, 2003, for "PORTFOLIO MANAGEMENT SYSTEM ARCHITECTURE FOR MULTI-STYLE MANAGED CLIENT INVESTMENT ACCOUNTS" (abandoned); U.S. patent application Ser. No. 10/372,646, filed Feb. 25, 2003, for "DISTRIBUTION OF DIVIDENDS IN MULTI-STYLE MANAGED CLIENT INVESTMENT ACCOUNTS" (abandoned); U.S. patent application Ser. No. 10/372,708, filed Feb. 25, 2003, for "GENERATION OF CASH BALANCES FOR MULTI-STYLE MANAGED CLIENT INVESTMENT ACCOUNTS" (abandoned); U.S. patent application Ser. No. 10/372,725, filed Feb. 25, 2003, for "MOVING FUNDS WITHIN MULTI-STYLE MANAGED CLIENT INVESTMENT ACCOUNTS" (abandoned); U.S. patent application Ser. No. 10/372,706, filed Feb. 25, 2003, for "AUTOMATIC ADJUSTMENT OF CASH BALANCES WITHIN MULTI-STYLE MANAGED CLIENT INVESTMENT ACCOUNTS" (abandoned); U.S. patent application Ser. No. 10/372,649, filed Feb. 25, 2003, for "DYNAMIC OVERLAY MODEL FOR MANAGING MULTIPLE MULTI-STYLE MANAGED CLIENT INVESTMENT ACCOUNTS FOR MULTIPLE INVESTORS" (pending); U.S. patent application Ser. No. 10/372,715, filed Feb. 25, 2003, for "NETTING TRANSACTIONS IN MULTI-STYLE MANAGED CLIENT INVESTMENT ACCOUNTS" (abandoned); U.S. patent application Ser. No. 10/372,650, filed Feb. 25, 2003, for "ACCURATE STYLE PERFORMANCE REPORTING FOR MULTI-STYLE MANAGED CLIENT INVESTMENT ACCOUNTS" (abandoned); U.S. patent application Ser. No. 10/372,673, filed Feb. 25, 2003, for "MASTER OVERLAY MANAGER PORTFOLIO MANAGEMENT SYSTEM AND MONEY MANAGER PORTFOLIO MANAGEMENT SYSTEM INTERFACING" (abandoned); U.S. patent application Ser. No. 10/372,652, filed Feb. 25, 2003, for "MONITORING DRIFT OF CASH AND/OR SECURITIES IN MULTI-STYLE MANAGED CLIENT INVESTMENT ACCOUNTS USING THRESHOLDS AND RULES" (abandoned); U.S. patent application Ser. No. 10/372,705, filed Feb. 25, 2003, for "COORDINATED REBALANCING BY MONEY MANAGER PORTFOLIO MANAGEMENT SYSTEMS AND A MASTER OVERLAY MANAGER PORTFOLIO MANAGEMENT SYSTEM", which issued on Jun. 1, 2010 as U.S. Pat. No. 7,729,969; U.S. patent application Ser. No. 10/372,648, filed Feb. 25, 2003, for "WASH SALE VIOLATION AVOIDANCE IN TRANSACTING MULTI-STYLE MANAGED CLIENT INVESTMENT ACCOUNT" (abandoned); U.S. patent application Ser. No. 10/372,651, filed Feb. 25, 2003, for "SWAPPING SECURITIES IN MULTI-STYLE MANAGED CLIENT INVESTMENT ACCOUNTS" (abandoned).

TECHNICAL FIELD

The present invention relates to investment portfolio management and more particularly to the management of portfolios invested using multiple investment styles.

BACKGROUND ART

Historic Portfolio Management System Architecture

Referring to FIG. 1, in the world of managed accounts, an individual investor 10 desires to open a single brokerage account (BA) with multiple investment styles with a brokerage firm 14 through the investor's financial advisor or broker 12, who will sometimes be referred to simply as the advisor or financial advisor and may be a member of the brokerage firm 14, as indicated by the dotted lines. The multiple investment styles are implemented for the investor through the opening of multiple separately managed trading accounts. Due to the limitations of the architecture of FIG. 1, distinct accounts must be opened by the by broker, and the investor is typically not shielded from this fact (the BA primarily reflects the relationship between broker and investor).

Let us say, for example, that the account is initially opened in the amount of $500,000. The brokerage firm 14 will commonly split the $500,000 amount within the BA amongst multiple trading accounts. For this example, we will assume that the $500,000 amount is split between four (4) separate trading accounts at the brokerage firm. The trading accounts are represented in FIG. 1 as TA1, TA2, TA3 and TA4. The trading accounts are associated with the single brokerage firm 14. The trading account data for TA1, TA2, TA3 and TA4 is entered into a database 26A of the automated brokerage firm portfolio management system (BFPMS) 26 utilized by the brokerage firm 14.

After the trading accounts TA1, TA2, TA3 and TA4 have been opened by the brokerage firm 14, the brokerage firm must also open four (4) separate custodial trading accounts, represented in FIG. 1 as CTA1, CTA2, CTA3 and CTA4, at the custodian firm 16. The four (4) custodian trading accounts are entered into a database 28A of the custodian account management system (CAMS) 28 conventionally utilized by the custodian firm 16, and typically associated with the tax identifier, i.e. tax ID, of the investor 10. The official and formal records for the trading accounts TA1, TA2, TA3 and TA4, and hence the single BA, will be the records for the custodial trading accounts CTA1, CTA2, CTA3 and CTA4, as maintained by the custodian firm 16. The advisor 12, will most typically recommend to the investor 10 that each of the individual trading accounts be assigned to a different money manager to increase diversity and reduce risk for investor 10. In this example, we will assume that the trading accounts TA1, TA2, TA3 and TA4, will be respectively assigned to money manager A 18, money manager B 20, money manager C 22 and money manager D 24. Each of these money managers will preferably have a different investment style, which typically reflects a particular investment philosophy. For example, in this case, the respective money manager styles might be large cap growth, large cap value, small cap and fixed income. Thus, each of the four (4) trading accounts TA1, TA2, TA3 and TA4, will be assigned to a different one of the four money managers 18-24. Each money manager will open a separately managed trading account, which will sometimes be referred to as an MTA. The managed trading accounts are represented in FIG. 1 as MTA1, MTA2, MTA3 and MTA4. The trading account records for each of MTA1, MTA2, MTA3 and MTA4 are entered into a database 30A of an automated money manager portfolio management system (MMPMS) 30 conventionally utilized by each of the money managers 18-24.

It should be understood that, although the MMPMS shown for each of the money manager's 18-24 is referred to using the same reference numeral, each MMPMS could be different from the other MMPMSs. Because each of the money managers 18-24 manages a separately managed trading account, i.e. manages a different one of MTA1, MTA2, MTA3 and MTA4, each of the managed trading accounts are managed separately according to the applicable money manager's individual investment style. Thus, in actuality, although it appears to the investor 10 that he or she has only a single managed BA with the brokerage firm 14, in reality he or she has had multiple separate trading accounts combined for reporting. In this case the four (4) trading accounts TA1, TA2, TA3 and TA4, amongst which the invested amount, i.e. in this example $500,000, is divided and separately invested and managed using different investment styles. Since the managed trading accounts are separate accounts, each of the money managers 18-24 could independently perform certain functions on its MTA.

For example, each of the money managers 18-24 could independently rebalance its MTA for investor 10 to its style model, and perform different "what if" scenarios on its MTA for investor 10 to determine how that account will be affected by a purchase or sale of a certain security, e.g. publicly traded shares of a particular company. Each of the money managers 18-24 could also independently place individual restrictions on its MTA for the investor 10. In this regard, if the investor 10 is employed by a certain company and purchases that company's shares through an employee stock purchase program, the investor 10 may not want the money manager to buy any more securities in that company. In such a case, the applicable money manager can restrict the purchase of the company's shares for the MTA of the investor 10 which it manages. To avoid such purchases, the money manager will typically enter the restriction in the applicable MMPMS for the investor's MTA. The MMPMS will then automatically prevent or issue a warning, if there is an attempt to purchase the company's stock with funds from the investor's MTA being managed by that money manager.

As the money managers 18-24 makes decisions on the managed trading accounts MTA1, MTA2, MTA3 or MTA4, the associated trade orders, e.g. orders to buy securities or sell securities in a particular company, are initiated by the money managers 18-24 and forwarded to the brokerage firm 14. Based on the issued orders, the brokerage firm 14 executes the trades in fulfillment of the orders. In this regard, the brokerage firm 14 will, through its trading desk, execute the buys and the sells to actually perform the ordered trades.

After fulfillment of one or more orders, the brokerage firm 14 forwards a file representing the executed buys and sells to the custodian 16. Based on the information represented in the forwarded file, the custodian 16 records the trades in the books and records for the applicable custodial trading account, i.e. CTA1, CTA2, CTA3 or CTA4. The brokerage firm 14 will also forward the prices of the executed buys and sells associated with an order(s) of a particular one of the money managers 18-24 to that money manager. For example, if the brokerage firm 14 purchased 100 shares of IBM at an $80/share price, the $80 purchase price is forwarded to the custodian 16 and the applicable money manager 18-24 for recording in the applicable CTA maintained by the CPMS and the applicable MTA maintained by the applicable MMPMS, respectively. Once the books and records for the custodial trading accounts CTA1-CTA4 have been modified by the custodian 16 to reflect the actually executed orders, in accordance with the files forwarded from the brokerage firm 14, the brokerage firm 14 and the money managers 18-24 will reconcile TA1-TA4 and MTA1-MTA4, with the modified books and records of the custodian 16 for CTA1-CTA4. Thus, information, in the form of a file representing the information associated with the CTAs, flows back from the custodian 16 to the brokerage firm 14 and from the brokerage firm 14 to the money managers 18-24. Accordingly, both the TAs maintained by the brokerage firm 14 and the MTAs maintained by the money managers 18-24 on their respective portfolio management systems, shadow the CTAs maintained by the custodian 16 on the CPMS. It will be understood that the prices are returned almost immediately, and almost always within the same trading day, while the custodian information is not returned until the next business day.

As described above, each of the money managers 18-24 will have a single MTA for the investor 10, while the brokerage firm 14 will have multiple separate TAs for investor 10. The brokerage firm 14 may report on the TAs to the investor 10 by presenting four (4) separate trading account statements, i.e. one for each of TA1-TA4. The brokerage firm 14 may also, or alternatively, manually roll the separate statements into one single brokerage account statement that is reported to the investor 10. Each of the money managers 18-24 may also independently present a managed trading account statement for the MTA which it manages, to the investor 10.

Current Portfolio Management System Architecture with Single Managed Client Account and Overlay Manager As described above with reference to FIG. 1, using the historical brokerage firm portfolio management system architecture, brokerage firms had to open multiple trading and custodial trading accounts. Typically, a different trading account was opened for each investment style or assigned money manager. Since, using this architecture, statements could only be generated by the MMPMS for each individual managed trading account, the brokerage firm was required to either report on each of the trading accounts separately or manually combine the multiple different statements associated with the managed trading accounts to present a single brokerage account statement to the investor. The need to generate multiple trading account statements, i.e. one for each managed trading account, and manually combine these statements into a single brokerage account statement, made reporting to the investor difficult and more expensive for the brokerage firm. For the investor, the need to review multiple trading account statements for a single brokerage account made the review complex, and the statements difficult to understand and use.

More recently, system architectures have been introduced to simplify the reporting and provide greater automation. One such recently introduced architecture is shown in FIG. 1A. In the FIG. 1A architecture, an overlay manager, represented by a master overlay manager (MOM) 50, allows the brokerage firm 14 to maintain a single client account (CA) in the database 32A of the brokerage firm portfolio management system (BFPMS) 32. It should be understood, that the MOM 50 could be a separate system, which might be operated by a global money manager, or could be functionally included as part of one of the money manager portfolio management systems (MMPMS) 36, e.g. part of the MMPMS 36 for money manager 20 as indicated by one set of dotted lines, or could be functionally included as part of the BFPMS 32 as indicated by the other set of dotted lines.

Notwithstanding where the master overlay manager functionality resides, because only a single CA need be maintained, the brokerage firm 14 also need only open, and the custodian 16 need only maintain, a single custodial client account (CCA) in the database 34A in the custodian portfolio management (CPMS) 34, to record transactions associated with the CA performed in accordance with multiple different investment styles. The different investment styles are reflected in the style models, i.e. SM1-SM4, of the money managers 18-24 which are stored in memory 36C of the MMPMSs 36, which are incorporated in a single overlay model (OM). Now, rather than generating multiple trading account statements, i.e. one for each style, the MOM 50 or the brokerage firm 14 are capable of automatically generating a single managed client account (MCA) statement for reporting to the investor 10. Thus, using MOM 50 of FIG. 1A, reporting has been simplified for the brokerage firm 14. For the investor 10, the single MCA statement is easier to understand and use. Additionally, the investor 10 need no longer be burdened with multiple different managed trading account (MTA) statements for the same account.

Alternative Current Portfolio Management System Architecture with Single Managed Client Account, Multiple Trading Accounts and Overlay Manager FIG. 1B depicts a recently introduced variation of the portfolio management system architecture depicted in FIG. 1. This new architecture includes a limited-functionality overlay manager represented by an alternate master overlay manager (AMOM) 50' which also allows consolidation of the multiple trading account (MTA) reports, but is otherwise identical to the architecture of FIG. 1. Here again, the AMOM 50' could be a separate system, which might be operated by a global money manager, or could be functionally included as part of one of the alternative money manager portfolio management system AMMPMSs 36', e.g. part of the AMMPMS 36' for money manager 20 as indicated by one set of dotted lines, or could be functionally included as part of the BFPMS 36' as indicated by the other set of dotted lines.

As will be discussed further below, the individual money managers 18-24 initiate trade orders for and otherwise manage the MTAs. These transactions are compiled by the AMOM 50' into a single alternative managed client account (MCA'). Although multiple trading account statements, i.e. one for each style, are generated by each of the AMMPMSs 36', the AMOM 50' in the FIG. 1B architecture, is capable of automatically generating a single MCA' statement for reporting to the investor 10 on the BA basis, by compiling the multiple the MTA statements generated by the AMMPMSs 36'. Thus, using AMOM 50' of FIG. 1B, reporting has been simplified for the brokerage firm 14. For the investor 10, the single MCA' statement is easier to understand and use. Additionally, the investor 10 need no longer be burdened with multiple different statements for what he or she considers the same account. Unlike the FIG. 1A architecture, the portfolio management system architecture of FIG. 1B, like the more historic architecture of FIG. 1, beneficially also allows the money managers 18-24 to manage each style in a separate managed trading account.

To summarize, currently available portfolio management system architectures, such as those depicted in FIGS. 1A and 1B, provide the brokerage firm with the ability to establish and maintain only one client account in the case of the FIG. 1A architecture, and to generate and forward one consolidated account statement to the investor in the FIGS. 1A and 1B architectures, notwithstanding the number of trading styles used for the account. This has simplified the entire investment portfolio management process for both the brokerage firm and the investor.

Brokerage Firm Portfolio Management System (BFPMS)

FIG. 2 is an exemplary depiction of the conventional brokerage firm portfolio management system (BFPMS) 32 shown in FIG. 1A, and further details the functionality of the BFPMS 32. The functionality of the BFPMS 26' in FIG. 1B is identical to that of the BFPMS 26 in FIG. 1, except for the interface to the AMOM 50'. As shown, the BFPMS 32 includes the database 32A having data representing a single client account (CA) for the investor 10. The BFPMS also includes a processor 32B that includes the logic, e.g. programmed instructions, necessary to perform various functions. As shown, these functions include a function to direct the opening of a client account 32B1 which performs the necessary operations to open the single CA for the investor 10, an open custodial account function 32B2 which performs the necessary operations to direct the custodian account management system (CAMS) 28 to open the custodian client account (CCA) for the investor 10, and a direct order execution function 32B3 which performs the necessary operations to direct the execution of orders placed by either the overlay manager, in the case of the FIG. 1A architecture, or the money managers 18-20, in the case of the FIG. 1B architecture.

Money Manager Portfolio Management System (MMPMS or AMMPMS)

FIG. 3 is an exemplary depiction of the conventional money manager portfolio management system (MMPMS) 36 and or alternate conventional money manager portfolio management system (AMMPMS) 36' shown in FIGS. 1A and 1B, and further details the functionality of the MMPMS and AMMPMS.

As shown, the MMPMS 36 of FIG. 1A and the AMMPMS 36' of FIG. 1B include the database 36A having data representing a managed trading account (MTA) for the investor 10. As discussed above, because all trade ordering and account management functions are performed by the MOM 50 at the MCA level in the FIG. 1A architecture, there are no MTAs to be managed by the individual money managers 18-24 using the FIG. 1A architecture and hence the MMPMS 36 of FIG. 1A has no need for a database 36A to maintain an MTA.

The MMPMS 36 of FIG. 1 and the AMMPMS 36' of FIG. 1B also include a processor 36B which includes the logic, e.g. programmed instructions, necessary to perform various functions. As shown, these functions include, but are not limited to, a rebalancing accounts function 36B1, a tax efficient trading function 36B2, a wash sales function 36B3, a drift function 30B4, a generate trade orders function 36B5 and a generate MTA function 36B6 which performs the necessary operations to generate a statement for its associate MTA. Here again, and as discussed above, because all trade ordering and account management functions are performed by the MOM 50 at the MCA level in the FIG. 1A architecture, there are no MTAs to be managed by the individual money managers 18-24 and hence no need for the AMMPMS 36' of FIG. 1B to perform the functions 36B1-36B6 or to include the processor 36B to perform such functions.

Both the MMPMS 36 and AMMPMS 36' include a memory 36C that stores a style model (SM) for the investment style utilized by the applicable money manager. As discussed above, in the case of the MMPMS 36 the stored SM is incorporated in the overlay model (OM) utilized by the MOM 50 to generate trade orders and manage activity on the single managed client account (MCA). Hence, in the FIG. 1A architecture, the applicable SM is stored on the MMPMS 36 only for the purpose of recording modifications made to the stored SM made by the applicable money manager. These modifications are then forwarded to the MOM 50 for incorporation in the overlay model (OM) for the investor 10. On the other hand, in the case of the AMMPMS 36', the processor 36B will utilize the stored SM in performing functions 36B1-36B4 and 36B6, as applicable, for the applicable MTA of the investor 10 stored in the database 36A.

With regard to the rebalancing accounts function 36B1, money managers 18-24 have historically rebalanced one managed trading account or style at a time. That is each managed trading account, i.e. each of MTA1-MTA4, is separately rebalanced to bring that account back in line with the particular model for that style. As described above, each money manager has a particular SM stored in the memory 36C of the AMMPMS 36' associated with that money manager. For instance, a large cap growth style would have a static model requiring certain number of securities and cash to make-up 100% of the MTA. Each MTA must be rebalanced by the applicable AMMPMS 36' to the individual style, i.e. the individual SM, of the applicable money manager. To do this, the AMMPMS processor 36B, executes the rebalance account function 36B1 to determine the deviation of the MTA in the database 36A from the SM stored in the memory 36C. It then generates trade orders by executing the generate trade order function 36B5, to reduce or eliminate the determined deviation and thereby place the MTA in line with the SM.

With regard to the tax efficient trading function 36B2, the investor 10 may require that certain lots of or positions in securities held in the MCA be sold at a loss to off-set gains made earlier in a tax year, and thereby reduce the tax burden on the investor 10. This is commonly referred to as tax harvesting. To do this, the applicable AMMPMS processor 36B, executes the tax efficient trading function 36B2 to identify the lots of or positions in securities that should preferably be sold from the applicable MTA to offset the gains due to prior sales of securities in that MTA. It then generates trade orders, by again executing the 36B5 function, to sell the identified securities, and thereby reduce or eliminate the prior gain for the tax year and the associated investor tax burden. With regard to the wash sale function 36B3, a wash sale violation arises when a security in one MTA was previously sold at a loss for the investor 10 and the same security is repurchased for any of MTA1-MTA4 for investor 10 within thirty-one days, or some other predetermined period, of the sale. In order to tract potential wash sales, the money managers 18-24 must ensure that a security on which the money manager is issuing a purchase order was not sold at a loss for the investor 10 by it or any other money manager during the relevant period, e.g. during the prior thirty days. However, the applicable AMMPMS processor 36B, executes the wash sales function 36B3 to identify only whether a security that the applicable money manager intends to purchase for the applicable MTA was previously sold from that MTA at a loss during the relevant period. After determining that no such sale previously occurred, the AMMPMS processor 36B executes the generate trade order function 36B5 to generate a trade order to purchase the security, thus avoiding a wash sale violation with respect to trading activity relating to the applicable MTA, but not with respect to other MTAs of the investor 10.

There are other conditions that money managers 18-24 have to deal with in the FIG. 1B architecture. One is, monitoring and managing drift within a single MTA, which is performed by the drift function 36B4. Each of the money managers 18-24, are concerned with the drift of an individual security or other holding in the MTA which it manages for the investor 10, away from the conditions for that security or other holding set forth in the SM stored in the memory 36C for that MTA. Historically, the money managers 18-24 tracked such drift manually. To do this, each money manager would need to go through its MTA for the investor 10 looking for securities or holdings that have become over or under rated, and then adjust the securities or holdings accordingly.

In the architecture of FIG. 1B, the AMMPMS processor 36B performs the drift function 36B4 by monitoring and managing drift at the security level within the applicable MTA in an automated manner. To do this, the applicable AMMPMS processor 36B, executes the drift function 36B4 to identify whether a security or other holding in the applicable one of MTA1-MTA4 in the database 36A has drifted outside of a range, which may be established by the processor 36B or stored in the memory 36C, from a position for that security or holding established in the SM stored in the memory 36C. The processor 36B then executes the generate trade order function 36B5 to initiate trade orders to reduce or eliminate the drift and thereby place the applicable MTA in line with the applicable SM. Since drift is reduced or eliminated one style, i.e. one MTA, at a time and the drift reduction or elimination in each style is typically performed by a different AMMPMS 36', the drift in a single client account with funds invested across multiple MTAs is reduced by the MMPMS 36' only on a style-by-style basis. Style-by-style drift monitoring may result in an inefficient number of corrective trades for multiple MTAs.

Master Overlay Manager (MOM or AMOM)

As discussed above and shown in FIGS. 1A and 1B, current portfolio management system architectures include one of two types of master overlay managers, i.e. the MOM 50 of the FIG. 1A architecture or the AMOM 50' of the FIG. 1B architecture. The MOM 50 or AMOM 50' may be in the form of a separate system, or be incorporated as part of the BFPMS 32, or MMPMS 36 or AMMPMS 36'.

FIG. 4 is an exemplary depiction of the conventional master overlay manager (MOM) 50 shown in FIG. 1A, and the conventional alternate master overlay manager (AMOM) 50' shown in FIG. 1B, and further details the functionality of the MOM 50 and AMOM 50'.

As shown, the MOM 50 and AMOM 50' include a processor 50A that includes the logic, e.g. programmed instructions, necessary to perform one or more functions. These functions differ depending on whether the processor 50A is included in the MOM 50 or the AMOM 50'.

In the case of the MOM 50 of the FIG. 1A architecture, these functions include a rebalancing managed client accounts function 50A1, a managed client account tax efficient trading function 50A2, a managed client account wash sales function 50A3, a managed client account cross style drift function 50A4, a generate trade order function 50A5 and a generate MCA statement function 50A6. Because trade ordering and account management functions are performed by the AMMPMSs 36' at the MTA level in the FIG. 1B architecture, there is no truly managed client account (MCA) to be managed by the AMOM 50' and hence no need for AMOM 50' to perform the functions 50A1-50A6.

However, in order for the AMOM 50' to compile the MTA's maintained by the AMMPMS 36' into what can be viewed by the investor as a single managed client account (MCA'), the AMOM 50' includes a generate MCA' function which is executed by processor 50A to combine the records for MTA1-MTA4, into a single MCA' record and to modify the MCA based on transaction information received for each of MTA1-MTA4. In the case of the AMOM 50' of the FIG. 1B architecture, the functions performed by the processor 50A also include a generate MCA' statement function 50A8, which either combines the individual MTA statements generated by the AMMPMSs into a single corresponding MCA' statement or generates an MCA' statement from the MCA' record. Alternatively, the generate MCA' statement function 50A8 could generate the consolidated MCA' statement dynamically from individual MTA information, and not require the creation and maintenance of the MCA' at all. In this discussion, the existence of the MCA' is assumed.

The MOM 50 also includes a memory 50B which stores an overlay model (OM) for the MCA. The OM combines the style models, e.g. SM1-SM4, for each of the investment styles, e.g. style1-style4, into the OM for the MCA being utilized for the investor 10, reflecting a desired allocation distribution across the styles as well as potentially other overlay parameters. As discussed above, because, in the FIG. 1B architecture, all trade ordering and account management functions are performed by the AMMPMS 36' at the MTA level and the results are simply compiled by the AMOM 50' at the MCA' level in the FIG. 1B architecture, there is no OM required in the FIG. 1B architecture, and hence AMOM 50' has no need for a memory 50B for storing an OM. Both the MOM 50 and AMOM 50' include a database 50C which stores a master client account (MCA) in the case of MOM 50 and an alternate master client account (MCA') in the case of AMOM 50'. In the case of the FIG. 1A architecture, the MCA is shadowed, as will be further discussed below, by the BFPMS 32 of FIG. 2 as the CA stored in the BFPMS database 32A. If the MOM 50 is incorporated within the BFPMS 32, the CA stored in the BFPMS database 32A will be utilized in lieu of the MCA, eliminating the need for the database 50C.

In the case of the FIG. 1A architecture, all trade orders are initialed and all account management functions are performed by the MOM 50 at the MCA level. Accordingly, the MCA stored in database 50C of MOM 50 is independently generated and maintained by the MOM 50. The MOM 50 has no need to coordinate with or receive information, other than the SMS and modifications thereto, from the individual money managers 18-24 to transact and manage the MCA.

In the case of the FIG. 1B architecture, the MCA' is a compilation of the individual MTAs stored in the AMMPMSs 36'. Since all trade orders initiated and most account management functions are performed by the individual AMMPMSs 36' at the MTA level, the MCA' stored in database 50C of AMOM 50' merely shadows to the MTAs independently generated and maintained by the respective AMMPMSs 36'. With regard to the rebalancing client account function 50A1, the brokerage firm 14 has historically, at best, performed a manual rebalancing of individual securities across all for the MTAs, i.e. MTA1-MTA4. That is, all the securities in the managed trading accounts MTA1-MTA4 for the investor 10 were at best manually rebalanced to bring the securities back in line with the desired security allocation for that investor. The MOM 50 can perform an automated rebalancing of the single MCA maintained in the database 50C, based on the multi-style OM for the MCA of the investor 10 stored in the memory 50B of the MOM. For example, the multi-style OM for a particular MCA might require certain number of securities, within the MCA, to make-up 100% of the capital. The MCA must be rebalanced by the MOM 50 to the OM. To do this, the processor 50A, executes the rebalance account function 50A1 to determine the deviation of the MCA securities in the database 50C from the security allocation of OM stored in the memory 50B. It then generates trade orders by executing the generate trade order function 50A5, to reduce or eliminate the determined deviation and thereby place the MCA, and hence the CA stored at the brokerage firm 14, in line with the OM for the investor 10.

With regard to the MCA tax efficient trading function 50A2, as discussed above, the investor 10 may require that certain lots of or positions in securities held in the MCA be sold at a loss, i.e. the loss harvested, to off-set gains made earlier in a tax year, and thereby reduce the tax burden on the investor 10. To do this, the processor 50A of the MOM 50, executes the MCA tax efficient trading function 50A2 to identify the lots of or positions in securities that should preferably be sold from the MCA of the investor 10 to offset the gains due to prior sales of securities in the MCA of investor 10. It then executes the generate trade order function 50A5 to initiate trade orders to sell the identified securities, and thereby reduce or eliminate the prior gain for the tax year and the associated investor tax burden.

With regard to the MCA wash sale function 50A3, as discussed above, a wash sale violation arises when a security in the MCA of investor 10 was previously sold at a loss for an investor and the same security is repurchased for the MCA within thirty-one days, or some other predetermined period, of the earlier sale. In order to tract potential wash sales, the MOM 50 insures that a security for which a purchase order is issued was not sold at a loss for the investor 10 during the relevant period, e.g. the prior thirty-one days. To do this, the processor 50A of the MOM 50, executes the CA wash sales function 50A3 to identify whether a security proposed to be purchased for the MCA of the investor 10 was previously sold from that MCA at a loss during the relevant period. Only after determining that no such sale previously occurred, will the processor 50A of the MOM 50 execute function 50A5 to generate a trade order to purchase the security, thus avoiding a wash sale violation with respect to trading activity relating to the MCA. The MOM 50 will also monitor and manage drift between the multiple styles associated with the MCA of the investor 10, using the MCA cross style drift function 50A4. In this regard, the MOM 50 is concerned with the drift between different styles used to invest the capital in that MCA in database 50C of MOM 50, away from the allocation across the multiple styles set forth in the OM stored in the memory 50B of the MOM 50. Historically, the brokerage firm 14, at best, tracked such across style drift manually. To do this, the brokerage firm would need to go through the performance and market value of the individual MTAs, looking for accounts that have become over- or under-weighted, and then adjust the MTAs accordingly. A drift between the individual styles at the MCA level could, for example, occur because some of the multiple styles have performed better than others, resulting in an increase in the individual market value of the securities invested in some of the styles and a decrease in the value of the securities invested in other styles for MCA of the investor 10. Based on this manual monitoring, the brokerage firm would manually direct a redistribution of the cash among the multiple MTAs for the investor 10 to counter any determined drift between the various styles, i.e. between the multiple MTAs, and thereby realign the MTAs, which had become overrated or underrated, with a desired style allocation. Thus, historically the money managers 18-24 and brokerage firm 14 were not proactively alerted when a MTA violated certain style drift tolerances based on a desired style distribution.

The processor 50A of the MOM 50 performs the MCA across style drift function 50A4 and proactively monitors and manages across style drift within the MCA for the investor 10 in an automated manner. To do this, the processor 50A of MOM 50 executes the across style drift function 50A4 to identify whether a style of securities in the MCA of investor

10, has drifted outside of a range, which may be computed by the processor 50A or stored in the memory 50C, from the style allocation established in the OM stored in the memory 50B. The processor 50A then generates trade orders, by executing the generate trade order function 50A5, to reduce or eliminate the drift and thereby place the MCA for the investor 10, and hence the CA maintained by the brokerage firm 14, in line with the OM. Since drift is reduced or eliminated for the entire MCA, not just one style, the drift in a single MCA with funds invested among multiple styles is reduced by the MOM 50 on an entire account, not a style-by-style, basis.

The processor 50A of the MOM 50 also executes the generate MCA statement function 50A6 to create statements for reporting on the MCA of investor 10. By executing function 50A6, the processor 50A of MOM 50 is capable of generating statements on both an individual style basis and an entire MCA basis. As will be described further below, these statements may include performance information for the MCA on a style-by-style or entire account basis.

Referring now to the functions performed by the AMOM 50' in the FIG. 1B architecture, the combine MTAs function 50A5 is executed by the processor 50A of the AMOM 50' to combine and organize the records stored for each of the individual MTAs, i.e. MTA1-MTA4 at the respective AMMPMSs 36' into the MCA' stored in the database 50A of the AMOM 50'. The processor 50A of the AMOM 50' will also modify the MCA' in correspondence with modifications to the MTAs over time based on information received from the AMMPMSs 36'.

The processor 50A of the AMOM 50' also executes the generate MCA' statement function 50A8 to create statements reporting on the MCA' of investor 10. By executing function 50A6, the processor 50A8 is capable of generating statements on an entire MCA' basis only. These statements may include performance information for the MCA' on an entire account basis only. Statements reporting on the individual MTAs, as discussed above, are created by the respective AMMPMS 36' in the architecture of FIG. 1B.

In summary, the MOM 50 can rebalance many styles at the same time, by rebalancing a single MCA, and hence rebalance the shadow CA at the brokerage firm 14. The MOM 50 can also transact in many styles in one MCA, making it much more efficient to harvest tax loses in an automated manner, by considering all of the lots of or positions in securities in the MCA to obtain the most efficient tax loss, and thereby harvesting across multiple different styles. Additionally, the MOM 50 is able to avoid wash sale violations which could occur across styles in an automated manner by tracking potential wash sales within the single MCA so as to insure that a security in any style which the overlay manager intends to purchase for the MCA of the investor 10 was not sold at a loss for the investor 10 during the relevant period from the MCA. Furthermore, the MOM 50 will proactively issue an alert when the MCA has violated certain style drift tolerances based on a desired style allocation set forth in the OM. Both the MOM 50, and AMOM 50' are capable of maintaining and reporting on a single master client account, i.e. MCA or MCA' for the investor 10, notwithstanding the use of multiple investment styles.

While the MOM 50 and AMOM 50' have significantly enhanced management capabilities for multiple style portfolios by implementing the above described functionality, the MOM 50 restricts each of money managers 18-24 from managing trading within its particular style. The AMOM 50', while allowing each of the money managers 18-24 to manage trading within its MTA, does not allow the overlay manager to manage a single multistyle account. Hence, a new architecture is required which will allow each of the money managers 18-24 greater flexibility then the current portfolio management system architecture of FIG. 1A to trade and work within their portion of the single client account, while providing the overlay manager with greater flexibility than the architecture of FIG. 1B to manage an investment portfolio across styles. For example, with regard to the cash management, cash or credit deposits of the investor 10 must be split up amongst the multiple styles to be utilized. Historically, the distribution of these deposits has been performed manually by the brokerage firm 14. That is, with reference to FIG. 1, as cash or credit deposits were made by the investor 10, the brokerage firm 14 would split the deposit up among the different styles, i.e. the different MTAs, and hence, the different money managers 18-24.

The FIGS. 1A and 1B architectures do not provide any automation when it comes to the allocation of assets. The process is still manually performed by the brokerage firm 14.

For instance, if an initial $1,000,000 account were allocated 40% or $400,000 to growth, and it was subsequently desired to redistribute a greater share of the account to growth, historically, the brokerage firm would manually initiate a draw from other style money managers and deposit the drawn amount to the growth money manager. This, for example, might increase the allocation to the growth money manager from 40% of the market value for the entire account of the investor 10, to the desired 50% or 60%. Neither the MOM 50 or AMOM 50' has provided any automation to this process.

Hence, in the current portfolio management system architectures shown in FIGS. 1A and 1B the investor 10 will still open a single brokerage account with the brokerage firm 14, via his/her financial adviser 12, by making a deposit, e.g. $500,000, with the brokerage firm 14. However, the brokerage firm 14, rather than opening and maintaining multiple trading accounts for the investor 10, i.e. one trading account per style, as shown in FIG. 1, now opens and maintains a single client account for the investor at the brokerage firm 14 as shown in FIG. 1A. Additionally, rather than opening multiple custodial trading accounts for the investor 10 at the custodian 16, i.e. one custodian trading account per style, as shown in FIG. 1, the brokerage firm 14 now opens a single custodial client account for the investor 10 at the custodian 16, as shown in FIG. 1A.

In the FIG. 1A architecture, use of the overlay model (OM) allows multiple styles to be applied within the single managed client account. The master overlay manager 50 controls the functioning of the single managed client account, including the trading, the reporting, and all other functioning required to manage the account. On the other hand, in the FIG. 1B architecture, there is no overlay model. Rather, separate managed trading accounts managed by different money managers continue to be utilized. This allows multiple styles to be applied to different portions of the single managed client account. The individual managers retain control over the management of respective portions of the single managed client account, including the trading, some of the reporting, and other functioning required to manage the account. The overlay manager compiles information from the separate money managers to provide overall account reporting.

The MOM 50 or AMOM 50' might reside within a special overlay management department of the brokerage firm 14. This department might have the responsibility to control the client account activity utilizing the functionality available in the MOM 50, or the reporting to the investor utilizing the functionality available in the AMOM 50'. The department could, if desired, retain the multiple money managers 18-24, from within or from outside the brokerage firm 14. In the case of the MOM 50, the money managers 18-24 only provide individual style models for incorporation into the master overlay model (OM). In the case of AMOM 50' the money managers are retained to trade and work within their respective portions of the single client account. On the other hand, the MOM 50 or AMOM 50' could reside with a global money manager, which could be an entirely separate entity from the brokerage firm 14 and money managers 18-24, or could reside with one of the individual style money managers, such as money manager 20 in FIGS. 1A and 1B. In either case, the single managed client account is managed utilizing the MOM 50 or AMOM 50' in much the same way as a special department within the brokerage firm 14.

The global money manager could also retain other money managers, either from within or outside the firm, to either provide style models or to trade and work within a portion of the single managed client account. However, unlike in the case of the MOM 50 or AMOM 50' residing at the brokerage firm 14, the money manager must forward trade orders to the brokerage firm 14. The executed trades would then flow back and forth between the money manager and the brokerage firm.

It should be understood that, if the MOM 50 resides outside the brokerage firm 14, the BFPMS 32 and MOM 50 would both maintain separate identical client accounts, i.e. the CA and MCA. The BFPMS will often be utilized to monitor the single client account.

Risk Category Determination

In all the architectures of FIGS. 1-1B, as shown in FIG. 5, the advisor 12, working with the investor 10, performs a risk assessment in step 100 to determine the appropriate risk category for the investor. The advisor 12 performs the risk assessment on the investor 10 based on the investor's profile, age, demographics, income, retirement age and other factors well understood by those skilled in the art. Based on the results of the risk assessment, the advisor 12, in step 102, selects the proper risk category. In the exemplary flow depicted in FIG. 5, the advisor selects between risk categories 1-4 that are identified with the reference numerals 104A-104D. There could of course be more or less risk categories considered. For this example, it is assumed that the advisor 12 selects category 1.

In the system architecture of FIG. 1A, the MOM 50 associates each risk category with specific investment products offered by the brokerage firm 14. As shown, category 1 has products 1 and 2, identified with reference numerals 106A and 106B. The other risk categories have associated products 2-8, identified by reference numerals 106C-106H. Here again, is will be recognized that there could be more or less products associated with each category. In step 108, the advisor 12 selects the product from those offered for the selected risk category. In this example, the advisor 12 selects product 1.

Each of the offered products 106A-106H has a predetermined asset allocation. For instance, if the selected risk category is a low risk category, i.e. a category appropriate for an investor with a low risk tolerance, the category might have an asset allocation of 50% for fixed income investment and 50% value investment. On the other hand if a risk category is a higher risk category, i.e. a category appropriate for an investor with a higher risk tolerance, the category might have an asset allocation of 70% or 80% growth investment and 20% or 30% fixed income investment. These asset allocations are predetermined based on the risk for the risk category.

Also each of the products 106A-106H has a group of predefined styles, and money managers for managing the respective individual styles. Accordingly, in the example presented in FIG. 5, the selected product 106A has predefined styles 1-4 and money managers A-D, identified with reference numerals 110A-110D. These same money managers are identified as money managers 18-24 in FIG. 1A. Similarly, the styles 1-4 are the same styles reflected in the style models, i.e. SM1-SM4, which are combined in the overlay model (OM) applied to the managed client account (MCA) shown in FIG. 1A.

In summary, using the FIG. 1A architecture, the selected risk category determines the asset allocation breakdown, and the available products. Selection of the product determines the styles and money managers for these styles. That is, the styles and money managers for the styles are predetermined for each product, and the allocations and offered products are predetermined for each risk category.

It will be recognized that the required use of predetermined allocations, products, styles and money managers in connection with a selected risk category limits the investor/advisor flexibility. Thus, using the architecture of FIG. 1A, the investor 10 cannot choose desired allocations, or styles, or money managers, but is limited to the predefined allocations, styles and money managers. Accordingly, the most suitable allocations, styles and money managers may not be used to meet the personal needs of the investor 10 using the FIG. 1A architecture.

Client Account Establishment, Security Identifier Tagging, and Tracking

As shown in FIG. 6, using the system architecture of FIG. 1A the brokerage firm 14, in step 120, opens the managed client account MCA for the investor 10, with the overlay manager, represented by the master overlay manager (MOM) 50, and makes a deposit of cash, credit and/or securities into the account in step 122. These deposits could be new assets or assets from a previously opened account of the investor 10 with the brokerage firm 14.

The money managers 18-24 and overlay manager coordinate the combination and incorporation of the style models, i.e. SM1-SM4, shown in FIG. 1A, for the individual styles, i.e. style1-style4, shown in FIG. 5, into the overlay model (OM), shown in FIG. 4. In other words, each individual security is tied to one specific style. Accordingly, the OM can be used to trade securities in all of the individual styles and otherwise manage the MCA.

The MOM 50, in step 136, tags each individual security identifier in the OM with its appropriate style. Preferably, the tagged identifier is the ticker symbol for the security, e.g. IBM, CKFR, KO etc. As shown, security identifier A is tagged with a 1 for style 1 and is represented as $SECAID^1$, security identifier B is tagged with a 2 for style 2 and is represented as $SECBID^2$, security identifier C is tagged with a 3 for style 3 and is represented as $SECCID^3$, and security identifier D is tagged with a 4 for style 4 and is represented as $SECDID^4$. No security identifier may be tagged with two styles.

For example, if security identifier A was included in the OM for both style 1 and style 2, security identifier A could not be properly tagged. That is, security identifier A can only be tagged with a single style. Accordingly, security identifier A can only be included in the OM for one style, e.g. either style 1 or style 2, but not both. Since in this example, security identifier A is included in style 1, a different security identifier must be substituted for security identifier A in style 2. Therefore, in creating the OM in step 138, any duplicate securities within different styles must to be eliminated in step 137. As will be discussed further below, in step 130, the MOM 50 prohibits trading in the same security in different styles. Practically, this also means that each model, i.e. SM1 for style 1, SM2 for style 2, SM3 for style 3, and SM4 for style 4, must include only security identifiers unique to that overlay model and which are not duplicated in any other of the models that may be combined with that model.

The MOM 50 initiates trade orders and otherwise transacts the MCA for the investor 10, in step 124. The BFPMS 32 executes these orders, resulting in the purchase and sale of individual securities 126 and a remaining cash balance 128 in the MCA.

The MOM 50 also tracks the performance of the MCA. The MOM 50 tracks the total cash performance for the MCA in step 130. Such tracking may be during its lifetime of the MCA or during a more limited performance period window. The MOM 50 additionally tracks the performance of the securities within the MCA, excluding any cash transactions affecting the performance of that security, in step 132. The MOM 50 combines the cash and security performance numbers in order to compute, and thereby track, the total performance for the MCA, in step 134.

It should be understood that, cash transactions are not tracked on a style-by-style basis, i.e. the cash transactions are only tracked on an entire MCA basis. Thus, the effect of these cash transactions is not reflected in the performance computation for each style. Accordingly, the tracked and reported individual style performance on the account statements generated by the MOM 50 of FIG. 4, may be, and often is, somewhat inaccurate. Therefore, MOM 50 cannot provide the investor 10 with a true style performance, as cash transactions affecting each style are not considered in the performance calculation by the MOM 50.

Additionally, because the OM used by the MOM 50 does not allow duplicate securities across different styles, the MOM 50 restricts the flexibility of each of the money managers 18-24 to select preferred securities for the respective portion of the MCA assigned to its style. Thus, the money managers may be prevented from investing in preferred securities, which could detrimentally affect their performance. Additionally, an individual money manager might even be required to remove certain existing security identifiers from its SM, because the same security identifier exists in another SM. Thus, not only is the MOM 50 unable to accurately assess or report on the performance of the individual money manager styles, the MOM 50 also significantly limits the flexibility of the money managers to control how their respective styles are reflected in the OM. As shown in FIG. 6A, using the system architecture of FIG. 1B the brokerage firm 14, in step 140, opens the managed client account MCA' for the investor 10, with the overlay manager, represented by the alternate master overlay manager (AMOM) 50', and makes a deposit of cash, credit and/or securities into the account in step 142. Once again, these deposits could be new assets or assets from a previously opened account of the investor 10 with the brokerage firm 14.

In step 144A-144D, the individual money managers 18-24 open individual managed trading accounts MTA1-MTA4, as shown in FIG. 1B, to be managed in accordance with their individual style models, i.e. SM1-SM4, as also shown in FIG. 1B, for their individual styles, i.e. style1-style4, shown in FIG. 5. A portion of the MCA' funding is allocated to the MTA1. Although not shown, it will be recognized that allocations are similarly made to MTA2-MTA4.

There is no overlay model (OM). There is also no need for the AMOM 50' to tag individual securities with the applicable style, since each of the money managers use its style model, i.e. SM1-SM4, to trade and manage the one account, i.e. MTA1-MTA4, in its individual styles. Model SM1 for MTA 1 is identified with reference numeral 148. It should be understood that, although not shown, each of the other MTAs opened in steps 114B-144D would likewise be traded and managed based on an associated one of SM2-SM4.

Since each of MTA1-MTA4 is separately traded and managed, security A can be in both MTA1 and MTA2, and hence traded in accordance with the respective models for multiple styles, e.g. both SM1 or SM2. Therefore, duplicate securities within different styles or SMs need not be eliminated. Practically, this also means that multiple models, i.e. SM1 for style 1, SM2 for style 2, SM3 for style 3, and SM4 for style 4, may hold overlapping securities, i.e. securities which are duplicated in another of the models. The MMPMS 36' initiates trade orders and otherwise transacts MTA1 in accordance with SM1 for the investor 10, in step 146. The BFPMS 32 executes the trade orders, resulting in the purchase and sale of individual securities 150 and remaining cash balance 152 in MTA1.

More particularly, the money manager 18 tracks the performance of MTA1. The money manager 18 tracks the total cash performance for MTA1 in step 152. Such tracking may be during its lifetime in the MTA or during a more limited performance period window. The money manager 18 also tracks the performance of the securities within MTA1, including any cash transactions affecting the performance of the securities, in step 156. The money manager 18 also tracks the performance of cash and securities within MTA1 individually, as shown in steps 154 and 156 respectively. The money manager 18 combines the cash and security performance numbers in order to compute, and thereby track, the total performance for MTA1, in step 158. The other money managers 120-124 would also transact and track performance of MTA2-MTA4 in a similar manner. In step 160, the respective tracked performances for MTA1-MTA4 are compiled by the AMOM 50' to track the performance of the MCA', opened in step 140, as a whole. Alternatively, the performance of the MCA' as a whole could be computed by the AMOM 50' using the MCA' record stored at the AMOM 50'. Because both cash and security transactions are tracked on a style-by-style basis, the effect of the cash transactions is reflected in the style performance computation for each style, as well as in the performance computation for the MCA" as a whole. Accordingly, both the tracked and reported individual style performance for MTA1-MTA4 generated by the AMMPMS processors 36B' of each money manager, as shown in FIG. 3, and the total MCA" performance generated by the AMOM processor 50A based either on the MTA1-MTA4 individual style performances, or the MCA' record itself, will be accurate. The investor 10 is thus provided with a true style and total account performance, since cash transactions affecting each style are considered in the performance computations by the respective AMMPMSs 36'. Additionally, because the AMOM 50' does not restrict the inclusion of duplicate securities across different styles, each of the money managers 18-24 is given complete flexibility to manage its respective portion of the MCA' assigned to its MTA. Thus, none of the money managers 18-24 is forced to alter their preferred style, i.e. their preferred SMs, so as to avoid securities that are already held by or included in the SM of another money manger for a different style.

In summary, the AMOM 50' is able to accurately assess and report on the individual performance of each of the money managers and MTAs, as well as the combined performance of all the money managers and the total MCA', without significantly limiting the flexibility of the money managers to manage their respective portions of the MCA'. Since individual securities and cash are tracked in each MTA, accurate performance of each MTA, and the MCA' as a whole, is available, true account performance statements are generated and reported.

The money managers 18-24 are allowed to hold duplicate securities across multiple styles in the MTAs and independently manage its MTA. Each manager therefore has the flexibility to hold and transact whatever securities it desires for its style. Because each individual MTA serves as its own individual silo, the transactions of one money manager are unknown to the overlay manager and to the other money managers, making it difficult to monitor movements of securities within the entire holdings of the individual investor 10. Therefore, avoidance of a wash sale violation across the multiple MTAs, i.e. performing tax-aware trading that takes into account the multiple MTAs, and rebalancing allocations across MTAs, can be difficult.

On the other hand, the architecture of FIG. 1A incorporates the individual styles into one single MCA, which facilitates the monitoring of movements of securities within the entire holdings of the individual investor 10, and thereby makes wash sale avoidance easy. However, this architecture does not provide the money managers 18-24 full flexibility to invest as desired by prohibiting the same security from being held across different styles, and cannot produce true style performance within the MCA.

Rebalancing Security Drift

FIG. 7 further describes the rebalancing MCA function 50A1 performed by the processor 50A of the MOM 50 shown in FIG. 4, in the architecture of FIG. 1A. It should be understood that the processing described in FIG. 7 is performed within the transact MCA step 124 of FIG. 6. As depicted, the overlay model (OM), stored in the memory 50B of the MOM 50, is compared to the with the managed client account (MCA), stored in the database 50C of the MOM 50, by the processor 50A in step 170. In this regard, the processor 50A, in step 170, compares each individual security allocation in OM to the actual allocation of each security in the MCA, and in step 172 calculates the drift between each of these allocations. Based on the computed drift, the processor 50A determines if rebalancing is required in step 174. If not, no further action is required, as indicated by step 176.

If rebalancing is required and the allocation of a security in the MCA exceeds the weighting of that security in the OM, the processor 50A will determine the amount, e.g. the number of shares, to sell down that security from the MCA in step 178. On the other hand, if the allocation of a security in the MCA is below the weighting of that security in the OM, the processor 50A will determine the amount, e.g. the number of shares, of the security to buy into the MCA in step 178. The execution of the applicable trades for the determined amounts of the security to be sold from or purchased for the MCA will re-balance the MCA, and thus the client account (CA) stored at the BFPMS database 32A of FIG. 2 and the custodial client account (CCA) stored in the database 34A of FIG. 1A, back to the OM.

The processor 50A, in step 180, initiates the trade orders and aggregates the orders into a trade block by implementing the generate trade order function 50A5 shown in FIG. 4. The trade block is forwarded to the brokerage firm 14. In step 182 the trades are executed by the brokerage firm 14.

A number of different events could trigger the rebalancing described in FIG. 7. For example, rebalancing might be required due to a change in the OM. Such a change could create drift in the MCA as compared to the modified OM. The change in the OM could, for example, result from a change in the risk tolerance of the individual investor 10. Alternatively, the OM could be changed at the discretion of the overlay manager represented by the master overlay manager (MOM) 50.

Rebalancing might also be required as a result of a deposit or withdrawal from the MCA. Such deposits and withdrawals may, if desired, automatically trigger a rebalancing of the MCA back to the OM. Rebalancing might additionally be required due to market fluctuations. Such fluctuations could be tracked and, if desired, automatically trigger a rebalancing of the MCA back to the OM. The rebalancing for market fluctuation can also be performed periodically, if so desired.

Tax Efficient Trading

FIG. 8 depicts the processing for handling tax efficient trading for an investor 10, using the architecture of FIG. 1A. As shown, in step 185 the investor 10 request, via the financial advisor 12, a tax efficient withdrawal. Such a request could be to sell the most tax-effective lot(s) of specifically identified securities, or to sell the most tax-advantageous lot(s) without identifying the securities. In step 186, the financial advisor 12 requests that the overlay manager, represented by the master overlay manager (MOM) 50 shown in FIG. 4, which manages the managed client account (MCA) stored in database 50C for the investor 10, proceed with a sale of the best tax lots from a tax efficient perspective. Although not shown in FIG. 8, it will be recognized that this request could be a direct request from the advisor 12 to the MOM 50 or could be a request directed via the brokerage firm 14 of FIG. 1A.

Based on the request from the advisor 12, the processor 50A of MOM 50, in step 187, implements the tax efficient trading function 50A2, as also shown in FIG. 4, on the MCA stored in the database 50C, to identify the best securities to sell from that MCA. Typically specific tax lots of individual securities will be identified by the MOM processor 50A. It should be understood that the identified securities may have been selected from any or all of the styles reflected in the overlay model (OM) stored in the memory 50B of the MOM 50 shown in FIG. 4, for the MCA.

The MOM processor 50A, in step 188 implements the generate trade orders function 50A5, as shown in FIG. 4, to generate the trade order(s) to transact the MCA, as indicated in step 124 of FIG. 6, and initiate the tax efficient trades to satisfy the request from the investor 10. The trade order(s) are communicated from the overlay manager to the brokerage firm 14 for execution in step 189. As shown, this communication is made directly from the overlay manager to the brokerage firm 14. In the FIG. 8 processing, the MOM 50 identifies securities from the entire MCA and uses a tax efficient trading tool function 50A2 to trade the MCA, and hence the CA, in the most tax efficient manner for the client. There is no need for the overlay manager to identify the tax efficient securities for selection by the financial advisor 12. Rather, the overlay manager, operating the MOM 50, has all the necessary information to identify and select the best securities to trade, and generates the corresponding trade orders to transact the MCA and forwards the orders to the brokerage firm 14 for execution. FIG. 8A depicts the processing for handling tax efficient trading for the investor 10, using the architecture of FIG. 1B. It should be recognized that a substantially similar process would be required if the architecture of FIG. 1 is utilized.

As shown, in step 190 the investor 10 requests, via the financial advisor 12, a tax efficient account withdrawal. The financial advisor 12, requests, in step 192, that each of the money managers 18-24 managing the managed trading accounts, i.e. MTA1-MTA4, for the investor 10, determine the best tax lots to sell from a tax efficient perspective. Although not shown in FIG. 8A, is will be recognized that this request could be a direct request from the advisor 12 to the money managers 18-24 or could be a request directed via the brokerage firm 14 and/or overlay manager represented by the alternate master overlay manager (AMOM) 50' in FIG. 1B.

Each of the money managers 18-24 has an associated AMMPMS 36', as shown in FIG. 3, with one of MTA1-MTA4 stored in the database 36A. Based on the request from the advisor 12, each of the AMMPMS processors 36B, in steps 194A-194D, implements the tax efficient trading function 36B2, as also shown in FIG. 3, on the MTA stored in the database 36A to determine the best securities to sell from that MTA and identifies these securities for the financial advisor 12. It will be recognized that most typically specific tax lots of individual securities will be identified by the AMMPMS processors 36B.

The money managers 18 and 24, in steps 196A and 196B, then select the securities to be sold from those identified by the respective MMPMSs 36'. It should be understood that although, in the exemplary implementation shown in FIG. 8A, securities have been selected from those identified in two of the MTAs, i.e. MTA 1 and MTA4, in practice securities could be selected from more or less of the MTAs depending on the particular situation.

The applicable processors 36B, in steps 198A and 198B implement the generate trade orders function 36B5, as shown in FIG. 3, to generate the trade order(s) to transact MTA1 and MTA4, as shown in step 146 of FIG. 6A, and initiate the tax efficient trades to satisfy the request from the investor 10. The trade order(s) are communicated from the money manager(s) to the brokerage firm 14 for execution in step 199. This communication may be made directly from the money managers 18 and 24, who are responsible for MTA1 and MTA4, or may be via the overlay manager represented by the AMOM 50'. However, this may not be the most optimal tax sale for the investor 10.

Wash Sale Monitoring

Referring now to FIGS. 1A and 4, the process for monitoring wash sale violations will be described for the architecture of FIG. 1A. As shown in FIG. 1A, the master overlay manager (MOM) 50 manages the single master client account (MCA) stored in the MOM database 50C, and initiates all trading associated with the MCA. The MOM 50 manages the MCA in accordance with the overlay model (OM) stored in the MOM memory 50B. The OM represents a combination of the individual style models, i.e. SM1-SM4, of the money managers 18-24. Thus, the MOM 50 transacts the MCA. A wash sale violation will only occur if the MOM 50 initiates both a sale and a purchase of the same security in a restricted time period. Such situations are easily monitored by the MOM processor 50A implementing the MCA wash sales function 50A3. For example, the MOM 50, executing function 50A3, will ensure that, after initiating a trade order to sell IBM on December 1 at a loss, no trade order to buy IBM is initiated within a restricted period of say 31 days, e.g. on December 29, thereby avoiding a wash sale violation for the investor 10.

Referring to FIGS. 1A and 4, the FIG. 1A architecture can easily monitor and avoid wash sale violations because all transactions, including all trade orders, are initiated by the single master overlay manager (MOM) 50, and no two styles are allowed to have the same security, e.g. IBM securities are only allowed to be held and transacted in one style, e.g. style 1. Hence, if a loss is harvested by selling IBM securities on December 1, and according to the overlay model OM, IBM securities are to be purchased on December 29 of the same year, the processor 50A of MOM 50 will execute the MCA wash sales function 50A3 to check for a sale of IBM securities within the restricted period before initiating a purchase of IBM securities. Since MOM 50 initiated the sale of IBM securities on December 1, it will not initiate the December 29 purchase of IBM securities, thus avoiding the wash sale violation.

Furthermore, because IBM can only be held and transacted in style 1 based on the tagging in the OM, no wash sale violation is likely pursuant to an IBM purchase required by another style represented in the OM. An exception is if one money manager, e.g., money manager A 18, were to eliminate IBM from the style model being managed, e.g., SM!, and another money manager, e.g., SM2 within a wash sale violation period. Thus, the MOM 50 needs to typically only consider transactions associated with a single style in monitoring potential wash sale violation.

Referring now to FIGS. 1B, and 3, the process for monitoring wash sale violations will be described for the architecture depicted in FIG. 1B. As shown in FIG. 1B, the alternate master overlay manager, i.e. AMOM 50' overlays multiple independently trading accounts, i.e. MTA1-MTA4; which are separately managed by money managers 18-24. Each of the money managers 18-24 self directs and transacts its individual MTA utilizing the MMPMS 36' shown in FIG. 3. As a result, a sale by one money manager for one of the MTAs and a purchase by another money manager for another of the MTAs may result in a wash sale violation.

Such situations are difficult to monitor. For example, if money manger 18 initiates a trade order to sell IBM from MTA1 on December 1 at a loss, and money manager 24 initiates a trade order to buy IBM for MTA4 within, for example, 31 days, i.e. on December 29, a wash sale violation for the investor 10 would result. Since the money managers 18-24 initiate all transactions independently, and the MCA' stored in the AMOM database 50C is merely a compilation of MTA1-MTA4, the AMOM 50' is incapable of monitoring these transactions, except to the extent that the individual money managers either promptly report the transactions to the AMOM 50' or are required to forward all initiated trade orders to the brokerage firm 14 via the AMOM 50'.

Rebalancing Cross Style Drift

Referring now to FIGS. 1A, 4, 6 and 7, the process for monitoring drift will be described for the architecture of FIG. 1A. As depicted in FIG. 1A, master overlay manager, i.e. MOM 50 shown in FIG. 4, manages the single master client account (MCA) stored in the MOM database 50C, and initiates all trading associated with the MCA. The MOM 50 manages the MCA in accordance with the overlay model (OM) stored in the MOM memory 50B, which represents a combination of the individual style models, i.e. SM1-SM4, of the money managers 18-24.

As a result, as described with reference to FIG. 6, MOM processor 50A implements the MCA cross style drift function 50A4 by first monitoring drift over the entire account. That is, the MOM processor 50A computes the security drift in step 172 of FIG. 7, on a security-by-security basis by comparing each of the securities in the MCA to the target for that security in the OM.

The processor 50A then implements the rebalance MCA function 50A1 to perform to perform steps 174 and 178 of FIG. 7, and thereby rebalance the MCA by reducing or eliminating the computed security drift.

However, the MOM 50 is incapable of accurately monitoring cross style allocation drift of the MCA from the cross style allocation set forth in the OM, or of rebalancing across styles, since it does not contain style-specific cash buckets and thus cannot calculate accurate asset valuations for each style. Rather, the MOM 50 only monitors and rebalances on a security-by-security basis within the MCA with respect to the individual security targets in the OM.

Referring now to FIGS. 1B and 3, the process for monitoring drift will be described for the architecture of FIG. 1B. As depicted in FIG. 1B, each of the individual money managers, represented by MMPMS 36' shown in FIG. 3, independently manages the single managed trading account (MTA1-MTA4 stored in the MMPMS database 36A, and initiates all trading associated with the applicable MTA. Each MMPMS 36' manages its MTA in accordance with the style model, i.e. SM1-SM4, of the applicable one of the money managers 18-24, stored in the MMPMS memory 36C.

As a result, the processor 36B of each MMPMS 36' implements the drift function 36B4 to monitor drift over the applicable MTA. That is, the MMPMS processor 36B computes the drift, on a security-by-security basis by comparing each of the securities in the applicable MTA to the target for that security in the applicable SM. The processor 36B then implements the rebalance MTA function 36B1 to rebalance the MTA by reducing or eliminating the computed security drift. Since each of the styles is managed independently by a separate money manager, and in accordance with a different SM, the MMPMS 36' is incapable of monitoring drift across styles, i.e. drift across MTA1-MTA4, or rebalancing across style drift. Rather, the AMOM 50' could potentially monitor across style performance or value differences for MCA' using the information provided by the separate MMPMS 36' reports for MTA1-MTA4. However, AMOM 50' does not currently include such functionality. If it did, the AMOM 50' has no overlay model or management functions, and therefore still could not determine drift or initiate trades to rebalance across styles within the MCA'.

Thus, in the FIG. 1B architecture, drift is monitored only within separately managed accounts. Each money manager, using its MMPMS 36' can produce drift reports for the MTA it manages for the investor 10. For example, money manager 18, using its MMPMS 36', would determine drift for MTA1 and rebalance MTA1 to SM1 if necessary, and money manager 20, using its MMPMS 36', would determine the drift for MTA2 and rebalance MTA2 to SM2. To rebalance an individual MTA, the trade orders generated by the applicable MMPMS 36' are separately forwarded to and executed by the brokerage firm 14. There would be no movement of assets between MTA1-MTA4. Any asset allocation rebalancing across MTAs must be performed manually.

Therefore, if the value of MTA1, managed by money manager 18, has increased to a value exceeding the originally allocated value of MTA1, the additional value would remain in MTA1, and none of the assets of MTA1 would be moved to MTA2-MTA4.

Cash Deposit Allocations

As discussed above with reference to FIGS. 5 and 6, in the FIG. 1A architecture, a cash deposit of $10,000 made by the investor 10 is allocated to a single overlay manager, represented by the master overlay manager (MOM) 50, and hence, to the single managed client account (MCA). The MOM 50 enters the $10,000 into the MCA, shown in FIG. 4.

The overlay model (OM), shown in FIG. 4, does not perform any further allocations of the $10,000 cash deposit. Rather, the MOM 50 uses the cash deposit to transact the MCA in accordance with the OM, e.g. to purchase securities in the various styles, i.e. Style1-style4, for the MCA. The individual money managers 18-24, whose style models SM1-SM4 form the OM, do not participate in the transacting of the MCA or the allocation of the $10,000 deposit.

Furthermore, there is no discretion for the MOM 50 to make cash allocations of portions of the $10,000 cash deposit to each of the styles reflected in the OM or to the money managers 18-24 to trade individually. Rather, the cash is entered and retained in the MCA by the MOM 50 as a single cash pool, and is not associated with any particular style. The MOM 50 then draws from this single cash pool as required to transact style1-style4 in accordance with the OM.

As discussed above with reference to FIG. 6A, in the FIG. 1B architecture, cash deposits are allocated amongst the multiple managed trading accounts, i.e. MTA1-MTA4. For example, a $10,000 deposit made by the investor 10 could, for example, be divided such that $3,000 is allocated to MTA1 and managed by money manager 18, $2,000 is allocated to MTA2 and managed by money manager 20, $4,000 is allocated to MTA3 and managed by money manager 22, and $1,000 is allocated to MTA4 and managed by money manager 24. Each of the managers 18-24 enters the applicable cash allocation as a deposit into its associated MTA for the investor 10 and uses the allocated cash to transact the MTA, e.g. to purchase securities for the MTA.

Maintaining Cash Balances

In the architecture of FIG. 1A the overlay manager, which as shown in FIG. 4 is represented by the master overlay manager (MOM) 50, manages a single managed client account (MCA) in accordance with a single overlay model (OM). Therefore, as shown in FIG. 6, cash is maintained as a single pool of cash, or within what can be characterized as a single cash bucket. Securities are likewise maintained as a single pool of securities, or within what can be characterized as a single securities bucket, even though there are multiple styles reflected in the OM.

Hence, in the FIG. 1A architecture, each individual style, e.g. style1-style4, does not have its own individual cash balance. Instead, the incorporation of the multiple styles into a single MCA for the investor 10 results in the MOM 50 being able to generate only a single cash balance for the entire MCA. Thus, the MOM 50 is incapable of maintaining a division of cash among the different styles reflected within the OM.

On the other hand, in the architecture of FIG. 1B cash balances, as well as securities, are maintained within each of the managed trading accounts, i.e. MTA1-MTA4, by the money managers 18-24. Therefore, as discussed above with reference to FIG. 6A, there are for cash balances, one associated with each of MTA1-MTA4, for the single client managed account (MCA') at the AMOM 50' shown in FIG. 4.

Rebalancing Style Allocations in Multiple Managed Client Accounts (MCAs)

As discussed above with reference to FIGS. 4 and 5, using the FIG. 1A architecture, the initial allocations are set based on the selected product 106A-H. Although the initially established allocations may change from time-to-time, the current allocations are applied to the managed client accounts (MCAs) for all investors which are managed in accordance with the applicable overlay model (OM). Thus, the MCAs are always rebalanced back to that current allocation in accordance with the applicable OM. FIG. 11 depicts OM 220, which could serve as the OM shown in FIG. 4, having an allocation 224 across the styles 222. The styles 222 correspond to style1-style4 depicted in FIG. 5. An exemplary computation of security drift and determination as to whether or not rebalancing is required, as performed in steps 172 and 174 of FIG. 7, will be described below with reference to FIG. 11.

As shown, the OM 220 has an allocation 224 of 40% value, 30% growth, 20% small cap, and 10% large cap.

The master overlay manager (MOM) 50, as shown in FIG. 4, opens MCAs to be managed under the OM at the designated allocations. Hence, the MCA1 for investor 10, identified with reference numeral 226, is opened on a particular date with the styles 222 and an actual allocation 228 of 40% value, 30% growth, 20% small cap, and 10% large cap. As time elapses, the allocations between these four styles in the MCA1 for investor 10 will fluctuate as indicated by block 230. The values of the securities within the individual styles will move in line of stock market or other fluctuations. We will assume, for purposes of this example, that after 30 days the actual allocations 228A of styles 222 in the MCA1 226 for investor 10 fluctuate to 45% value, 28% growth, 17% small cap and 10% large cap.

MCA2 232 for another investor, i.e. an investor other than investor 10, is opened on the 30th day a after the opening of MCA1 226, with an actual allocation 234 for the styles 222 of 40% value, 30% growth, 20% small cap, and 10% large cap, which of course is identical to the OM allocation. As time elapses, the allocations between these four styles in MCA2 for this other investor will also fluctuate, in line of stock market and/or other fluctuations.

Therefore, although MCA1 226 and MCA2 232 are subject to management by the MOM 50 using the same OM 220, MCA1 226 will have a different actual allocation than MCA2 232 on the $30^{th}$ day after opening MCA1 226. That is, 30 days after the opening of MCA1 226 for investor 10, MCA1 will have actual allocations 228A of 45% value, 28% growth, 17% small cap and 10% large cap while the MCA2 232 for the other investor will have actual allocations 234 of 40% value, 30% growth, 20% small cap, and 10% large cap, even though both of these MCAs are managed in accordance with the same OM 220. As noted above, differences in allocations between MCAs for different investors may also occur at any particular time because of varying account activities, such as different deposits being made by different investors during the lives of the MCAs.

Hence, the MOM 50 determines, in 236, that the actual allocation 228A for MCA1 226 must be rebalanced in 236, back into line with the OM allocation 224, and performs the rebalancing i.e. from 45% value, 28% growth, 17% small cap and 10% large cap to 40% value, 30% growth, 20% small cap, and 10% large cap, in block 240. It also determines, in 238, that no rebalancing of the actual allocation 234 for MCA2 232 is required and hence does nothing with the MCA2 232 current actual allocation 234 as indicated by block 242.

Similarly, MCAs associated with other investors (not shown) may not require any rebalancing or may require a different rebalancing from that of MCA1 226. As indicated above, the different rebalancing may be required either because such other MCA was opened at a different time than MCA1 226, or was subject to account activity different than that to which the MCA1 226 was subjected.

Thus, on the $30^{th}$ day after the opening date of MCA1 226, multiple MCAs managed under the same OM 220 will often need to be rebalanced from different current actual allocations back to the OM allocation 224, i.e. back to 40% value, 30% growth, 20% small cap, and 10% large cap. This will in turn require a substantial number of different trades, and accordingly substantial processing by the MOM 50, to bring the allocations of each of the MCAs for the different investors which are managed according to the same OM, e.g. OM 220, back into line with the allocation 224 set forth in the OM.

In summary, a single OM is typically used for multiple MCAs of different investors, which can number in the thousands or even tens of thousands. Each of these MCAs may be subject to a different allocation drift during regular reporting periods, such as the 30 day period referenced above, due to varying opening dates or account activity. Accordingly, many of the MCAs will often need to be separately rebalanced back to the OM allocation every reporting period. This results in a significant amount of processing by the MOM to determine if each MCA needs rebalancing and to initiate different trades to rebalance different MCAs. Furthermore, this will also result in a significant amount of trading by the brokerage firm 14 being required. The trading may in turn result in additional tax issues for the investors.

It should also be recognized that, in the architecture shown in FIG. 1A, because of a need to maintain the OM allocation across the multiple styles for many MCAs, the MOM 50 rebalances allocations, without consideration of factors which may be relevant to an individual investor. For example, it may be beneficial for the allocation to follow a particular investment trend over a period of market activity or for the allocation to be varied from the current OM allocation to avoid a high number of trades or tax consequences that might otherwise result in bringing the current actual allocation in line with the original OM allocation. However, this is not possible in the FIG. 1A architecture because the style allocation in the OM are fixed and the number of OMs are finite.

The Overlay Model and Managed Client Account

FIG. 9 further details an exemplary overlay model 200, suitable for use in the FIG. 1A architecture. As discussed above with reference to FIG. 6, the overlay model is created with the security identifiers tagged with a single style indicator. This tagging allows the master overlay manager (MOM) 50 to track the securities that are purchased for or sold from the managed client account (MCA) on a style-by-style basis for the multiple styles, i.e. style1-style4.

As shown, the overlay model 200, and discussed with reference to FIG. 6, combines multiple style models, i.e. SM1-SM4, for multiple investment style1-style4. Within each of the SM's incorporated in the OM is a list of security identifiers, e.g. IBM, CKFR, KO, PFE, C, F, T, and GM etc., along with a percentage weight, e.g. 5%, 4%, 8%, 1%, 2% and 3% etc., for each of the identified securities. The identifier for each security is preferably the symbol utilized by the stock exchange on which that security is traded. However, this is not mandatory. Each security identifier is tagged, or otherwise associated with, the specific style of the model from which it originated, and thus to a specific one of styles 1-4 being utilized by the overlay manager to manage the MCA for investor 10. As shown, IBM and CKFR are tagged with the superscript 1 and thereby associated with style 1, KO and PFE are tagged with the superscript 2 and thereby associated with style 2, C and F are tagged with the superscript 3 and thereby associated with style 3, and T and GM are tagged with the superscript 4 and thereby associated with style 4.

In the FIG. 1A architecture, an identified security can only exist in one individual style model. Duplicate securities across different style models are not allowed in the overlay model 200. As a result, when the MCA is transacted in step 124 of FIG. 6, the tax lots of each security purchased for or sold from the MCA can be associated with the appropriate style since the security identifier for the securities is associated with only one style reflected in the OM. Thus, a purchase of IBM securities for the MCA will necessarily be associated with style 1 by the MOM 50, because the IBM security identifier in the OM is tagged to style 1. On the other hand, a sale of GM securities from the MCA will necessarily be associated with style 4 by the MOM 50, because the GM security identifier in the OM is tagged to style 4. Thus, each tax lot of securities can be associated by the MOM 50 to an individual investment style reflected in the OM, because the OM prohibits the purchase or sale of such securities for any style except the style to which the identifier for those securities has been tagged. Therefore, all transactions relating to a particular identified security, such as IBM, will be tracked by the MOM 50 in the style with which the identifier of the security is tagged in the OM. The MOM 50 will prohibit any style incorporated in the OM, other than SM1, from including the IBM identifier, thereby prohibiting transactions in IBM securities in other styles.

FIG. 9A further details an exemplary managed client account (MCA) 202, suitable for use in the FIG. 1A architecture. As discussed above with reference to FIG. 6, the MCA 202 includes the information necessary to track security performance on a style-by-style and total client account basis.

As shown, the MCA 202 includes a listing of the securities within the MCA. As indicated, the MCA includes 100 shares of IBM, purchased as tax lot KTFC on Jan. 3, 1985, and 50 shares of CKFR, purchased as tax lot CHFP on Jan. 5, 2003, etc. The MCA also includes a cash listing showing $10,000. Using the tagged identifiers in the OM, the MOM processor 50A, of FIG. 4, can retrieve the information from the MCA and associate each of the securities represented in the MCA with a particular style. This information is processed by the MOM processor 50A by executing the generate MCA statement function 50A6, to compute the performance results for the MCA, and hence CA, as a whole, as well as the performance results for the securities in the individual styles. As noted above, the individual style performances results will be somewhat inaccurate due to the lack of consideration of the cash transactions on a style-by-style basis.

Tracking Security Movement and Account Performance

FIG. 10 depicts the process performed to initiate trades in the FIG. 1A architecture. In step 204, the investor 10 requests a purchase or sale of securities, typically via the financial advisor 12. In the example shown, the financial advisor 12 forwards a request to sell 50 shares of IBM and 20 shares of KO from the managed client account (MCA) 202, from the 100 shares of IBM and 50 shares of KO in the MCA, as shown in FIG. 9A and recorded in the database 50C of the master overlay manager (MOM) 50 depicted in FIG. 4. The selection of the IBM and KO could have been included in the investor's request if so desired.

In accordance with the OM 200 used for the MCA 202 of investor 10, IBM securities can only be held and transacted in style 1 and KO securities can only be held and transacted in style 2. Hence, any purchase or sale request must necessarily be limited, in the case of IBM to style 1, and in the case of KO to style 4, because these securities can only be held and transacted in those styles. The MOM processor 50A can thereby track the sale of the IBM securities as a sale from the portion of the MCA 202 managed under style 1 and the sale of the KO securities as a sale from the portion of the MCA 202 managed under style 2. The MOM processor 50A, in step 210, implements the generate trade order function 50A5 to initiate trade orders to sell the 50 shares of IBM securities and the 20 shares of KO securities from the MCA 202 of FIG. 9A. The brokerage firm 14, in step 212, executes the trade orders.

As described with reference to FIGS. 9, 9A and 10, in the architecture of FIG. 1A the overlay manager, represented by the master overlay manager (MOM) 50 shown in FIG. 4, generates reports on the performance of both the individual styles reflected in the overlay model (OM) as well as on the entire managed client account (MCA). However, as discussed with reference to FIGS. 9, 9A and 10, security identifiers, such as IBM, are tagged with the style in which they are to be transacted. The securities are then purchased and sold based on trade orders initiated by the MOM 50 in accordance with the OM. However, such purchases and sales are not tracked on a style-by-style basis.

Because each security identifier, e.g. IBM, KO etc., within each style in the OM is tagged to its applicable style and the MOM 50 prohibits a security identifier from being tagged to more than one style, the performance of securities currently in an MCA can be tracked on a style-by-style basis. However, the tracked performance for each individual style will not be accurate.

For example, as shown in FIG. 12, money manager A, identified in FIGS. 1A and 12 with reference numeral 18, who is responsible for the style model for stylet, i.e. SM1, which is incorporated in the OM 200 shown in FIG. 9, requests, in step 250, that the master overlay manager (MOM) 50 remove IBM from style1 of the OM 200. Money manager D, identified in FIGS. 1A and 12 with reference numeral 24, who is responsible for the style model for style4, i.e. SM4, which is also incorporated in the OM 200, requests, in step 252, that the MOM 50 add IBM to style4 of the OM. The MOM 50, in step 254, retags the IBM identifier in the OM 200 from IBM$^1$ to from IBM$^4$ in accordance with the requests from money managers 18 and 24.

Practically, this results in IBM securities residing in the managed client account (MCA) shown in FIG. 9A, being removed from style1 and being added to style4. Furthermore, it is unnecessary to trade the IBM securities from the MCA. Rather, the existing IBM securities which were previously associated with style1 in the OM 200 remain in the MCA, but are now associated with style4 in the OM 200. However, because there is no movement of or change to the IBM securities in the MCA, there is also no way for the MOM 50 to track the performance ramifications of the removal of the IBM securities from style1 of the OM 200 and addition of these securities to style4 of the OM 200. Therefore, the computed performance of the MCA for both style1 and style4 will necessarily be skewed because there internal transaction of the IBM securities is not tracked.

It should also be recognized that, since the MOM 50 maintains a single cash bucket, as discussed above, it is also incapable of tracking cash movements for the MCA on a style-by-style basis. Without the ability to track cash deposits and withdrawal on a style-by-style basis, the MOM 50 cannot compute the actual cash performance on a style-by-style basis.

Hence, for both the above reasons, the MOM 50 is incapable of accurately calculating and reporting performance of the OM 200 on a style-by-style basis. The MOM 50 can, however, accurately compute and report on the total MCA performance. Thus, in moving from the multiple trading account architecture to that of FIG. 1B, the ability to track individual style performance has been lost.

In the architecture depicted in FIG. 1B, both the tracking of the movement of securities within a particular MTA and the computation of the performance of that MTA is performed by the money manager 18-24 responsible for that MTA. The respective performances of MTA1-MTA4 may be compiled in a single managed client account (MCA') performance by the overlay manager represented using the AMOM 50', as shown in FIG. 4.

Because each of the MTAs is separately managed, the applicable money manager completely controls the single style model (SM) according to which the MTA is managed and the transacting of the MTA. Therefore, each money manager can easily track the movements of securities and cash into and out of the MTA it manages for the investor and the performance of that MTA. The performance of the MTA is typically tracked to a finite or granular level sufficient to provide a true performance of the MTA. Since each MTA represents one style, the performance of each style is accurately tracked.

For example, if MTA1, as shown in FIG. 1B is a growth account, MTA2 is a value account, MTA3 is a fixed income account, and MTA4 is a small cap account, movements of securities and cash into and out of each of MTA1-MTA4 are separately tracked. Because both cash and securities movements are accurately tracked, the total account performance of any of the MTAs can also be accurately tracked. With respect to securities, it will be recognized by those skilled in the art that the movement of securities into and out of a particular MTA will contribute to the MTA performance. Therefore, as securities are bought for and sold from an MTA, the dates and price at which these securities are bought and sold is tracked.

Movements of a security from one MTA to another, and therefore from one style to another, can be tracked in two different ways using the FIG. 1B architecture. A first way is to sell the security, e.g. IBM out of one account, e.g. MTA1, and buy the same security into another account, e.g. MTA2. In so doing, IBM securities will be moved out of the one style and into another style. However, selling the same security from MTA1 and buying it into MTA2 for the same investor 10 results in potential problems and inefficiencies.

One such problem is that investor 10 may suffer negative tax consequences due to the buying and selling of the same security. For example, there is a potential for a wash sale violation, as has been discussed above. Additionally, selling IBM for a short term gain from MTA1, as desired by money manager 1B, may be less beneficial to the investor than retaining IBM in MTA1 and subsequently selling it for a long term gain, in view of the desire of money manager 20 to buy IBM into MTA2. Another problem is that the sale from MTA1 and purchase into MTA2 of IBM will result in trading for the brokerage firm 14, and additional work for money manger 18 who manages MTA1 and money mangers 20 who manages MTA2.

A second way to move securities between styles is to simply deliver securities, e.g. IBM securities, from one managed trading account, e.g. MTA1, into another managed trading account, MTA2, without actually trading the securities. However this requires coordination between two different money managers, e.g. money manager 18 for MTA1 and money manager 20 for MTA2. This would have also required coordination with the brokerage firm 14 to coordinate the movement from one custodial trading account, e.g. CTA1, to another custodial trading account, e.g. CTA2, as shown in FIG. 1.

Thus, delivery of securities from one MTA to another MTA is possible using the FIG. 1B architecture, including movements of securities between MTAs if a particular type of to security is to be eliminated from one MTA style model, e.g. from MTA1, and added to another MTA, e.g. MTA2. However, to do so requires coordination between the money managers for the applicable MTAs and the overlay manager represented by AMOM 50'.

In summary, using the architecture of FIG. 1B, cash and security deposits and transactions for each MTA, as well as the individual performance of each MTA, can be accurately tracked and reported by the applicable MMPMS 36' shown in FIG. 3. The individual MTA performances can be compiled by the AMOM 50' of FIG. 4 to provide an accurate total client account performance. Thus, individual style performance as well total investor account performance can be accurately tracked and reported to the investor 10 using the FIG. 1B architecture.

Netting Security Transactions

In the FIG. 1A architecture, the master overlay manager (MOM) 50 of FIG. 4 is incapable of netting different transactions in a particular type of security, such as IBM, except in the case where the security is to be completely eliminated from one style type and added to another of the style types at the same time.

As discussed above with reference to FIG. 6, a security identifier, e.g. in this case we will use IBM, is initially tagged with a style1 indicator. Accordingly, IBM securities may only be included in style1 of overlay model (OM), such as OM 200 shown in FIG. 9.

As described with reference to FIG. 12, the MOM 50 may, if desired, retag the IBM identifier in the OM 200 with a style4 indicator, if IBM is to be removed from style1 and added to style 4 in OM 200. By performing this retagging, the 100 shares of IBM represented in the MCA 202 of FIG. 9A will tracked as part of the style4 securities portfolio, rather than the style1 securities portfolio of investor 10. It will be noted that no change has been made to the MCA shown in FIG. 9A.

Since the MOM 50 prohibits IBM from being tagged with more than one style at any given time, if only 50 shares of IBM securities are to be removed from the style1 portfolio represented in the MCA 202, these shares could not be transferred to the style4 portfolio represented in the MCA 202. That is, in order to transfer only 50 of the 100 shares of IBM in the MCA to style4, the IBM identifier would need to be tagged with both style1 and style4 in the OM 200, and this is prohibited. The MOM 50 cannot track IBM securities in multiple styles. Therefore, only if the 100 shares of IBM securities are completely from the style1 portfolio in the MCA thereby allowing the style1 tag removed from the IBM identifier in the OM, can the IBM identifier be retagged with another style identifier, such as the style4 tag, and some or all of these shares of IBM securities in the MCA be moved to the style4 portfolio in the MCA.

Thus, the architecture of FIG. 1A also does not accommodate a netting of trades in a single security type, such as in shares of IBM securities, since trades in the same type of security, e.g. IBM securities, under different styles are not allowed. The architecture therefore limits the flexibility of the money managers 20-24 for styles 2, 3, and 4 to include IBM securities in the style models SM2-SM4 that are incorporated into the OM or to buy IBM securities until IBM is removed from style 1 in the OM.

Using the architecture of FIG. 1B and as discussed above with reference to FIG. 6A, the individual money managers 18-24 initiate transactions and exclusively manage the respective MTAs. Thus, two different money managers may initiate different trade orders to transact the same type of security, e.g. in this case IBM, for different MTAs at any time.

For example, money manager 18, via its MMPMS 36', could initiate a trade order to sell 50 shares of IBM securities from MTA1 of investor 10, while at substantially the same time, money manager 24, via its MMPMS 36', could initiate a trade order to buy 100 shares of IBM securities for MTA4 of investor 10. Trading in the same type security, i.e. IBM in this example, for the same investor managed client account (MCA') on the same day will necessarily result in inefficiencies. However, in the architecture of FIG. 1B, such inefficiencies are very difficult to avoid, since money manager 18 independently initiates the sale of the 50 shares of IBM securities and money manager 24 independently initiates the purchase of the 100 shares of IBM securities.

These two separate transactions could potentially be netted to a single transaction, since a net buy of 50 shares of IBM securities for MTA4 is all that is required to fulfill both the desired sale by money manager 18 and the desired purchase by money manager 24. However, this requires that the 50 shares of IBM securities in MTA1 be moved from MTA1 to MTA4. Since money mangers 18 and 24 transact MTA1 and MTA4 independent of each other, and communications between the money managers 18-24 rarely, if ever, occur, such movements of securities between MTAs has proven to be impractical.

Thus, using the architecture of FIG. 1B, transactions in the same security type, such as in IBM, initiated by different money managers are typically not netted, and therefore may be performed inefficiently using multiple trades when only one trade is actually necessary. The multiple trades may in turn subject the investor 10 to undesirable tax consequences and additional brokerage firm costs. However, this has been accepted as a cost of providing individual money managers with control over the management and transacting of accounts pursuant to their respective style models.

Account Management Flexibility

Using the architecture of FIG. 1A a single client account (CA) and corresponding managed client account (MCA) exists. The MCA is transacted and otherwise managed exclusively by the overlay manager represented by the master overlay manager (MOM) 50, in accordance with the overlay model (OM) which is a combination of the style models (SM1-SM4) of the multiple money managers 18-24.

The individual money managers 18-24 are prohibited from trading or otherwise transacting or managing the MCA. Hence, the only involvement of each of the money managers 18-24 is in providing its SM for incorporation into the OM. The MOM 50 initiates all the trading and other transactions, and performs all reporting on the MCA. The money managers 18-24 can, and do from time to time, make changes to SM1-SM4 and forward these changes to the overlay manager. However, although these changes may reflect a desire of a money manager that the MCA be transacted, the money managers cannot initiate the desired transactions, and must instead rely on the discretion of the overlay manager, represented by the MOM 50, to perform in a timely manner the desired transactions. In practice, a money manager is not advised as to when, or even if, such desired transactions are initiated. Yet, the money manager remains subject to being judged on the performance of the relevant portion of the MCA. Accordingly, the architecture of FIG. 1A, with its single MCA for the investor 10, substantially reduces the management flexibility of the individual money managers, limits the ability of the individual managers to report on, or even track, style performance, and eliminates the ability of individual money managers to trade within the portion of the MCA subject to its style model. Thus, the control over the management and transacting of the MCA is effectively removed from the money managers and given to the overlay manager.

Using the architecture of FIG. 1B, the individual managers 18-24 have total control over the management and transacting of the individual managed trading accounts, i.e. MTA1-MTA4, of the investor 10. Each money manager has complete flexibility in trading its individual MTA.

For instance, money manager 18 has exclusive control over the transacting of MTA1 for investor 10. Thus, money manager 18 can, if desired, add 2% of IBM securities to MTA1 by simply modifying SM1 and initiating, via its MMPMS 36' as shown in FIG. 3, a purchase of the addition 2% of IBM securities. Money manager 18 could also independently adjust MTA1 by selling and/or buying individual securities which are not mandated by SM1. Money manager 18 can perform tax efficient trades using the MMPMS 36', as previously discussed, although the tax effectiveness would not consider other managed trading accounts, i.e. MTA2-MTA4, of the investor 10. Thus, money manager 18 manages MTA1 independently from the other money managers 20-24, and has full discretion over MTA1.

Additionally, money manager 18, using its MMPMS 36', can generate all MTA1 specific reports, and can accurately track the performance of MTA1 and movements of the specific holdings within MTA1. Because money manager 18 has complete and accurate information regarding MTA1, it can also accurately perform all desired analysis relating to MTA1.

Accordingly, the architecture of FIG. 1B, with its multiple MTAs for the investor 10, provides complete management flexibility to the individual money managers, provides the individual managers with the ability to accurately report on and accurately track style performance, and provides the individual money managers with the ability to trade within a MTA. Thus, the control over the individual MTAs effectively remains with the money managers and is not given to the overlay manager. However, since control is decentralized, the FIG. 1B architecture lacks various benefits provided by the centralized control in the FIG. 1A architecture, specifically: a single custodial account, across-style rebalancing, a single point of trading control, tax-efficient trading across styles, and the ability to identify and prevent wash sale violations.

OBJECTIVES OF THE INVENTION

It is an objective of the invention to overcome one or more of the above-described problems. Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with one aspect of the present invention, transactions are recorded in an investment account having associated assets, transacted in accordance with a plurality of different investment styles, typically represented by style models developed by individual money managers, at different transaction times. The assets include, but not limited to, cash and securities. For example, such assets can also include bonds, mutual funds or other financial instruments. The different investment styles may be associated with different investment philosophies and categories of securities, e.g. value, growth, small cap, large cap, etc.

The transactions may be of various types including, but not limited to, purchases and sales of shares of securities, e.g. shares of IBM stock, and movements of cash, e.g. dollars, euros, yen, and shares of securities between styles within the investment account. The investment account may be stored in a database, and identified within the database with an account identifier. The database may reside on a storage device, which may be part of or associated with a mainframe, workstation, desktop or other types of computing devices.

Assets associated with the investment account may include shares of different securities, e.g. shares of IBM stock, CheckFree stock, GE stock, and GM stock, allocated to one or more investment styles in the investment account. A transaction of the assets initiated may involve a portion of the shares of securities, such as a portion with only shares of the IBM and CheckFree stock. In such a case, the initiated transaction may indicate (i) a sale of shares of a security, e.g. shares of IBM stock, included in that portion of the shares of securities, i.e. that portion with only shares of the IBM and CheckFree stock, or (ii) a movement of shares of a security, e.g. shares of CheckFree stock, included in that portion of the shares of securities, e.g. that portion with only shares of the IBM and CheckFree stock, to another portion of the shares of securities, such as a portion with only shares of the GE and GM stock, which is transacted in accordance with another of the plurality of different investment styles, e.g. the growth style.

In accordance with another aspect of the present invention, a cash deposit into such a multi-style investment account and a request for a cash withdrawal from the multi-style investment account are handled differently but efficiently across the different investment styles in the investment account. When cash is deposited into the investment account, the cash deposit is placed into a temporary "cash bucket" in the investment account common across different investment styles. The cash is then distributed individual "cash buckets" each associated with an investment style in the investment account in accordance with a selected one of cash deposit allocation rules. The cash deposit distribution rules may include, for example, (i) a previously set asset allocation across different investment styles; (ii) a cash-specific allocation rule across different investment styles; (iii) a current asset allocation across different investment styles; (iv) a one-time specific allocation to one or more selected ones of different investment styles; and (v) a current asset allocation with rebalancing across different investment styles. As a result, the cash can be deposited in the investment account with proper allocation across different investment styles.

When cash is to be withdrawn from the investment account, the cash amounting to the requested amount from individual "cash buckets" each associated with an investment style in the investment account is withdrawn in accordance with a selected rule of cash withdrawal allocation. The selected rule of cash withdrawal allocation may also include, for example, (i) following a previously set asset allocation across different investment styles; (ii) following a cash-specific allocation rule across different investment styles; (iii) following a current asset allocation across different investment styles; (iv) following a one-time specific allocation to one or more selected ones of different investment styles; and (v) following a current asset allocation with rebalancing across different investment styles. The cash is then placed into a temporary "cash bucket" in the investment account common across different investment styles. A single cash payment is then delivered to an entity making the request for a cash withdrawal from the investment account. As a result, the cash can be withdrawn from the investment account with proper allocation across different investment styles.

In accordance with another aspect of the present invention, a system for managing assets, including cash and shares of different securities, in an investment account, including distribution of cash deposits and withdrawals, is provided. The system includes a database configured to store an investment account having associated assets, including cash and shares of different securities, transacted in accordance with a plurality of different investment styles; and a processor adapted to access the database and configured to receive a request for one of asset deposit and asset withdrawal to/from an investment account, and perform, based on the request, one of (i) asset deposit distribution in the investment account across different investment styles, and (ii) asset withdrawal from the investment account across different investment styles. The processor is further configured to receive a cash deposit and place the cash deposit into a temporary "cash bucket" in the investment account common across different investment styles, when the cash deposit is requested; and then distribute the cash into individual "cash buckets" each associated with an investment style in the investment account in accordance with a selected one of cash deposit distribution rules.

In addition, the processor is further configured to withdraw cash amounting to the requested amount from individual "cash buckets" each associated with an investment style in the investment account in accordance with a selected one of cash withdrawal allocation rules, when the cash withdrawal is requested; place the cash into a temporary "cash bucket" in the investment account common across different investment styles; and deliver a single cash payment to an entity making the request for a cash withdrawal.

BRIEF DESCRIPTION OF DRAWINGS

FIG. 7 depicts the rebalancing of individual security drift in the multi-style managed client investment account in the architecture of FIG. 1A.

FIG. 8 depicts the initiation and execution of tax efficient trades in the architecture of FIG. 1A.

FIG. 9 depicts an exemplary overlay model suitable for use in the architecture of FIG. 1A.

FIG. 9A depicts an exemplary multi-style managed investment client account of the type used in the architecture of FIG. 1A.

FIG. 10 depicts an exemplary transaction flow in the architecture of FIG. 1A, using the overlay model of FIG. 9 and the multi-style managed client investment account of FIG. 9A.

FIG. 15A depicts an exemplary cross style allocation suitable for use in the master overlay manager portfolio management system of FIG. 15.

FIG. 15B depicts an exemplary overlay model suitable for use in the master overlay manager portfolio management system of FIG. 15.

FIG. 15C depicts an exemplary style model suitable for use in the money manager portfolio management system of FIG. 14, and for inclusion within the overlay model of FIG. 15B.

FIG. 21A further details certain steps shown in FIG. 21.

FIG. 23 depicts an exemplary overlay model suitable for use in the architecture of FIG. 13.

FIG. 23A depicts an exemplary stylized master client investment account suitable for use in the architecture of FIG. 13, in accordance with the present invention.

FIG. 26 depicts the processing performed by the master overlay manager portfolio management system to distribute a cash deposit between multiple styles, in accordance with the present invention.

FIG. 27 depicts the computation of a cash balance for a style within the stylized master client investment account, in accordance with the present invention.

FIG. 28 depicts movements of cash between styles within a stylized master client investment account, in accordance with the present invention.

FIG. 29 depicts movements of cash between styles within the stylized master client investment account in accordance with an alternative implementation of the present invention.

FIG. 33 depicts a portion of an exemplary stylized manager client investment account for the practical example of FIG. 32, in accordance with the present invention.

FIG. 34 depicts further entries in the exemplary stylized manager client investment account of FIG. 33.

FIG. 35 depicts still further entries in the exemplary stylized managed client investment account of FIGS. 33 and 34.

FIG. 46 depicts a practical example of how wash sale violations are monitored in the stylized managed client investment account shown in FIGS. 33-35, in accordance with the present invention.

PREFERRED EMBODIMENT

Figure 13:
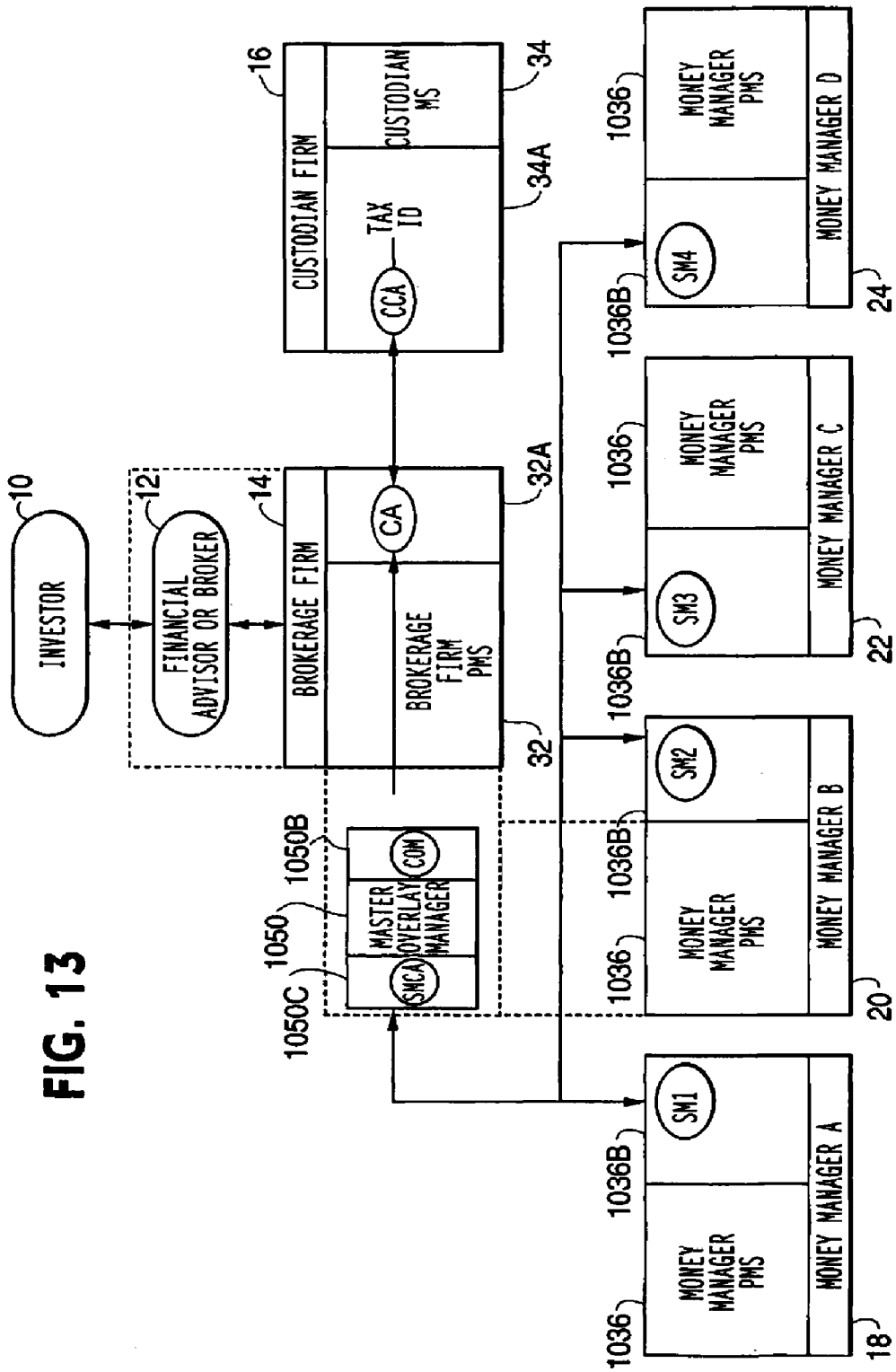
FIG. 13 depicts a portfolio management system architecture having a multi-style managed client investment account and an overlay manager, in accordance with the present invention.

FIG. 13 depicts a multi-style portfolio management system architecture in accordance with the present invention. As shown, an individual investor 10 opens a client account (CA) with a brokerage firm 14 through the investor's financial advisor or broker 12, who will sometimes be referred to simply as the advisor or financial advisor and may be a member of the brokerage firm 14, as indicated by the dotted lines in FIG. 13.

Figure 2:
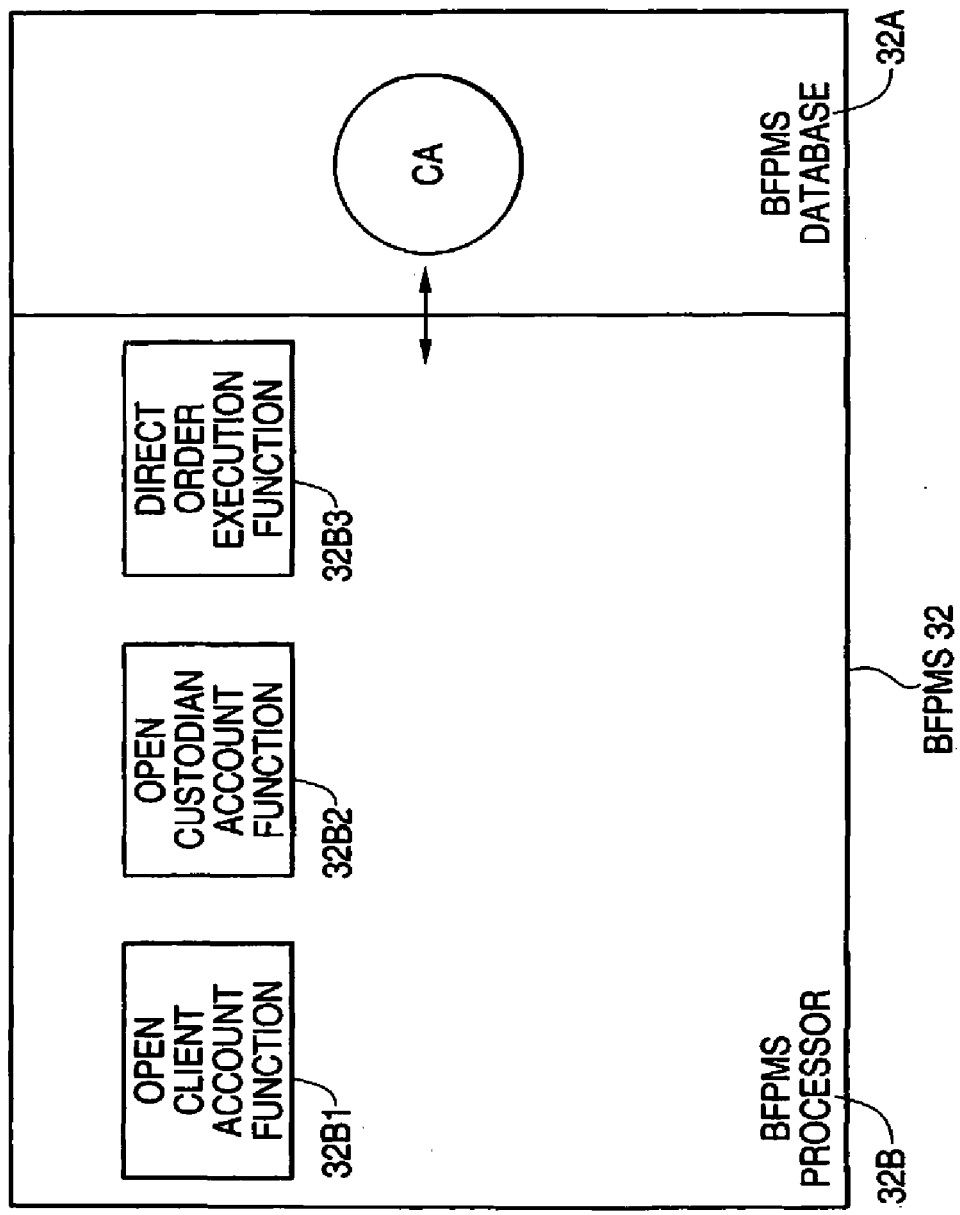
FIG. 2 depicts a conventional brokerage firm portfolio management system for use in the architecture of FIG. 1A or 1B.
Figure 3:
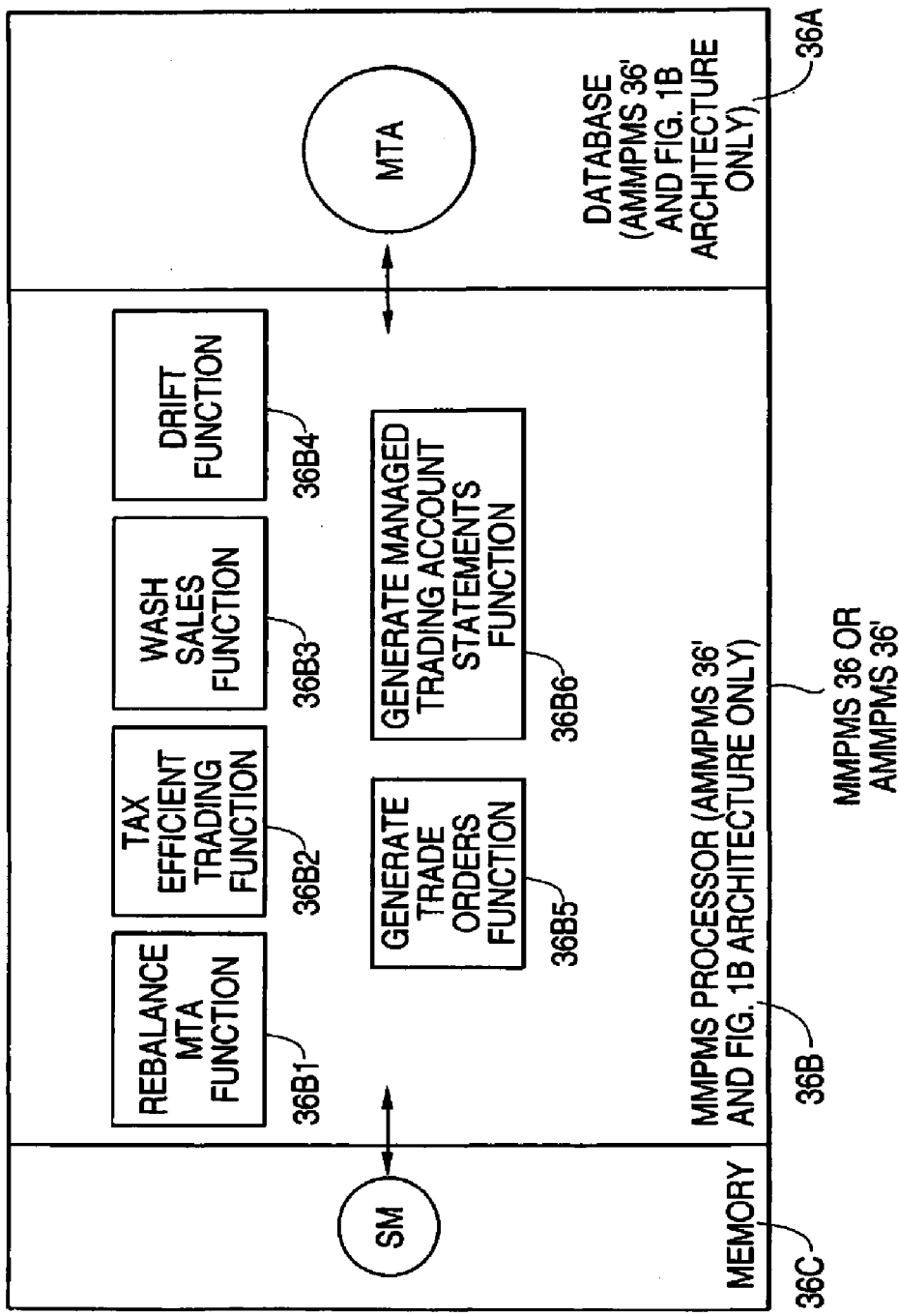
FIG. 3 depicts a conventional money manager portfolio management system for use in the architecture of FIG. 1A or 1B.

The brokerage firm is represented by a brokerage firm portfolio management system, such as the conventional brokerage firm portfolio management system (CBFPMS) 32 depicted in FIG. 2. As shown in FIGS. 2 and 13, the CBFPMS 32 includes a database 32A for storing the single CA.

Because there is only a single CA, the brokerage firm 14 need only open and the custodian firm 16 need only maintain, a single custodian client account (CCA). Thus, as shown in FIG. 13, the custodian firm is represented by a custodian management system, such as the conventional custodian management system (CCMS) 34, which includes a custodian client account (CCA) in the system database 34A. The CCA is maintained by the CCMS 34 as the authority of record for all transactions associated with the CA, as has been previously described.

The architecture of FIG. 13 also includes multiple money manager portfolio management systems (MMPMSs) 1036, each representing a different money manager or at least a different investment style. As shown, four money managers (i.e. money manager A18, B20, C22 and D24) are each represented by a different MMPMS 1036. Each MMPMS includes a memory 1036B, which stores the applicable money manager's style model (SM). As shown in the exemplary architecture of FIG. 13, the MMPMS 1036 representing money manager A 18 has a memory 1036B, which stores style model SM1. The MMPMS 1036 representing money manager B 20 includes a memory 1036B, which stores style model SM2. The MMPMS 1036 representing money manager C 22 has a memory 1036B, which stores style model SM3. Finally, money manager D 24 is represented by an MMPMS 1036 having a memory 1036B which stores style model SM4.

As also shown, the FIG. 13 architecture also includes a master overlay manager (MOM) 1050, which is a system component that automates functionality of an overlay manager. The MOM 1050 includes a memory 1050B having a compiled overlay model (COM), and a database 1050C having a stylized managed client account (SMCA). As in the FIG. 1A architecture, the MOM 1050 may be a separate system, operated, for example, by a global money manager, or could be functionally included as part of one of the MMPMS 1036 (e.g. part of the MMPMS 1036) for money manager 20 as indicated by one set of dotted lines, or could be functionally included as part of the BFPMS 32 as indicated by the other set of dotted lines in FIG. 13.

The MOM 1050 interfaces with the BFPMS 32 in a manner similar to that discussed above with reference to the FIG. 1A architecture. The MOM 1050 also interfaces with each MMPMS 1036 in a manner substantially different than the interfacing of the MOM 50 with each MMPMS 36 in the FIG. 1A architecture, as will be described in detail below.

Money Manager Portfolio Management System (MMPMS)

Figure 14:
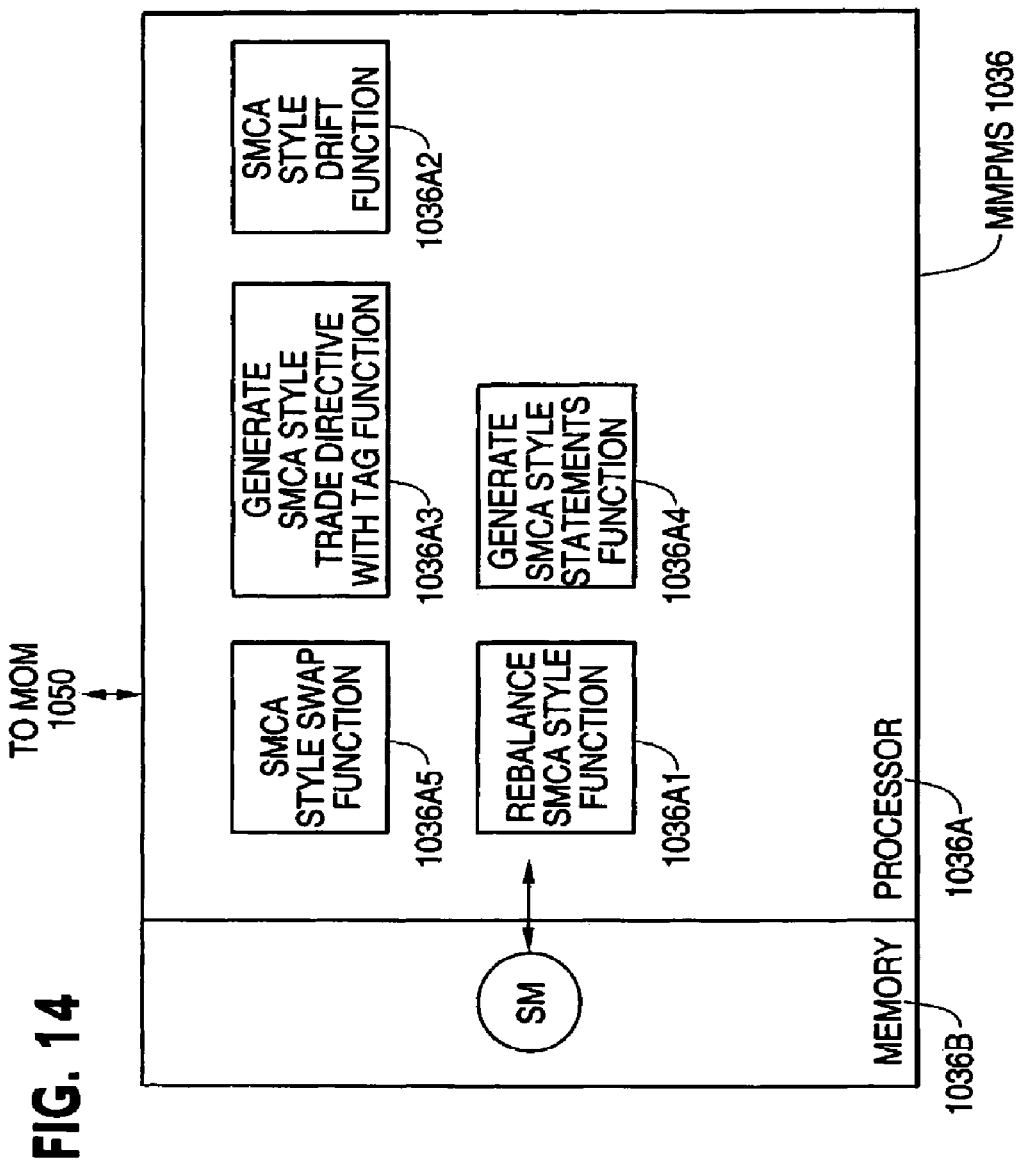
FIG. 14 depicts a money manager portfolio management system suitable for use in the architecture of FIG. 13, in accordance with the present invention.

FIG. 14 is an exemplary depiction of a money manager portfolio management system (MMPMS) 1036 in accordance with the present invention. As shown, the MMPMS 1036 includes a processor 1036A and memory 1036B. A style model (SM) is stored in the memory 1036B. For example, the SM stored in the memory 1036B shown in FIG. 14 could be any of SM1-SM4 depending on the money manager represented by the particular MMPMS 1036.

Figure 1:
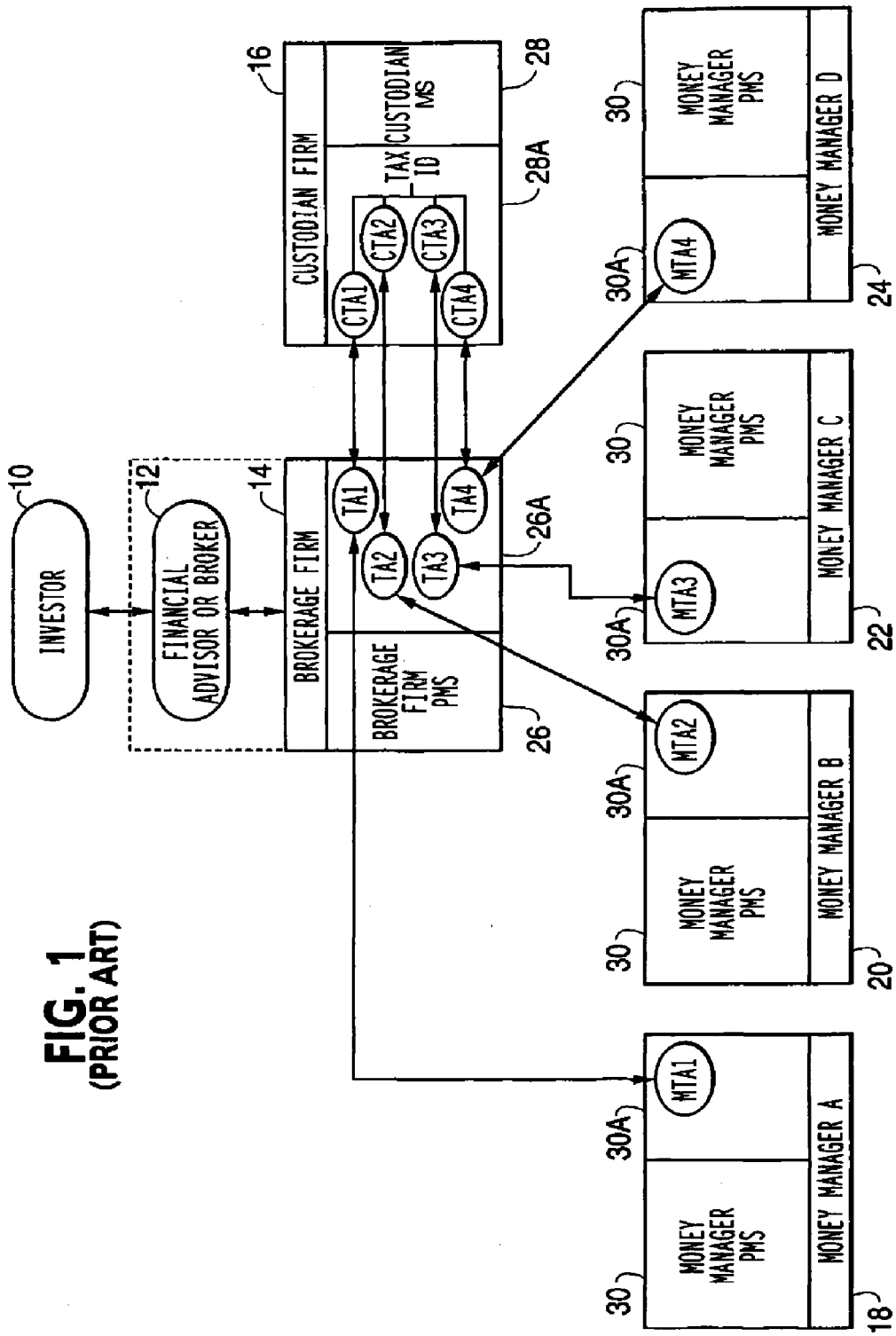
FIG. 1 depicts a historically utilized portfolio management system architecture having multiple managed trading accounts.
Figure 1A:
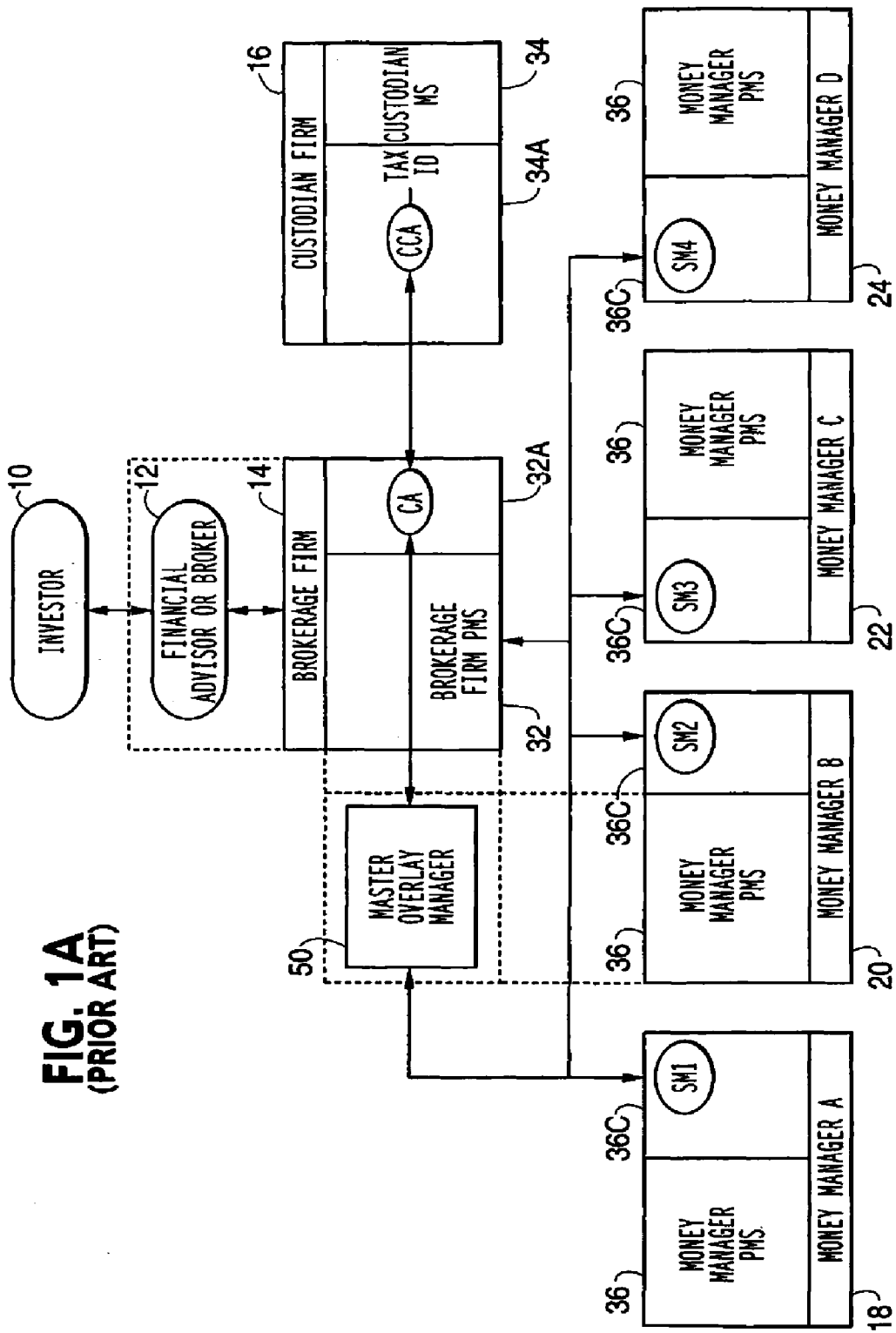
FIG. 1A depicts a currently utilized portfolio management system architecture having a multi-style managed client investment account and an overlay manager.

Unlike the MMPMS 36 in the FIG. 1A architecture, the processor 1036A is configured (i.e. programmed) with the logic necessary, to perform various functions. Unlike the AMMPMS 36' of the FIG. 1B architecture, the MMPMS 1036 does not include a database for storing a managed trading account (MTA) for the investor 10, because the FIG. 13 architecture does not require multiple separately managed trading accounts for the investor 10; nevertheless, the memory 1036B may also include a "shadow" of the appropriate portion of the client account (CA) stored in database 32A.

Figure 1B:
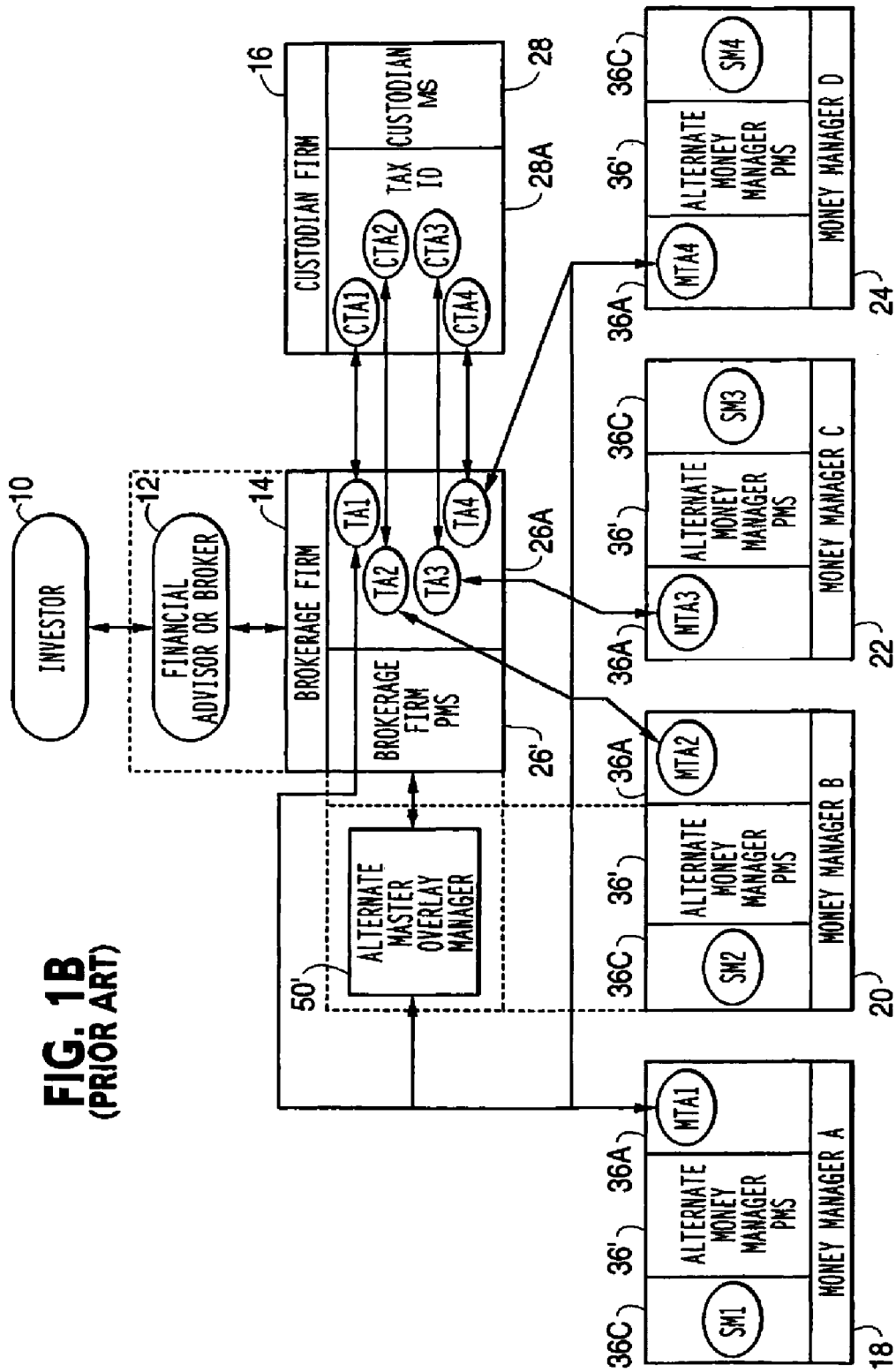
FIG. 1B depicts a currently utilized portfolio management system architecture having multiple managed trading accounts, a compiled managed client investment account.

The MMPMS 1036 interfaces to the MOM 1050 as indicated in FIG. 14, but in a manner significantly different than the interfacing between the AMMPMS 36' and AMOM 50' in the FIG. 1B architecture. As discussed above, in the FIG. 1A architecture, the only interfacing required between the MMPMS 36 and MOM 50 is to download the SM stored in the memory 36C of the MMPMS to the MOM 50 for inclusion in the overlay model stored in the memory of MOM 50.

In the FIG. 14 architecture, the interfacing may include synchronous or asynchronous communications to transfer the SM (in its entirety or just updates) or other instructions (e.g., swap or trade instructions) to the MOM 1050, or to receive updates from the MOM 1050 for a locally stored "shadow" account. Additionally, the interfacing may include synchronous or asynchronous support for accessing and/or modifying just the relevant portion of the stylized managed client account (SMCA) stored in database 1050C, through money manager tools available in the MMPMS 1036, or provided by the MOM 1050, or both cooperatively. One or more tokens associated with the particular money manager, for example money manager A 18, could support both identity authentication and access control, correlating to the tagging in the SMCA stored in database 1050C and thus restrict access appropriately.

As shown in FIG. 14, the MMPMS processor 1036A includes the logic, e.g. programmed instructions, necessary to perform various functions. As shown, these functions include a rebalance SMCA style function 1036A1, a SMCA style drift function 1036A2, a generate SMCA style trade directive with tag function 1036A3, a generate SMCA style statements function 1036A4, and a SMCA style swap function 1036A5. As noted above, the MMPMS 1036 stores a style model in the memory 1036B for the investment style utilized by the applicable money manager. As will be discussed further below, the stored SM is incorporated in an overlay model utilized by the MOM 1050 to generate trade orders and otherwise manage activity on the relevant portion of a single stylized managed client account (SMCA). However, unlike in the case of the FIG. 1A architecture, MMPMS 1036 stores the applicable SM both to record modifications made by the applicable money manager, as well as to perform functions executable by the processor 1036A on a relevant portion of the single managed client account (SMCA). With regard to the rebalance SMCA style function 1036A1, using the architecture of FIG. 14, each of the money managers A-D 18-24 can separately rebalance a portion of the single managed client account maintained by the MOM 1050, as will be discussed further below. This allows the individual money managers to bring a portion of the single managed client account managed in accordance with that money manager's style back in line with the SM for that style. To do this, the processor 1036A executes the rebalance SMCA style function 1036A1 to determine the deviation of the applicable portion of the single managed client account maintained by the MOM 1050 from the SM stored in the memory 1036B. It then generates trade directives by executing the generate SMCA style trade directive with tag function 1036A3, as will be described in more detail below, to reduce or eliminate the determined deviation and thereby place the relevant portion of the single managed client account in line with the applicable SM.

Drift within a relevant portion of the single managed client account is monitored and managed by executing the SMCA style drift function 1036A2. The execution of this function by the MMPMS processor 1036A allows the monitoring and managing of drift within the applicable portion of the single managed client account in an automated manner. More particularly, by executing the drift function 1036A2, the MMPMS 1036 is able to identify whether a security or other holding in the relevant portion of the single managed client account stored at the MOM 1050 has drifted outside of a range from a position for that security or holding included in the SM or in other data stored in the memory 36C, or otherwise identified. For example, the range may be established in real time by the processor 36A if so desired. In any event, the processor 36A then executes the generate SMCA style trade directive with tag function 1036A3 to initiate trade directives in order to reduce or eliminate the drift, and thereby place the relevant portion of the single managed client account in line with the applicable SM. Since drift is reduced or eliminated one style at a time, and the drift reduction or elimination in each style is typically performed by a different MMPMS 1036, the drift in the single managed client account is reduced only a style-by-style basis.

The processor 1036A can also execute the SMCA style swap function 1036A5 to swap one type of security, e.g. IBM, for another type of security, e.g. GE, within a relevant portion of the single managed client account. Once again it should be recognized that the swap function 1036A5 can only be utilized to swap different types of securities within a single relevant portion of the single managed client account. Here again, once the types of securities have been selected, the processor 1036A may execute the generate SMCA style trade directive with tag function 1036A3 to direct the necessary purchases and sales of securities to accomplish the desired swap. Alternatively, the swap instructions transmitted to the MOM 1050 may cause the MOM 1050 to generate trades for all affected single managed client accounts.

The generate SMCA style statements function 1036A4 can also be executed by the processor 1036A to generate a statement for the relevant portion of the single managed client account, which is managed in accordance with the applicable SM stored in the memory 1036B of the applicable MMPMS 1036.

Master Overlay Manager (MOM)

Figure 4:
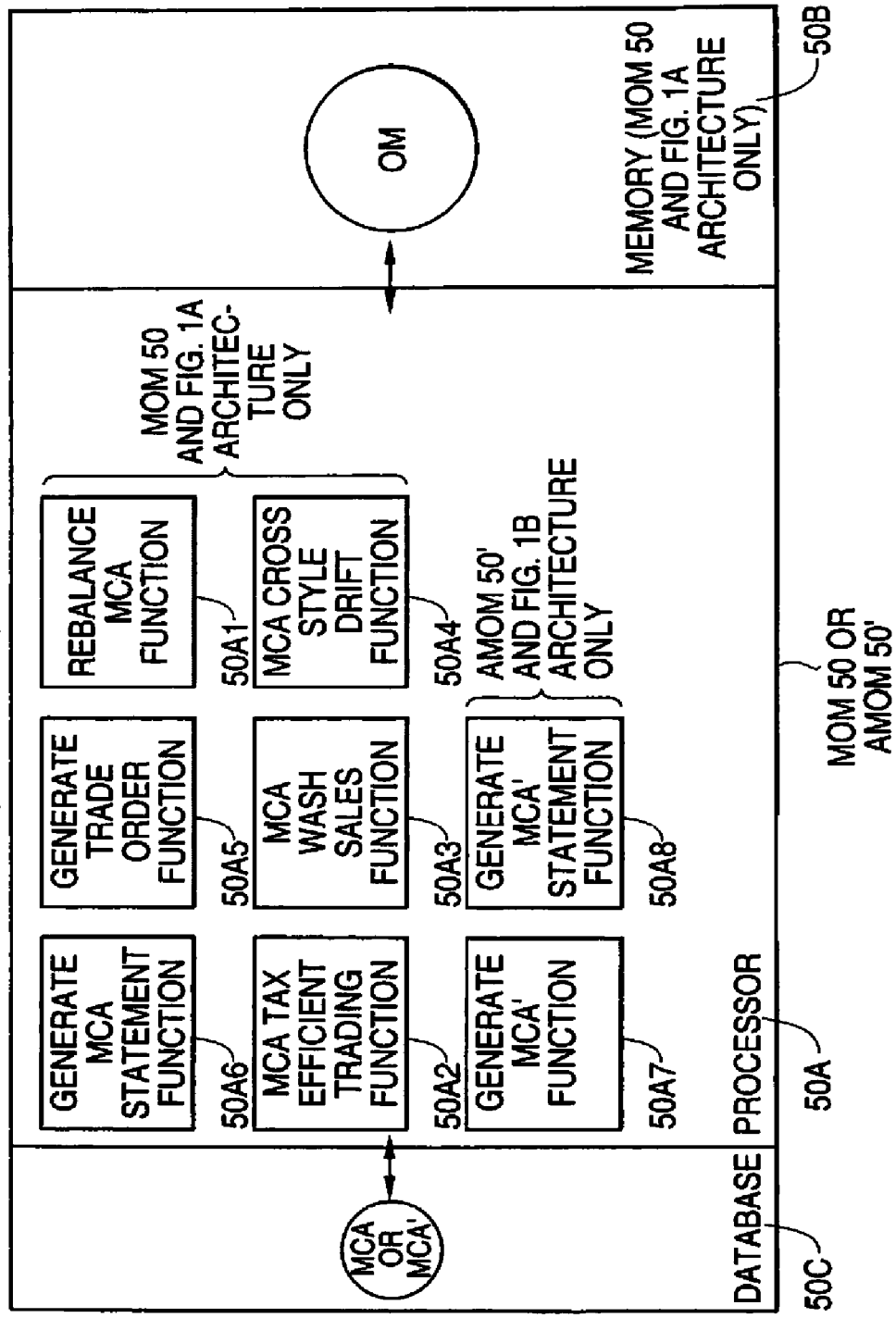
FIG. 4 depicts a conventional overlay manager portfolio management system for use in the architecture of FIG. 1A or 1B.
Figure 15:
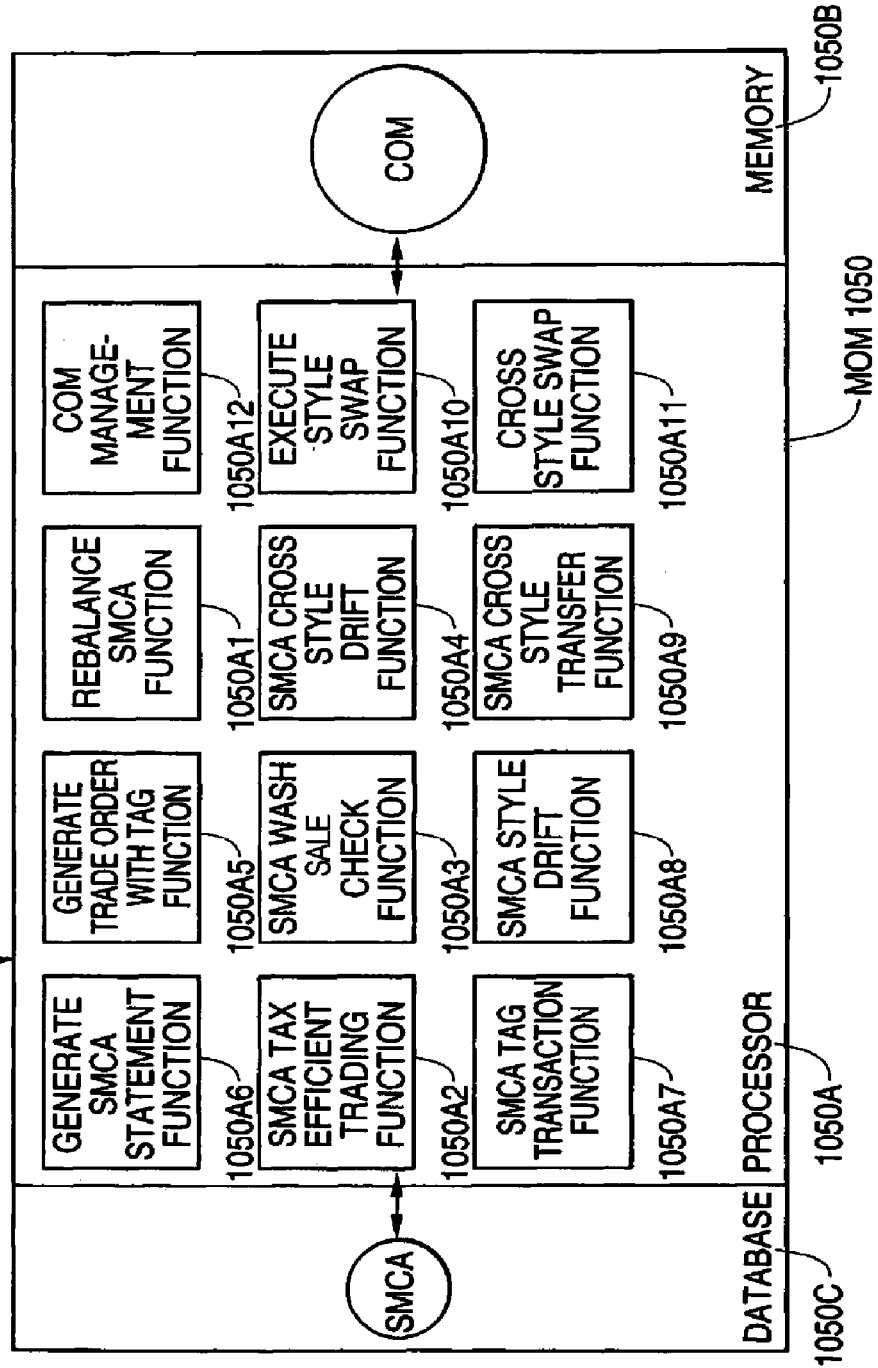
FIG. 15 depicts a master overlay manager portfolio management system suitable for use in the FIG. 13 architecture, in accordance with the present invention.

FIG. 15 is an exemplary depiction of the master overlay manager (MOM) 1050 shown in the FIG. 13 architecture. As shown, the MOM 1050 includes a processor 1050A, which includes the logic, e.g. programmed instructions, necessary to perform various functions. It should be noted that the MOM 1050 may be capable of performing all of the functions shown in FIG. 15 or may include less than all of the functions shown. The MOM 1050 also includes a memory 1050B, which stores a compiled overlay model (COM), which may be substantially similar to the overlay model shown in the FIG. 1A architecture. Additionally, the MOM 1050 also includes a single managed client account (SMCA), which is stored in a database 1050C of the MOM 1050. As will be detailed further below, the SMCA stored at the database 1050C is substantially different than the managed client account, MCA or MCA' shown in FIG. 4 and utilized in the architectures of FIGS. 1A and 1B. The MOM 1050 includes an interface to the MMPMS 1036 as has been noted above and will be discussed further below. The functions executable by the processor 1050A include a rebalance SMCA function 1050A1, SMCA tax efficient trading function 1050A2, SMCA wash sale check function 1050A3, SMCA across style drift function 1050A4, generate trade order with tag function 1050A5, generate SMCA statement function 1050A6, SMCA tag transaction function 1050A7, SMCA style drift function 1050A8, SMCA across style transfer function 1050A9, an execute style swap function 1050A10, a cross style swap function 1050A11, and a COM management function 1050A12. Hence, although trade directing and account management functions can be performed by the MMPMS 1036 at the style level in the FIG. 13 architecture, there is a single managed client account which can be managed and transacted by the MOM 1050, via execution of the functions 1050A1-1050A12 by the processor 1050A.

As has been discussed previously in describing the MOM 50 of the FIG. 1A architecture, the COM stored in the memory 1050B combines the style models, e.g. SM1-SM4, for each of the investment styles, e.g. style1-style4, into the COM for the SMCA being utilized for the investor 10. The SMCA is shadowed by the CA stored in the database 32A of the BFPMS 32 representing the brokerage firm. If the MOM 1050 is incorporated with BFPMS 32, the CA will be replaced by the SCMA, eliminating the need for the database 1050C.

As will be understood by those skilled in the art, although trade orders are usually initiated by the MOM 1050, each MMPMS 1036 may direct the initiation of such trade orders for a respective portion of the SMCA. On the other hand, the MOM 1050 may also independently initiate trade orders and other account management functions for the entire SMCA stored at the database 1050C. The interface between each MMPMS 1036 and the MOM 1050 facilitates the necessary coordination between the overlay manager and the individual money managers which is necessary to properly transact and manage the SMCA.

By executing the rebalance SMCA function 1050A1, the MOM processor 1050A will automatically rebalance the SMCA maintained in the database 1050C, based on the multi-style COM stored at the memory 1050B. The rebalancing will be performed across the entire SMCA and accordingly, across the multiple styles.

For example, the multi-style COM for the particular SMCA might require that a certain number of securities within the SMCA make up 100% of the capital. The SMCA must be rebalanced by the MOM 1050 to the COM. To do this, the processor 1050A, executes the rebalance SMCA function 1050A1 to determine the deviation of the SMCA securities from the security allocation set forth in the COM stored in the memory 1050B. The MOM processor 1050A then executes the generate trade order with tag function 1050A5 to generate the appropriate trade orders to reduce or eliminate the determined deviation, and thereby place the SMCA in line with the COM for the investor 10. The MOM processor 1050A may also execute the SMCA tax efficient trading function to, for example, determine the appropriate lots or positions in securities held in the SMCA to sell at a loss to offset gains made earlier in the tax year and thereby reduce the tax burden on the investor. As noted above, this is often referred to as tax loss harvesting. The execution of the SMCA tax efficient trading function 1050A2 allows the processor 1050A to identify the lots of or positions in securities in any style that should preferably be sold from the SMCA of the investor 10 to offset the gains due to prior sales of securities for investor 10. Once the preferred lots of or positions in securities have been identified, the MOM processor 1050A executes the generate trade order with tag function 1050A5 to initiate the sell of the identified securities or positions, and thereby reduce or eliminate the prior capital gain for the tax year and the associated investor tax burden.

The MOM processor 1050A executes the SMCA wash sale function 1050A3 to avoid a wash sale violation. Such a violation will arise when shares of a particular type of security in the SMCA were previously sold at a loss for the investor 10 and shares of that security are repurchased for investor 10 within thirty-one (31) days of the earlier sale, or some other predetermined period. In order to track potential wash sales, the MOM 1050, by executing the SMCA wash sale function 1050A3, determines whether shares of a security proposed to be purchased for the SMCA of investor 10 were previously sold at a loss from any style in the SMCA during the violation period. Only after determining that no such sale occurred during the violation period, will the processor 1050A execute the generate trade order with tag function 1050A5 to initiate the desired trade order. Thus, wash sale violations are avoided in the SMCA.

The MOM 1050 will also monitor and manage drift between the multiple styles associated with the SMCA of the investor 10. More particularly, the MOM processor 1050A will execute the SMCA across style drift function 1050A4 to proactively monitor and manage the drift between the different styles represented in the SCMA, away from the allocations across the multiple styles set forth in the COM stored in the memory 1050B of the MOM 1050.

The processor 1050A identifies whether a style of securities in the SMCA of investor 10 has drifted outside a range, which may be computed by the processor 1050A or stored in the memory 1050B as part of the COM, from the style allocation established in the COM. The processor 1050A then generates trade orders, by executing the generate trade order with tag function 1050A5, to reduce or eliminate the drift and thereby place the SMCA for investor 10 in line with the COM. Hence, the drift is reduced or eliminated across all styles in the SMCA.

The processor 1050A of the MOM 1050 also executes the generate SMCA statement function to create statements or reporting on the performance of the SMCA of investor 10. By executing the function 1050A6, the processor 1050A is capable of generating statements both on an individual style basis and an entire account basis. The generated statements, whether for an individual style or the entire SMCA, will, unlike the statements generated by the MOM 50 of the FIG. 1A architecture, provide accurate performance information.

The processor 1050A of MOM 50 will also execute an SMCA tag transaction function 1050A7 to tag transactions other than those tagged in the execution of the generate trade order with tag function 1050A5 with the associated style(s). The tagging of trade orders and other transactions will be discussed further below in detail.

The processor 1050A of MOM 1050 may also execute an SMCA style drift function 1050A8 to proactively monitor and manage drift in an individual style reflected in a portion of the SMCA. This monitoring is identical to that performed by the MMPMS 1036 when executing the SMCA style drift function 1036A2, as described above with reference to FIG. 14. However, in the case of the MOM 1050, rather than generating style trade directives in view of the determined style drift, the processor 1050A will execute the generate trade order with tag function 1050A5 to reduce or eliminate the determined style drift.

By executing the SMCA across style transfer function 1050A9, the processor 1050A of MOM 1050 efficiently performs across style movements of securities. Based upon the transfer identified in the execution of the SMCA across style transfer function 1050A9, the processor 1050A executes the SMCA tag transaction function 1050A7 to tag the security transfer transaction, as will be discussed further below. It is perhaps worthwhile noting that the MOM 50 in the FIG. 1A architecture had no need for such functionality since individual securities could not be selectively moved between styles. Rather, because the same type of securities were not allowed in different styles, transfers could occur only by eliminating a security identifier from one style to another style in the OM stored in the memory 50B of the MOM 50. The AMOM 50' also had no need for such functionality since the investors account was completely managed under separate MTA's by the individual money managers.

The COM execute style swap function 1050A10 allows the MOM 1050 to execute the style styles as directed by the style managers. The MOM implements the style swap instructions, and the processor 1050A executes the tag transaction function 1050A7 to tag the security swap transaction, as will be discussed further below.

It should also be noted that the MOM 1050 has the ability to execute an across style swap function 1050A11 as well. In this instance, the MOM 1050 would need to have control or permission from the style managers to enact changes to their individual styles. However, once permission was received, the MOM 1050 can make changes to models, create offsetting trades in different styles, and execute those trades. Also, the MOM 1050 has the ability to move cash within the SMCA, and thus a sale in one style could generate cash for a purchase in another style.

The MOM 1050 is the controller of the COM and executes the COM management function 1050A12 to control the COM. As such, in many situations, the MOM 1050 can make changes directly in the styles provided by the style managers. In some cases, the style managers provide their styles, and give the MOM 1050 full control of their style, thus allowing the MOM 1050 to have discretion over the styles, and thus over all COMs. The individual style managers can also be given the ability to interact directly with the SMCA by executing functions found in the processor 1050A via the interface. In some cases, the MOM 1050 can give the individual style managers the ability, for instance, to trade directly on the SMCA, rather than providing trade instructions to the MOM 1050. This results in additional flexibility when trading an investor's account. There is no need to wait for the MOM 1050 to enact the trade; the style manager can update his or her style, then create the trade directly. How the processor 1050A is used, depends on how the MOM 1050 sets up the COM management function 1050A12.

FIG. 15A depicts a portion of the COM stored in the memory 1050B of MOM 1050 that indicates the individual style allocations. As shown, three different styles are reflected in the COM with each style having a sub-model, i.e. style code, such as a tag, and an allocation percentage both for the total style market value and for cash only. As shown, the market value allocations and the cash allocation are both established at 40%, 40% and 20%, respectively.

FIG. 15B is an exemplary depiction of the security allocation in the COM for the entire account. As shown, various security identifiers, e.g. Dell, HPQ, etc., are shown with associated allocation percentages, e.g. 6%, 4%, etc. Each of the security identifiers also has an associated sub-model, i.e. style code, such as a tag, e.g. AAAVAL, BBBSM, etc., indicative of the style with which that security allocation will be made. It should be noted that, for example, the Dell identifier is included for both the style associated with the AAAVAL code and the style associated with the CCCGRO code. Hence, shares of Dell securities will be included in the SMCA for both of the identified styles in accordance with the COM stored in the memory 1050B of the MOM 50. FIG. 15C is an exemplary depiction of the security allocations for an individual style within the COM stored in the memory 1050B of the MOM 1050. As shown, for this particular style, the COM establishes that AIG securities should make up 3%, and Dell securities should make up 17% of the securities in the SMCA, which are traded in accordance with this style.

Risk Category Determination

Figure 16:
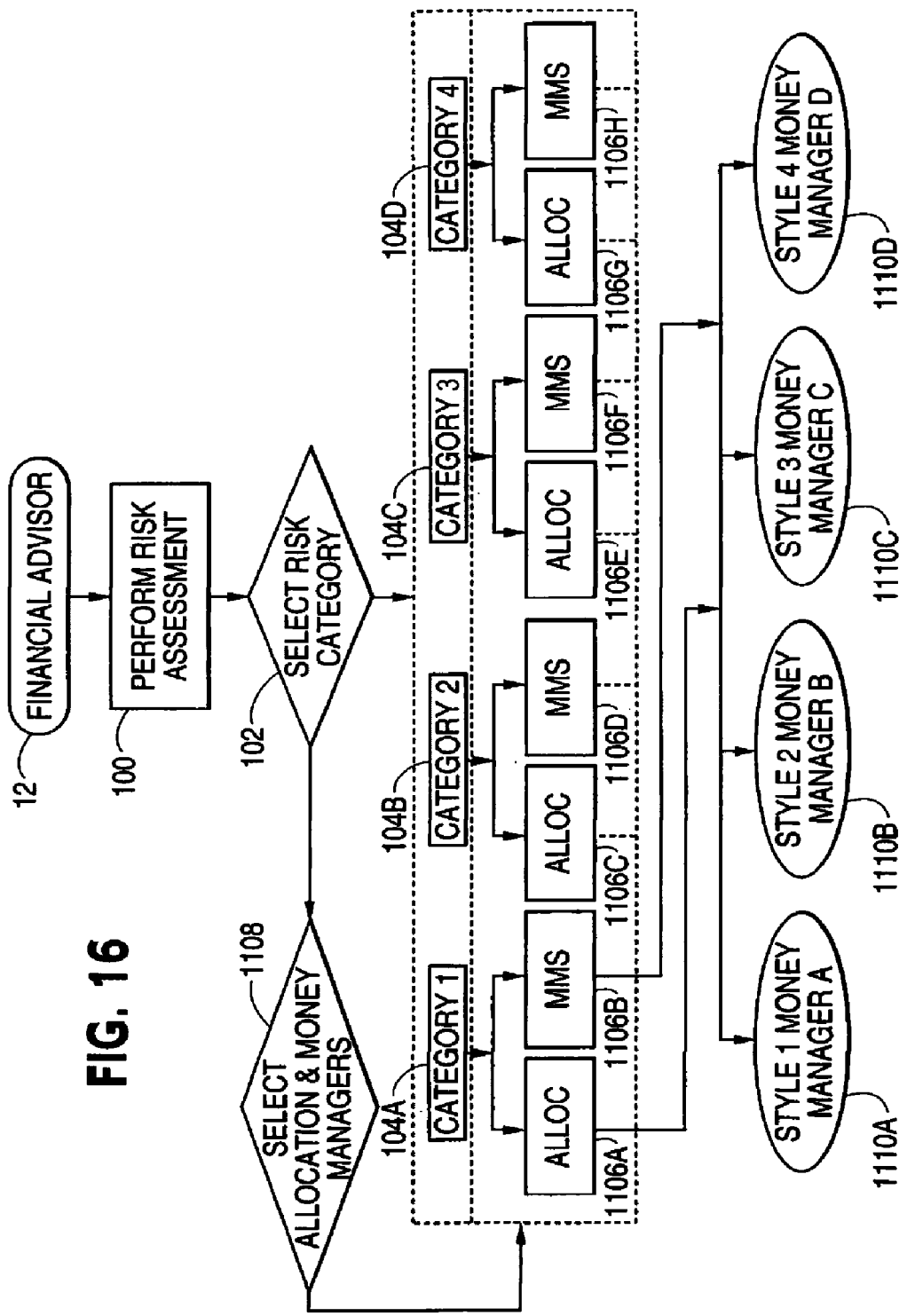
FIG. 16 depicts the effect of risk category selection on the overlay model used in the architecture of FIG. 13.

As shown in FIG. 16, the financial advisor 12, working with the investor 10, performs a risk assessment in step 100 to determine the appropriate risk category for the investor 10. The advisor 12 performs the risk assessment on the investor 10 based on the investor's profile, age, demographics, income, retirement age and other factors well understood by those skilled in the art. Based on the results of the risk assessment, the advisor 12, in step 102, selects the proper risk category. In the exemplary flow depicted in FIG. 16, the advisor 12 selects between risk categories 1-4, which are identified with the reference numerals 104A-104D. There could be more or less risk categories considered. In this example, it will be assumed that the advisor 12 selects category 1. It should be noted that up to this point, the process is identical to that previously described above with reference to FIG. 5.

Figure 5:
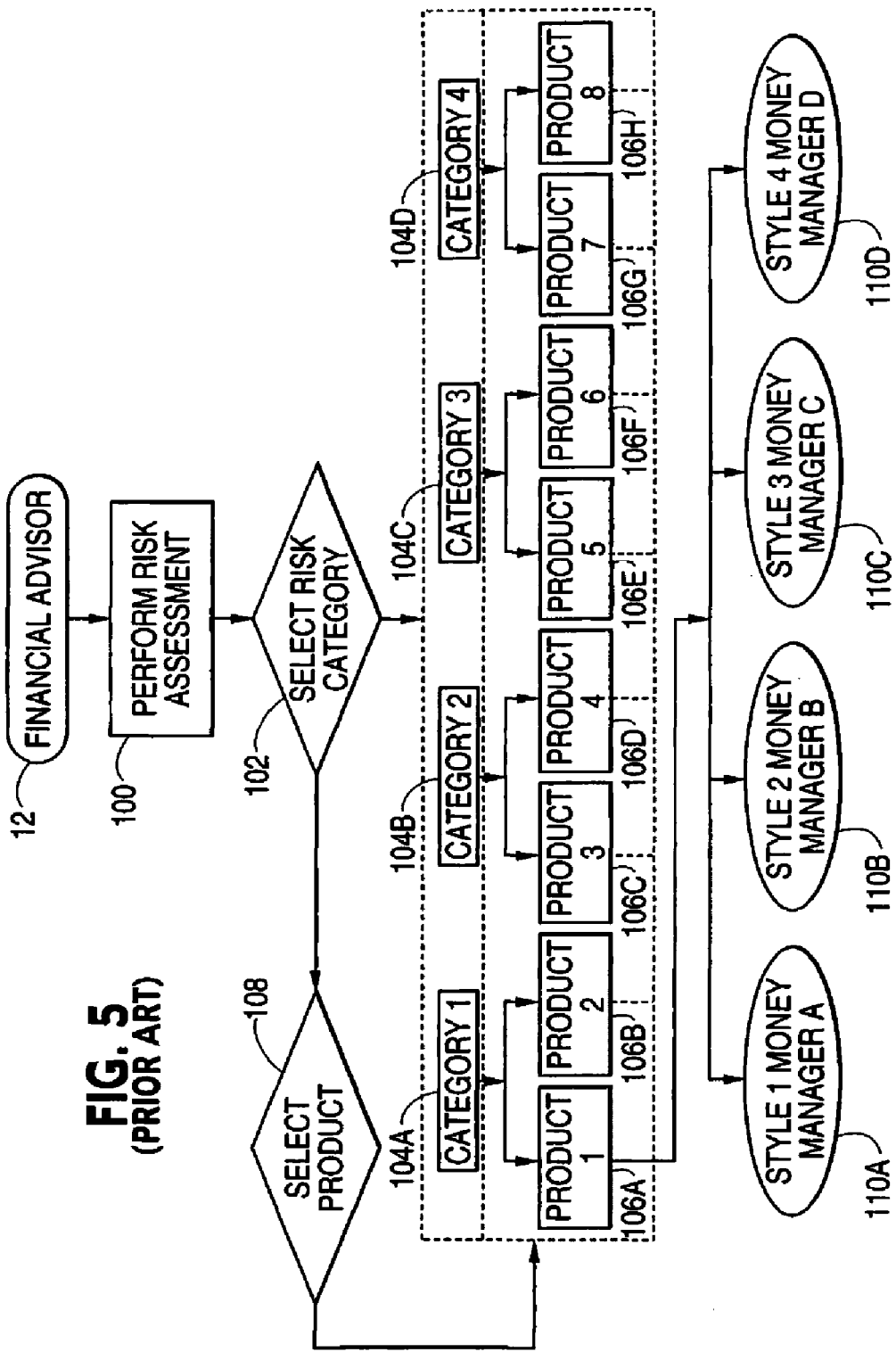
FIG. 5 depicts the effect of risk category selection on the overlay model used in the architecture of FIG. 1A.

However, unlike the process required using the system architecture of FIG. 1A and described with reference to FIG. 5 above, the MOM 1050 and the architecture of FIG. 13, need not associate each risk category with specific investment products offered by the brokerage firm 14. Furthermore, greater flexibility is provided in the selection of the money managers to manage different portions of the SMCA using different investment styles.

Rather than selecting standard allocations and predetermined money managers, using the architecture of FIG. 13, the financial advisor 12 and investor 10 would preferably work together to determine a preferred asset allocation which can be different than any of the standard allocations from which a selection must be made in the FIG. 1A architecture. Furthermore, the financial advisor 12 and investor 10 can select from a larger pool of available money managers rather than being limited to a small restricted group of predetermined money managers, to manage a desired portion of the SMCA in accordance with a desired style. Thus, as shown in FIG. 16, once the risk category is chosen, the desired allocations between styles and the desired money managers are selected. As shown in FIG. 16, after having selected category 1, in this particular example an allocation 1106A is selected and a set of money managers 1106B are selected for the investor 10. This combination is only one of many possibilities that could satisfy risk category 1. In the case of the other categories 104B-104D, other allocations and sets of money managers 1106C-1106H would typically be selected. Based upon the selected allocation 1106A and selected money managers 1106B, the allocations between and the money manager selected to oversee the trading in each of styles 1-4 are defined as indicated by reference numerals 1110A-1110D. These same money managers are identified as money managers A-D 18-24 in FIG. 13. Similarly, styles 1-4 are the same styles reflected in the style models, i.e. SM1-SM4, which are combined in the COM applied to the SMCA in the FIG. 13 architecture. It is possible that selection of a style necessarily defines, or at least restricts, the choice of a money manager. In summary, using the FIG. 13 architecture, selected risk categories need not be associated with predefined allocations or money managers. Hence, the financial advisor 12 and investor 10 have complete flexibility in establishing an appropriate allocation and selecting those money managers to manage the SMCA in accordance with the selected allocations. Therefore, if the selected risk category is a low risk category, i.e. a category appropriate for an investor with a low risk tolerance, the asset allocation could, for example, be established at 50, 51, or 52% for fixed income investment and 48, 49, or 50% for value investment. On the other hand, if the selected risk category is a higher risk category, i.e. a category appropriate for an investor with a higher risk tolerance, the category might have an asset allocation of 70 or 71 or 72% growth investment and 28, 29, or 30% fixed income investment. Since there is no need using the architecture of FIG. 13 to limit the selection of asset allocations to a limited number of predetermined allocations, the investment advisor 12 and investor 10 have complete flexibility to select those allocations with which the investor will be most comfortable, although the architecture of FIG. 13 may facilitate the process by proposing one or more "standard" allocations. Furthermore, because the architecture of FIG. 13 does not require that only a limited number of predefined products be offered, the investor 10 and financial advisor 12 are also given the complete flexibility to select whatever styles and money managers to manage the portion of the SMCA to be traded in the selected style, although, again, the architecture of FIG. 13 may facilitate the process by proposing a number of "standard" styles or money managers that may be associated with one or more products. This results in the most suitable allocations, styles and money managers being utilized to meet the personal needs of the investor 10.

The ability to customize allocations provides the financial advisor 12 and investor 10 with the ability to establish allocations which are right for the individual investor. Thus, using the architecture of FIG. 13, each individual investor may have a custom allocation which is different from other investors in the same risk category. Rather than being limited to a finite number of standard allocations, typically 6 to 10, the financial advisor 12 and investor 10 can choose from a substantially larger, i.e., multiple orders of magnitude number of allocation, style, and money manager combination alternatives. This in turn requires that the architecture of FIG. 13 be capable of monitoring drift, rebalancing and performing other functions on many accounts having a virtually unlimited number of variations in their compiled overlay models. That is, by allowing flexibility for each SMCA to have a different risk allocation, the MOM 1050 may need to perform rebalancing, tax efficient trading, loss sale tracking, drift monitoring and cash management on accounts having thousands of different allocations.

Client Account Establishment, Security Identifier Tagging, and Tracking

Figure 17:
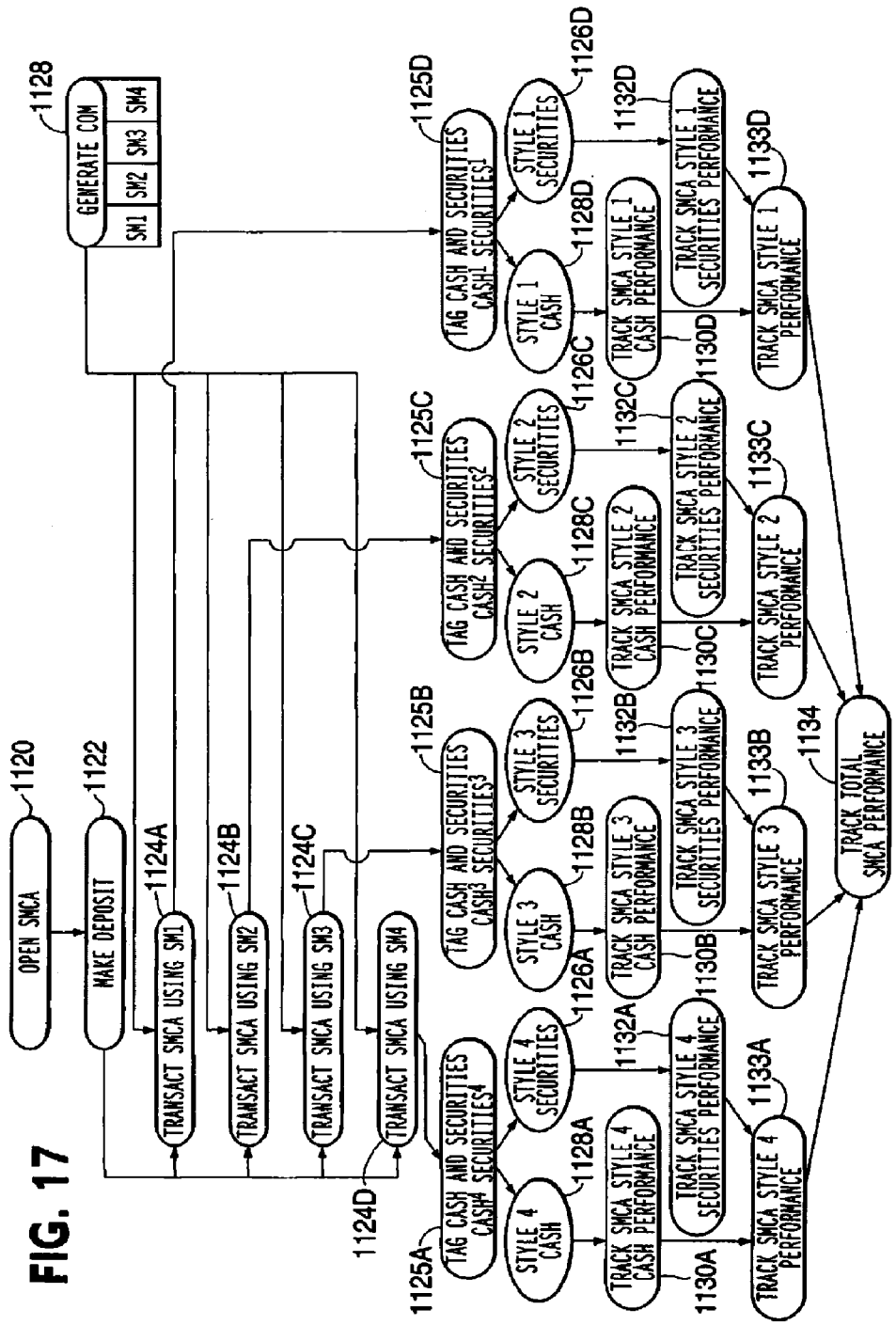
FIG. 17 depicts performance tracking of the multiple styles in the stylized managed client investment account utilized in the master overlay manager portfolio management system of FIG. 15.

As shown in FIG. 17, using the system architecture of FIG. 13, the brokerage firm 14 in step 1120 opens the SMCA for the investor 10 with the overlay manager, represented by the MOM 1050. The brokerage firm 14 makes a deposit of cash, credit and/or securities in step 1122. These deposits could be new assets or assets from a previously opened account of the investor 10 with brokerage firm 14.

The money managers A-D 18-24 and overlay manager coordinate the combination and incorporation of the style models, i.e. SM1-SM4 shown in FIG. 13, in accordance with the inter-style allocation previously determined, into the COM which is stored in the memory 10508 of the MOM 1050, shown in FIG. 15, in step 1128. In other words, each individual security in the SMCA will be tied to a specific style which is traded in accordance with a particular one of the style models SM1-SM4 included in the COM. Accordingly, the COM can be used to trade securities and all of the individual styles and to otherwise manage the SMCA. Thus, the MOM 50, by executing the functions 1050A1-1050A9 can perform all required transactions and management across the entire SMCA. Furthermore, by providing the interface between the MOM 1050 and the MMPMS 1036, each of the individual money managers 18-24, represented by its MMPMS 1036, can perform the functions 1036A1-A5 to transact and otherwise perform management functions on the portion of the SMCA for which that money manager has responsibility.

The MOM 1050 initiates trade orders and otherwise transacts the SMCA for the investor 10 in accordance with each of the respective style models, i.e. SM1-SM4, and the inter-style allocation previously determined, compiled to form the COM in steps 1124A-1124D. As will be discussed further below, these transactions may be directed by the MOM 1050 itself or by an MMPMS 1036 representing the applicable money manager A-D 18-24.

It will be noted that security identifiers within the COM are not tagged, as required in the architecture of FIG. 1A. Rather, each position and each transaction is tagged within the SMCA with an appropriate style code as indicated in steps 1125A-1125D. The appropriate style code will identify the particular style model with which the applicable position or transaction corresponds. That is, if the transaction is directed based on SM1, the transaction will be tagged with the style code representing SM1 and therefore corresponding to a particular style.

As indicated by reference numerals 1126A-1126D, any purchases or sales of securities for the SMCA are tagged with the appropriate style. Most cash transactions, such as dividends and interest and cash withdrawals, are also tagged with the appropriate style as indicated by reference numerals 1128A-1128D. Cash transactions that are not tagged are broken up proportionally based on a cash allocation found in the COM. Thus, all cash is associated with a particular style.

The tagged cash and securities positions and transactions are used, for example, when executing the generate SMCA style statements function 1036A4, and the generate SMCA statement function 1050A6, to generate true style performance for each style within the SMCA as well as for the total SMCA. That is, the MOM 1050 can compute accurate performance at both the style level and full account level for the SMCA. Such accurate performance computation can be for a style or the full SMCA on a total market value basis, securities only basis, or cash only basis. It will be recalled that although the MOM 50 of the FIG. 1A architecture could compute accurate performance of the total account on a full market value, securities only, or cash only basis, and an accurate individual style performance on a securities only basis. On the other hand, the AMOM 50' in the FIG. 1B architecture was only capable of compiling the individual reports generated by each MMPMS 36 into a total account report. Thus, the architecture of FIG. 13 allows accurate reporting at both the style and total account levels without the need for multiple trading accounts as required in the FIG. 1B architecture.

Thus, as indicated in steps 1130A-1130D, the cash performance is included in the style-level performance calculations. The security performance is also tracked on a style basis in steps 1132A-1132D. The determined cash and securities performance are combined in steps 1133A-1133D to give accurate market value performance at the style level for each of the styles 1-4. In step 1134, the individual style performances are combined to provide a total accurate performance for the entire SMCA. As will be understood, the processor 1050A of the MOM 1050 can, if so desired, selectively combine style cash performance computations to calculate the cash performance for the total SMCA or security performance across the various styles to calculate the securities performance across the total SMCA, by executing the generate SMCA statement function 1050A6 in the processor 1050 of MOM 1050.

The MOM 1050 may track the desired performance during the lifetime of the SMCA or during a more limited performance period window.

It should also be noted that using the FIG. 13 architecture, accurate performance can be computed, and therefore tracked and reported, at both the total account and style level, without restricting money managers from including the same types of securities in multiple of the style models, i.e. more than one of SM1-SM4, as in the FIG. 1A architecture, or without requiring compilation of reports associated with multiple trading accounts as in the FIG. 1B architecture.

Drift Rebalancing

Figure 18:
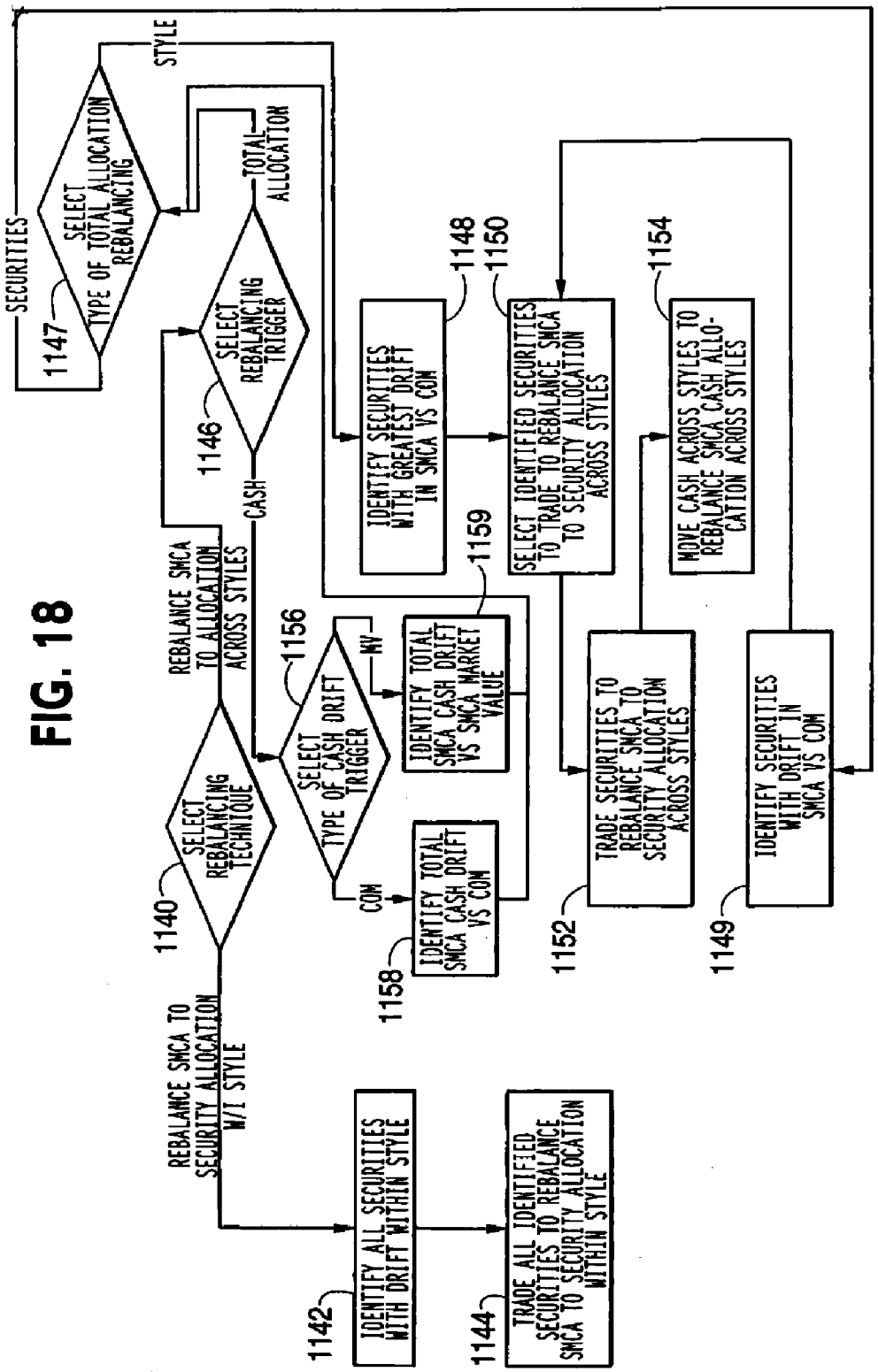
FIG. 18 depicts the processing performed to rebalance the stylized managed client investment account, in accordance with the present invention.

FIG. 18 depicts the process performed by the execution of the rebalance SMCA function 1050A1 by the processor 1050A of MOM 1050. It should be noted that the processing described in FIG. 18 is performed within the transact SMCA steps 1124A-1124D of FIG. 17. In step 1140, a selection of the rebalancing technique is performed. The selection may be performed either in response to an input being entered to the MOM by the overlay manager or MMPMS 1036, or in an automated, e.g., periodically scheduled, fashion by the processor 1050 itself. For example, the processor 1050 may be programmed to perform rebalancing based upon different techniques at different predetermined times. In any case, a selection is made between either rebalancing the SMCA to the style allocation for a particular style or rebalancing the SMCA to the security allocation across all the styles represented in the SMCA. It should be understood that if the rebalancing is to be performed based upon the execution of the rebalance SMCA style function 1036A1 by the processor 1036A of the MMPMS 1036, the interface will automatically select the rebalancing technique to rebalance the SMCA to the security allocation within the applicable style represented by the SM associated with the MMPMS 1036 from which the request for rebalancing is received.

If rebalancing of the SMCA to the security allocation within a particular style is selected in step 1140, in step 1142 the processor 1150A, or the processor 1136A in the case of rebalancing at the request of a particular money manager, will identify all securities with drift within the style of interest. If the rebalancing is being performed by the MMPMS 1036, the processor 1036A will next execute the generate SMCA style trade directive with tag function 1036A3 to direct the initiation of trade orders for all securities to rebalance the SMCA to the security allocation within the style in step 1144. Whether the rebalancing is being performed by the MMPMS 1036 or the MOM 1050, the processor 1050A, of MOM 1050, will then execute the generate trade order with tag function 1050A5 to generate the trade orders in accordance with the received directives to initiate trading of all the identified securities to rebalance the SMCA to the security allocation within the applicable style. As has been previously discussed, the trade orders will be forwarded to the brokerage firm 14 for execution.

On the other hand, if rebalancing of the SMCA to the style allocation is selected in step 1140, a further selection of the type of rebalancing trigger, for example based on either cash or total allocation, must be made in step 1146. The selection may also be made by the overlay manager entering an input identifying the type of rebalancing trigger desired. Alternatively, the processor 1050A may be programmed to automatically select a particular type of rebalancing trigger based upon one or more predetermined factors. In either event, a selection of either rebalancing the style allocation or rebalancing of the total SMCA securities allocation is performed in step 1147.

If rebalancing to the style allocation is selected in step 1147, the securities in the SMCA with the greatest drift from the security allocations in the COM are identified in step 1148. In step 1150, some or all of the identified securities are selected for trading to rebalance the SMCA to the across style security allocation. It should be noted that the securities selected for trading are limited to only those required to attain style allocation. If the selected type of total allocation rebalancing is securities, all securities in the SMCA with drift from the security allocations in the COM are identified in step 1149. In step 1150 all of the identified securities are selected for trading to rebalance the SMCA to the securities allocation. It should be noted here that all of the securities that have drifted are selected for trading if the selected type of total allocation rebalancing is based on securities. Thus, the selection made in step 1147 will determine whether all securities having drift are traded or if only the minimum number of required trades of securities necessary to return the SMCA to the proper style allocation will be performed. The processor 1050A of MOM 1050 then executes the generate trade order with tag function 1050A5 in step 1152 to initiate trade orders for the selected securities to rebalance the SMCA to the applicable allocation. The generated trade orders are executed by the brokerage firm 14.

After execution of the trade orders, the across style cash allocation must also be rebalanced. Accordingly, in step 1154, the processor 1050A of the MOM 1050 executes the rebalance SMCA function 1050A1 to move cash within the SMCA between styles to rebalance the SMCA cash allocation across styles. The processor 1050A also executes the SMCA tag transaction function 1050A7 to tag these increments of cash in step 1154.

If, in step 1146, the cash rebalancing trigger is selected, a further selection of the type of cash drift rebalancing trigger is next performed in step 1156. The selection may be performed by the overlay manager entering an input which identifies a desired type of cash rebalancing, or by programming the processor 1050A to make an automated selection of the type of cash rebalancing based upon predetermined factors. Based upon the selection, either cash rebalancing against the COM cash allocation or cash rebalancing based on the SMCA current market value will be performed.

Assuming that cash rebalancing based upon the COM allocation is selected, in step 1158, the processor 1050A executes the rebalance SMCA function 1050A1 to identify the total SMCA cash drift versus the COM cash allocation. If on the other hand, cash drift rebalancing based on the SMCA total market value is selected in step 1156, the processor 1050A executes the rebalance SMCA function 1050A1, in step 1159, to identify the total cash drift versus the SMCA current market value. The processor 1050A then continues with step 1147, which has been previously described, to select the type of rebalancing which will be performed. The processor 1050A further performs steps 1148-1154, as applicable and discussed above, to transact the SMCA to reduce or eliminate the identified cash and securities drift.

As noted earlier, a number of different events could trigger the rebalancing described in FIG. 18. For example, rebalancing might be required due to a change in the COM which creates a drift in the SMCA as compared to the modified COM. Rebalancing might also be required as a result of a deposit or withdrawal from the SMCA. Such deposits and withdrawals may, if desired, automatically trigger a rebalancing of the SMCA back to the COM by the MOM 1050. Rebalancing could additionally be required due to market fluctuations. Such fluctuations could be tracked and, if desired, automatically trigger a rebalancing of the SMCA back to the COM. Rebalancing for market fluctuation could also be performed periodically, if so desired.

It should be noted that because duplicate securities may reside in the SMCA in multiple different styles, the computation of security drift would in all cases be performed on a style-by-style basis. For instance, if IBM shares are held in the SMCA in two different styles, two different security drift computations must be made to determine if the IBM securities in the SMCA vary from the IBM security allocation in the COM.

As shown in FIG. 18, if the SMCA is to be rebalanced to the across style allocation and the rebalancing is to be performed on a style allocation basis, the processor 1050A will initiate trade orders re-aligning the SMCA to the original style value allocation in the COM. Not every type of security will necessarily be traded. Rather, preferably only those securities having the largest drift are traded to bring the security allocation for each style back in line with the security allocation of the COM. This may result in some securities within the SMCA remaining untraded. However, if desired, the processor 1050A may be configured to trade every security in the SMCA to the proper allocation as set forth in the COM. This of course will result in more trading, but will more accurately rebalance the security drift within the SMCA.

In summary, if rebalancing is performed by executing steps 1142 and 1144, or by selecting the securities allocation from options presented in 1147, more accurate rebalancing will be performed and less security drift will result, but will require more trading and may have a higher cost to the investor. On the other hand, if the rebalancing is performed by selecting style rebalancing in step 1147, somewhat less accurate rebalancing will result, and only the style allocations will be rebalanced: however, with less trades being required and potentially less cost to the investor. Thus, the MOM 1050 provides the overlay manager with three options to rebalance the SMCA, one of which minimizes trades and cost to the investor but provides somewhat less accurate results, and the others which provides a more accurate rebalancing by initiating more trades at a somewhat greater cost to the investor.

Figure 19:
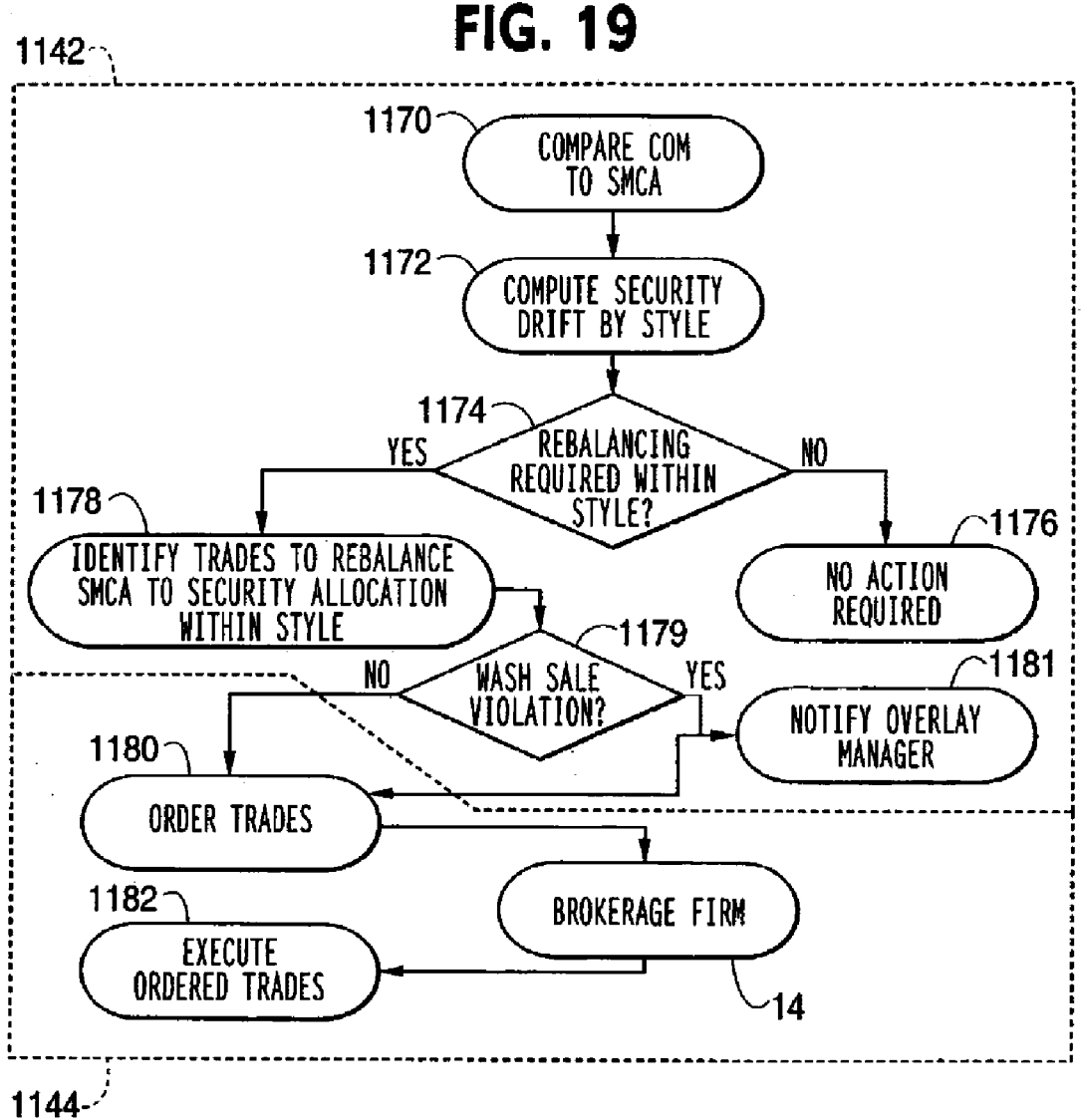
FIG. 19 further details steps performed in the process shown in FIG. 18.

FIG. 19 further details the processing performed in steps 1142 and 1144 to rebalance the SMCA to a security allocation within a single style, as described above with reference to FIG. 18. It should be noted that steps 1142 and 1144 could also be independently performed by MMPMS 1036 by execution of function 1036A1.

As depicted in FIG. 18, if the SMCA is rebalanced to the security allocation within a particular style, the portion of the COM stored in the memory 1050B of the MOM 1050 which is associated with that style is compared to the securities in the SMCA stored in the database 1050C of the MOM 1050 in step 1170 of FIG. 19. In this regard, the processor 1050A, in step 1170, compares each individual security allocation for the particular style in the COM to the actual allocation of each security in the SMCA for that style. The processor 1050A then calculates, in step 1172 the drift between each of these allocations. Based on the computed drift, the processor 1050A determines if rebalancing is required in step 1174. If not, no further action is required as indicated by step 1176.

However, if, in step 1174, the processor 1050A determines that rebalancing is required, the securities which must be traded to rebalance the SMCA to the security allocation for the particular style are identified by the processor 1050A in step 1178. If rebalancing is required and the allocation of a security in the particular style in the SMCA exceeds the weighting of that security for that style in the COM, the processor 1050A will determine the amount, e.g. the number of shares, to sell down that security from the SMCA in step 1178. On the other hand, if the allocation of a security for the style in the SMCA is below the weighting for that security in that style in the COM, the processor 1050A will determine the amount, e.g. the number of shares, of the security to buy into the SMCA for that style in step 1178. If a purchase of shares is required, prior to initiating any trade orders for the shares, the processor 1050A will determine if the purchase of the shares will result in a wash sale violation in step 1179 for the entire SMCA. Hence, if shares of the same security have been previously sold within the violation period, the processor 1050A will issue a notice to the overlay manager of the wash sale violation in step 1181 and will not generate trade orders for the purchase of the shares that will violate the rule. Whether or not a violation occurs, the process continues to step 1144 of FIG. 18 if appropriate. Trades that would have created a sash sale are ignored. As shown in FIG. 19, the performance of step 1144 of FIG. 18, includes the ordering of trades in step 1180. As has been discussed previously, if the rebalancing is being performed by the MMPMS 1036, the processor 1036A executes the generate SMCA style trade directive with tag function 1036A3 to generate a trade directive which can be forwarded to the MOM 1050. Based upon the receipt of this directive, the processor 1050A of MOM 1050 executes the generate trade order with tag function 1050A5 to generate the required trade order. The trade orders are then forwarded to the brokerage firm 14, which executes the orders in step 1182. Referring back to step 1179, to determine whether or not a wash sale violation will occur, the processor 1050A of the MOM 1050 executes the SMCA wash sale function 1050A3 to determine whether or not a wash sale violation will occur based upon any prior transaction within the entire SMCA. Hence, whether steps 1170-1178 are performed by the MMPMS 1036 or MOM 1050, the wash sale violation determination and notification to the overlay manager will, in all cases, be performed by the processor 1050A of the MOM 1050.

As depicted in FIG. 18, if the SMCA is rebalanced to the security allocation within a particular style, the portion of the COM stored in the memory 1050B of the MOM 1050 which is associated with that style is compared to the securities in the SMCA stored in the database 1050C of the MOM 1050 in step 1170 of FIG. 19. In this regard, the processor 1050A, in step 1170, compares each individual security allocation for the particular style in the COM to the actual allocation of each security in the SMCA for that style. The processor 1050A then calculates, in step 1172 the drift between each of these allocations. Based on the computed drift, the processor 1050A determines rebalancing is required in step 1174. If not, no further action is required as indicated by step 1176.

Figure 20:
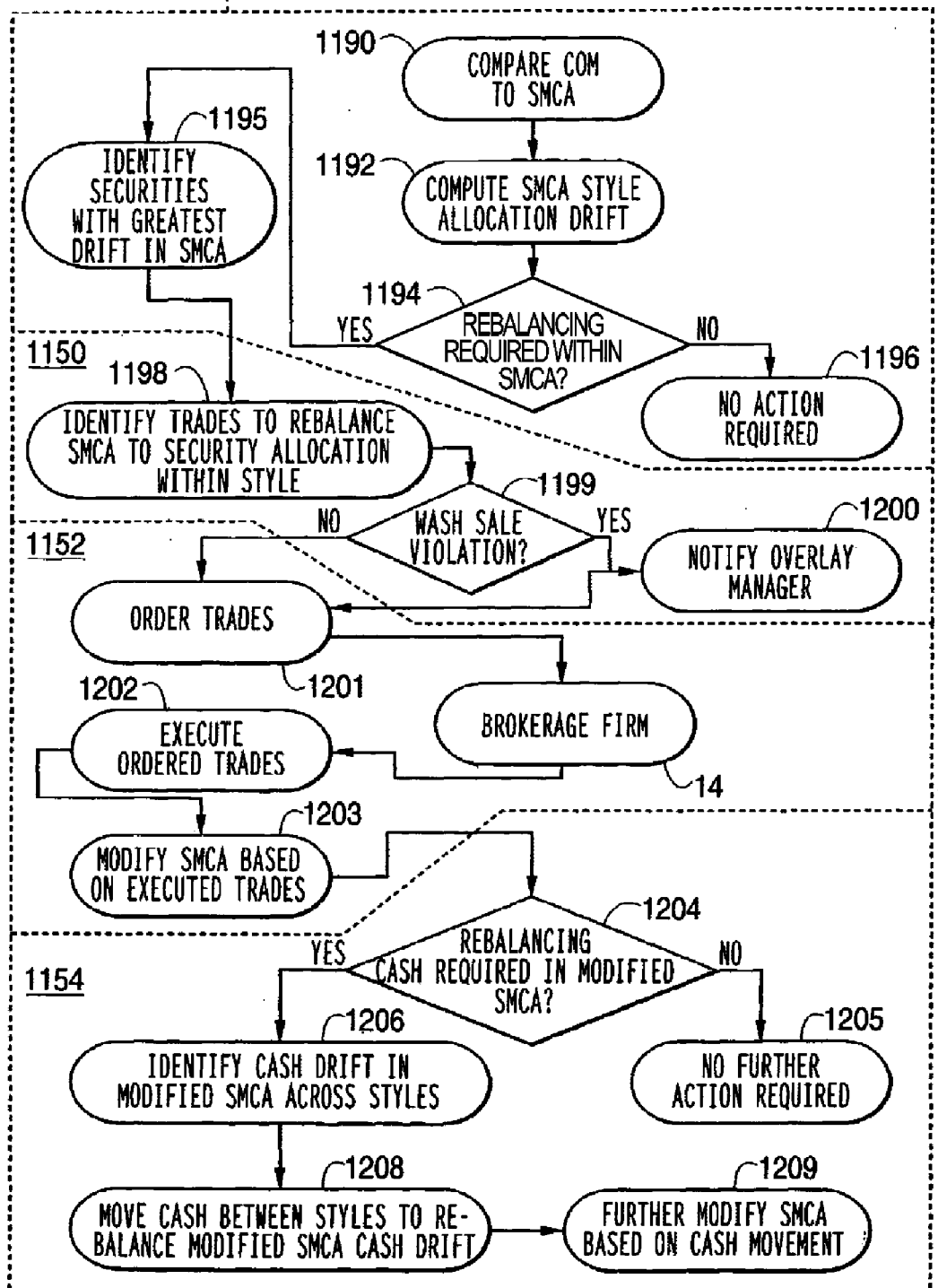
FIG. 20 further details other steps performed in the process shown in FIG. 18.

FIG. 20 further details the steps performed by the processor 1050A in steps 1148-1154 of FIG. 18 if the SMCA is rebalanced to the across style allocation, on a total allocation basis. As shown, the COM, stored in the memory 1050B of the MOM 1050, is compared to the SMCA, stored in the database 1050C of the MOM 1050, by the processor 1050A in step 1190.

In this regard, the processor 1050A in step 1190, compares each individual security allocation in the COM for each style to the actual allocation of each security in the SMCA for that style. In step 1192, the processor 1050A calculates the drift between styles based on a composite of the individual drifts in the security allocations within each style. Based on the computed style drift, the processor 1050A determines if rebalancing is required in step 1194. It should be noted that depending on the selected type of rebalancing, the overall security allocation drift for each style of securities in the SMCA will be computed with respect to the security allocation for that style within the COM. If it is determined that rebalancing is not required, no further action will be taken as indicated by step 1196. If rebalancing is required, the processor 1050A, in step 1195, identifies those securities within each style in the SMCA having either the greatest drift or any drift from the allocation for that security in that style set forth in the COM.

If a security identified in step 1195 exceeds the weighting of that security in the COM, the processor 1050A will determine the amount, e.g. the number of shares to sell down that security from the SMCA in step 1198. On the other hand, if the allocation of a security identified in step 1195 is below the weighting of that security in the COM, the processor 1050A will determine the amount, e.g. the number of shares, of the security to buy into the SMCA in step 1198. If the purchase of shares is required, the processor 1050A will also determine if such a purchase will result in a wash sale violation, in step 1199. If so, the processor 1050A issues a notice to the overlay manager as indicated in step 1200 and will not generate any order to purchase shares of the violating security.

The processor 1050A proceeds to step 1201 if appropriate. The execution of the applicable trades for the determined amounts of the securities to the sold from or purchased for respective styles of the SMCA will rebalance the SMCA to within an acceptable tolerance of the style allocation of the COM. The processor 1050A, in step 1201, initiates the trade orders and aggregates the orders into a trade block by implementing the generate order function 1050A5, shown in FIG. 15. The trade block is forwarded to the brokerage firm 14. In step 1202, the trades are executed by the brokerage firm 14. After execution of the ordered trades, the processor 1050A, based upon the receipt of input having the executed trade information, modifies the SMCA based on the executed trade information in step 1203.

In step 1204, the processor 1050A determines if a rebalancing of the cash in the modified SMCA is required. If not, no further action is taken as indicated by step 1205. If cash rebalancing is required, the processor 1050A identifies the drift in the cash in each style in the SMCA with respect to the cash allocation for each style in the COM, in step 1206. In step 1208, the processor 1050A transacts the SMCA to move cash between styles to rebalance the modified SMCA for the identified cash drift.

Figure 20A:
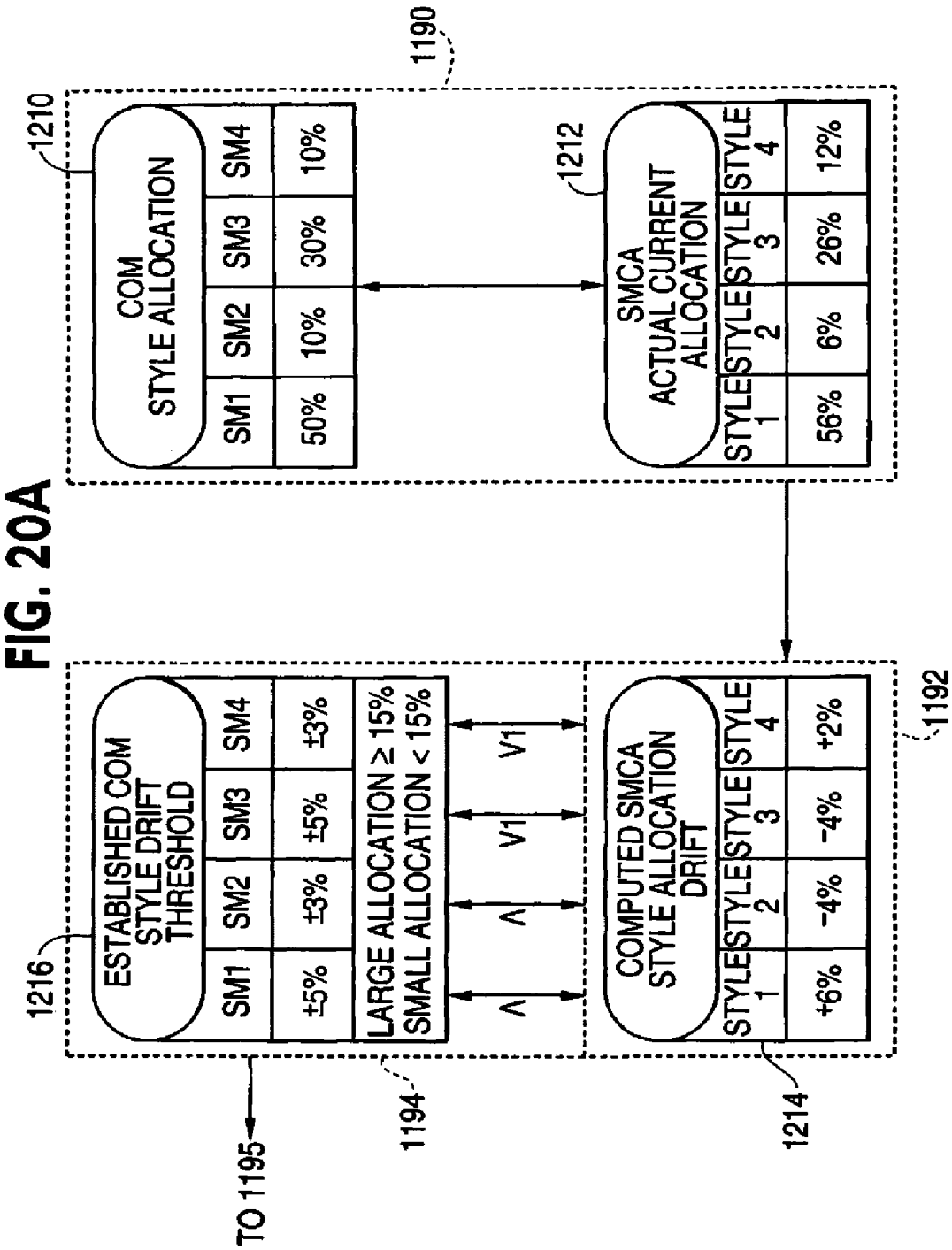
FIG. 20A further details steps shown in FIG. 20.

FIG. 20A further details the processing performed by the processor 1050A in steps 1190-1194 of FIG. 20 when the MOM decides whether to rebalance if style drift is found. In the example shown, the COM style allocations 1210 are established as 50% for the style represented by SM1, also referred to as style1, 10% for the style represented by SM2, also referred to as style2, 30% for the style represented by SM3, also referred to as style3, and 10% for the style represented by SM4, also referred to as style4. The SMCA actual current allocation 1212 is 56% for style1, 6% for style2, 26% for style3, and 12% for style4. The COM allocation and SMCA allocation are compared and the computed SMCA style allocation drift 1214 is shown to be +6% for style1, −4% for style2, −4% for style3, and +2% for style4. The SMCA also includes a style drift threshold 1216, which varies depending upon whether the style model is considered to have a large or small allocation. As indicated, delineation between large and small allocations is selected to be 15%. Accordingly, style1 and style3 are considered large allocation styles, since they have an allocation greater than or equal to 15% of the total allocation. On the other hand, style2 and style4 are considered small allocation styles since their allocations are 10% and hence, less than the 15% minimum for large allocation styles. Accordingly, style1 and style3 have a drift threshold of + or −5%, whereas style2 and style4 are given a drift threshold only + or −3%.

Figure 21:
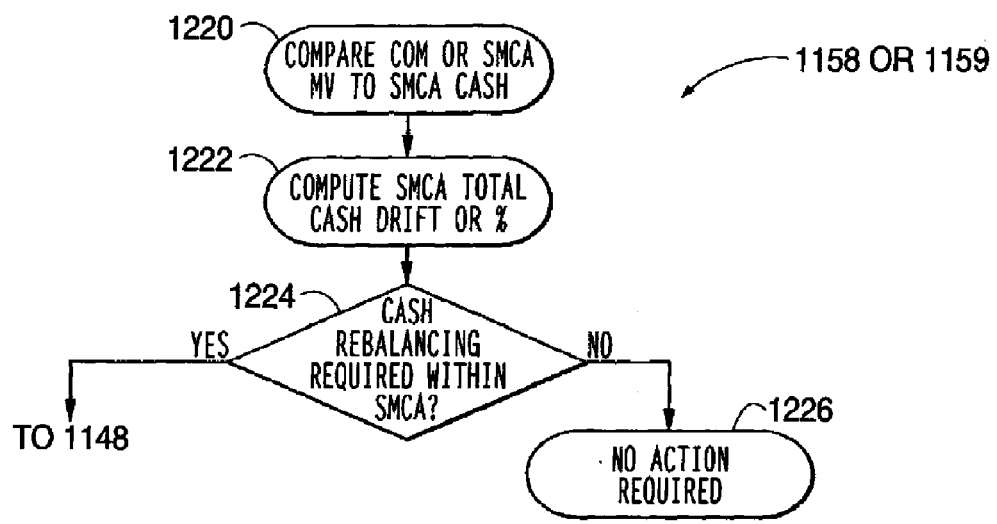
FIG. 21 further details still other steps performed in the process shown in FIG. 18.

Thus, in comparing the thresholds 1216 with the computed SMCA style allocation drifts 1214, it can be seen that the drift of style1 and style2 exceed their associated thresholds whereas the drift in style3 and style4 do not exceed their associated thresholds. Accordingly, a rebalancing of style1 and style2 are required and therefore, in step 1194 it will be determined that rebalancing is required of the entire SMCA. Referring back to FIG. 18, if cash rebalancing trigger is selected in step 1146, the processor 1050A will identify the total SMCA cash drift in steps 1158 or 1159 depending on whether drift rebalancing based on the COM cash allocation or the percentage of SMCA market value is selected. FIG. 21 further details the process performed by the processor 1050A in identifying the cash drift. As shown, the processor 1050A compares the total SMCA cash allocation to either the total COM cash allocation parameter or the desired percentage of SMCA total market value parameter market value to the total cash and the SMCA in step 1220. In step 1222, the SMCA total cash drift or total cash percentage as compared to the market value is computed. Based upon the computation, a determination is made, in step 1224, by the processor 1050, as to whether or not cash rebalancing is required within the SMCA. If not, no action is taken as indicated by step 1226. If rebalancing is required, the processor 1050A proceeds to step 1148 of FIG. 18.

Figure 21B:
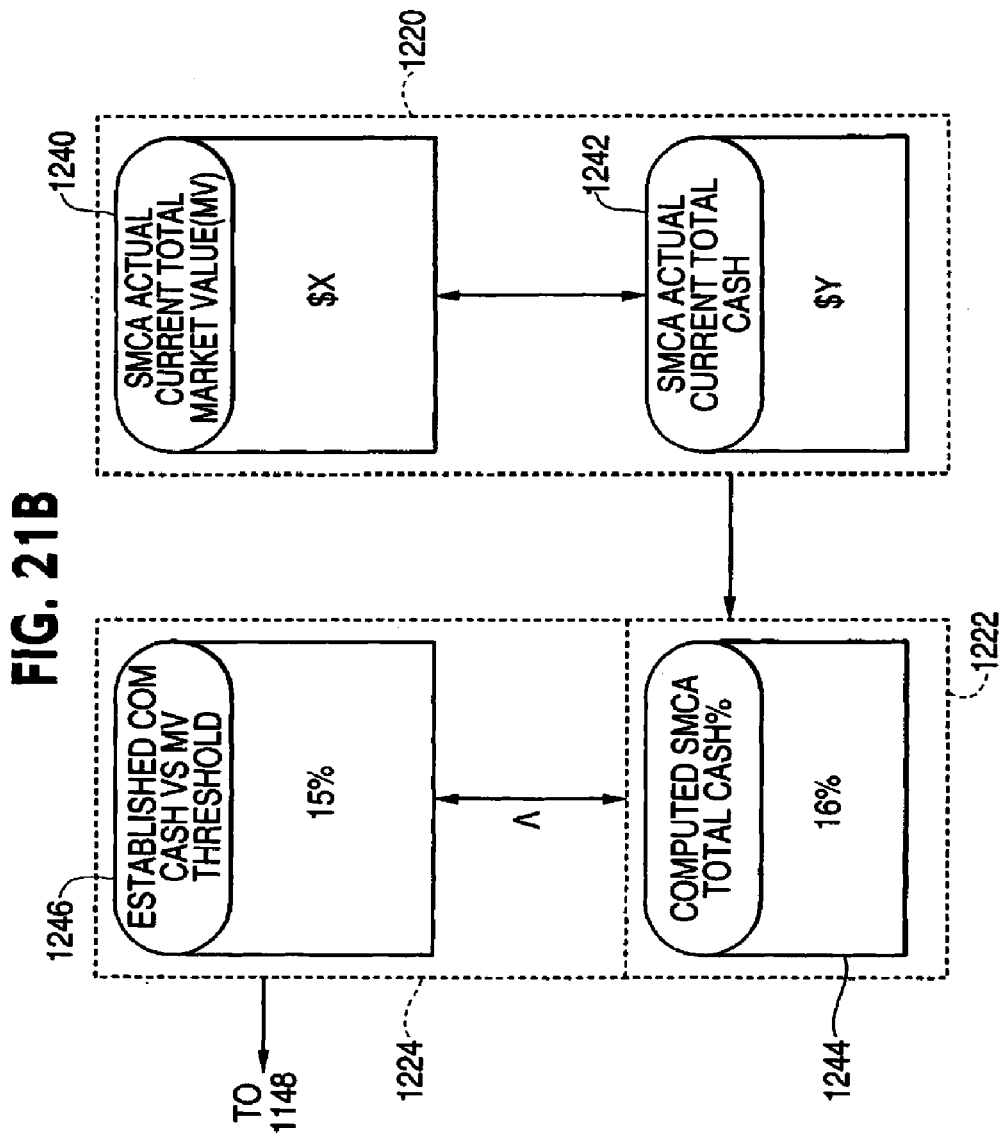
FIG. 21B further details the steps detailed in FIG. 21A, in an alternative implementation.

The processing performed in steps 1220-1224 is further detailed in FIGS. 21A and 21B. As shown in FIG. 21A, the COM includes a total cash allocation parameter 1230. In this example, the allocation is established at 8%. This is compared with the SMCA actual current total cash allocation 1232. As shown from this example, the allocation is indicated to be 14%. The computed SMCA total cash allocation drift 1234 is, as shown, +6%.

The COM preferably includes an established COM cash drift threshold 1236. As shown, the threshold is +5% and −2%. Since the SMCA cash drift of +6% exceeds the +5% threshold, rebalancing is required and the processor will proceed to step 1148 of FIG. 18.

As shown in FIG. 21B, when the drift will be determined with respect to the desired percentage of SMCA market value, the SMCA actual current total market value 1240 is compared in step 20 to the SMCA actual current total cash 1242. In this example, the market value 1240 is indicated to be X dollars and the current total SMCA cash is indicated to be Y dollars. The computed SMCA total cash percentage 1244 computed by dividing Y dollars by X dollars and multiplying by 100 is shown, from this example, to be 16%. The established COM cash versus market value threshold 1246 in this example is set at 15%. Since the SMCA total cash is 16% of the total market value and hence exceeds the 15% threshold, rebalancing is required and the processor 1050A proceeds to step 1148.

In summary, the processing in FIGS. 18 to 21B provides accurate drift monitoring of both cash and securities at the style and entire account levels. Furthermore, different thresholds can be established for different types of drift and the rebalancing initiated only if the determined drift falls outside of the relevant threshold. Preferably, the drift is monitored and the rebalancing is automatically performed periodically, for example, each evening after the markets have closed.

Style Model Swaps

Figure 22:
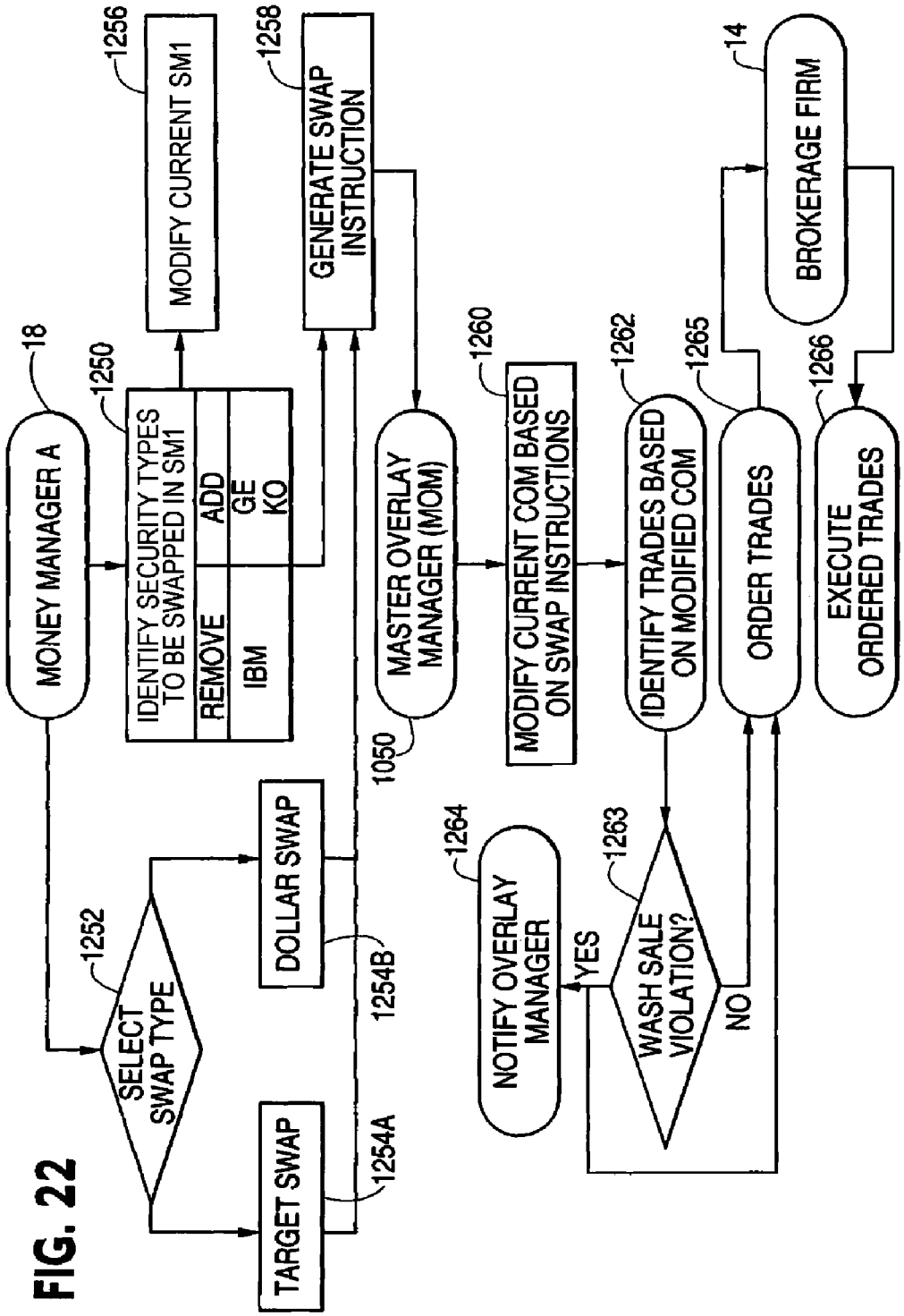
FIG. 22 depicts the processing performed by the money manager portfolio management system and master overlay manager portfolio management system to swap of securities, in accordance with the present invention.
Figure 22A:
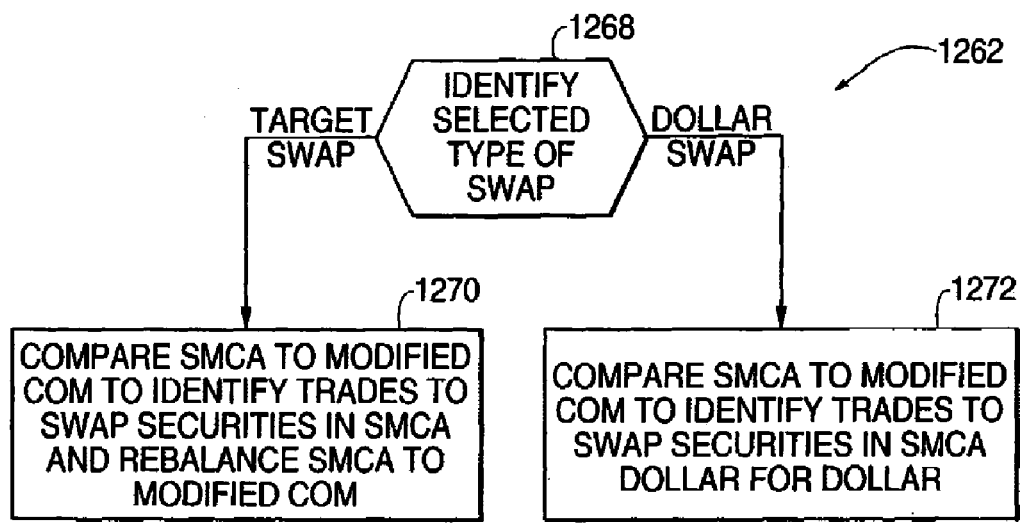
FIG. 22A further details one of the steps performed by the master overlay manager portfolio management system in the processing shown in FIG. 22.

FIGS. 22 and 22A depict the process performed by the processor 1050A of the MOM 1050 in executing the execute style swap function 1050A10 and of the processor 1036A of MMPMS 1036 in executing the SMCA style swap function 1036A5. It will be understood that the individual money managers 18-24 may swap security types within their respective models by operating the MMPMS 1036 so as to execute the SMCA style swap function 1036A5. The MOM 1050 can then, by executing the swap function 1050A10, incorporate the style model swap instructions into all affected COMs and ripple the effect across all associated SMCAs. Here again, the MMPMS 1036 interfaces with the applicable style model within the COMs stored in memory 1050B of the MOM 1050, via the interface between the MMPMS 1036 and MOM 1050.

Swaps within an individual style can be either a single security type for a single security type swap or a swap of one security type for several different security types or several different security types for a single security type. In the example shown in FIG. 22, money manager 18 initiates the swap by identifying, in step 1250, the security types to be swapped in SM1. As shown, the IBM identifier is to be removed from the SM1 model and GE and KO security identifiers are to be added to the SM1 model. In step 1256, the model stored at the MMPMS 1036 operated by money manager 18 is also modified to reflect the identified swap. The money manager, in step 1252, selects a desired type of swap. As will be described further with reference to FIG. 22A, either a target swap 1254A or dollar swap 1254B is selected. Based upon the swap type selected in step 1252 and the securities identified in step 1250, the MMPMS processor 1036A generates the swap instruction in step 1258, and forwards the instruction to the MOM 1050.

In the event that the MOM 1050 performs the MMPMS SMCA style swap function 1036A5, it should be understood that steps 1250 and 1252 would be similarly generated and the affected COMs would be identified and modified in step 1256. Thereafter, the MOM 1050 would simply continue with the processing steps 1262 to 1265 as will be described below.

After generating the swap instructions in step 1258, the MMPMS processor 1036A forwards the instruction to the MOM 1050 via the interface previously described. The MOM processor 1050A now executes the swap function 1050A10 to complete the swap processing. As indicated in step 1260, the processor 1050A identifies the COMs affected by the swap instructions and modifies the SM1 portions of each accordingly. For simplicity in this discussion, it is assumed that only one COM is affected. Accordingly, the modified COM stored in memory 1050B of MOM 1050 will correspond to the modified SM1 stored in memory 1036B of the MMPMS 1036 operated by money manager A 18. In step 1262, the processor 1050A identifies all the SMCAs affected by the COM change and the specific trades required based on the modified COM. For simplicity in this discussion it is assumed that only one SMCA is affected. More particularly, the trades identified are those required to eliminate IBM securities from style1 in the SMCA and to add GE and KO securities to style1 of the SMCA.

The processor 1050A next executes the SMCA wash sale function 1050A3 to determine, in step 1263, if the execution of the identified trades will result in a wash sale violation. If so, a notice is issued to the overlay manager in step 1264 and the trades for that particular account are not generated. The processor 1050A executes the generate trade order function 1050A5, in step 1265, to generate the required trade orders. The trade orders are forwarded to the brokerage firm 14 and executed in step 1266.

Referring again to FIG. 22, the process performed in identifying the trades based on the selected type of swap will be further detailed. As discussed above, in step 1252 of FIG. 22, either a target swap or dollar swap type is selected. A target swap will be selected to ensure that the swapped securities are purchased with the appropriate weights based upon the COM. For example, if IBM securities are over weighted in the SMCA, the GE and KO securities will be purchased to ensure that the number of shares of GE and KO securities are consistent with the associated allocations for those securities within the SM1 portion of the modified COM. Any excess proceeds from the sale of IBM will remain in cash.

A dollar swap is selected to ensure that the swapped securities are purchased in the same market value amount as the removed securities. For example, if the IBM security is over weighted, the purchased GE and KO securities will be purchased in an amount equal to the market value of the IBM securities being sold, on a dollar-for-dollar basis, so that the GE and KO securities will be correspondingly over weighted. As shown in FIG. 22A, the processor 1050A will identify in step 1268, the type of swap based on the received swap instructions. If a target swap is identified, the processor 1050A, in step 1270, compares the SMCA to the modified COM to identify the trades necessary to swap the securities in the SMCA and rebalance the SMCA to the modified COM. On the other hand, if the identified swap type is a dollar swap type, the processor 1050A, in step 1272, identifies the securities to be swapped from the modified COM and identifies the dollar amount(s) of these securities to be traded on a dollar-for-dollar basis from the SMCA.

It should be understood that, although the discussion of FIGS. 22 and 22A focused on a style model security swap affecting only one COM and one SMCA, a style model security swap could potentially affect multiple COMs and SMCAs. Beneficially, the MOM 1050 would automatically extend the scope of the described processing to all affected COMs and SMCAs.

The Overlay Model and Managed Client Account

FIG. 23 details an exemplary COM 1280, suitable for use in the FIG. 13 architecture. As discussed above with reference to FIG. 17, the COM is a compilation of the various style models, e.g. SM1-SM4 of the money managers A-D 18-24. As shown, the COM 1280, as discussed with reference to FIG. 17, combines the multiple style models, i.e. SM1-SM4, for multiple investment styles, i.e. style1-style4. Within each of the SMs incorporated in the COM is a list of security identifiers, e.g. IBM, CKFR, KO, PFE, C, F, T, and GM etc. Associated with each of the security identifiers is a percentage weight, e.g. 5%, 4%, 8%, 3%, 1%, 6%, 2%, etc. The identifier for each security is preferably simply the identifier (ticker) utilized by the stock exchange on which shares of that security are traded. However, this is not mandatory. It should be noted that in the COM of FIG. 23, an IBM security identifier is included in both the style1 portion of the COM, corresponding to SM1, and the style2 portion of the COM, corresponding to SM2. Hence, IBM securities will be included in both the style1 portion of the SMCA and the style2 portion of the SMCA. Note also that although an overlay model is provided in the FIG. 13 architecture, unlike the overlay model of the FIG. 1A architecture, there is no need to tag the security identifiers within the COM.

Figure 6:
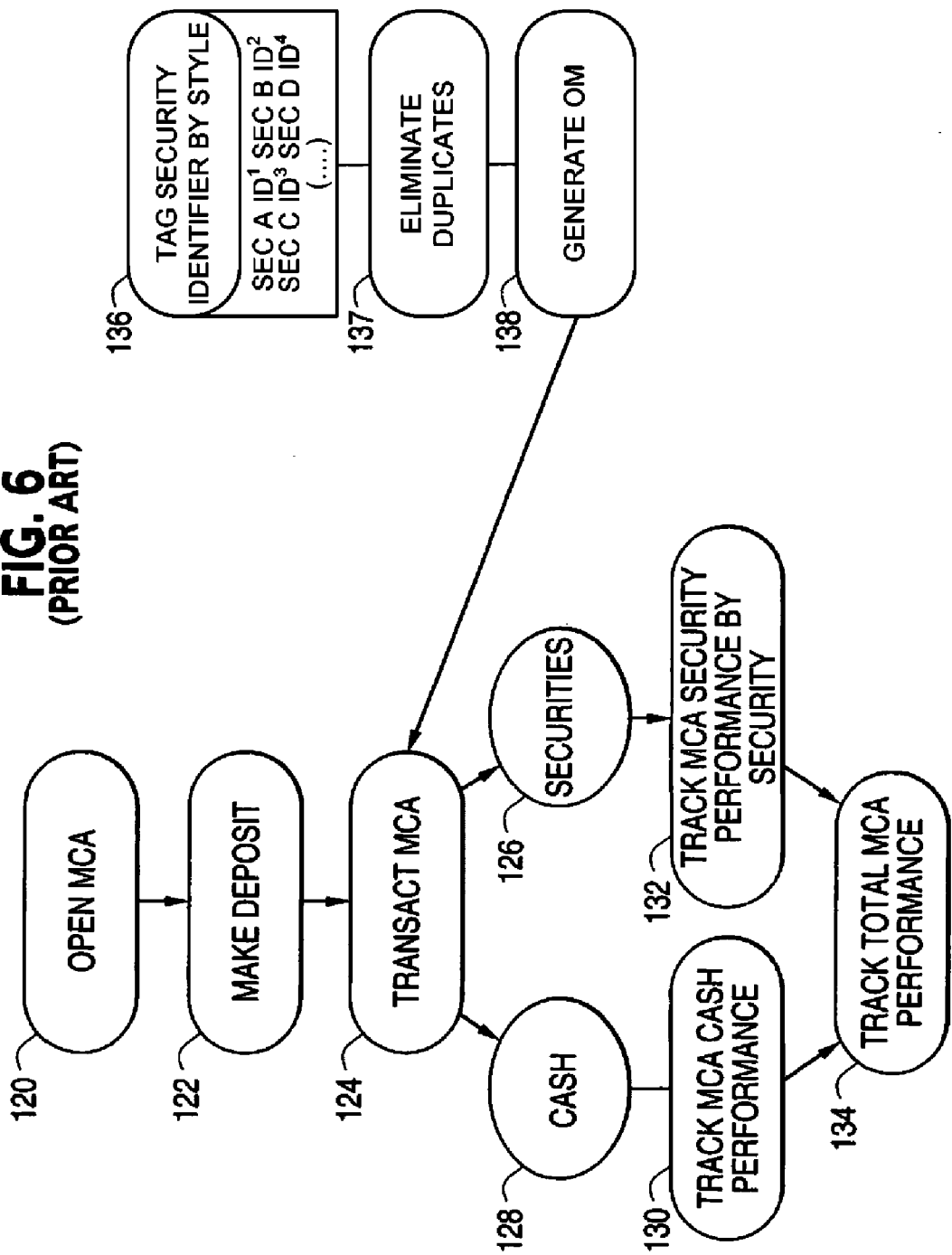
FIG. 6 depicts the tracking of performance of the multi-style managed client investment account in the architecture of FIG. 1A.
Figure 6A:
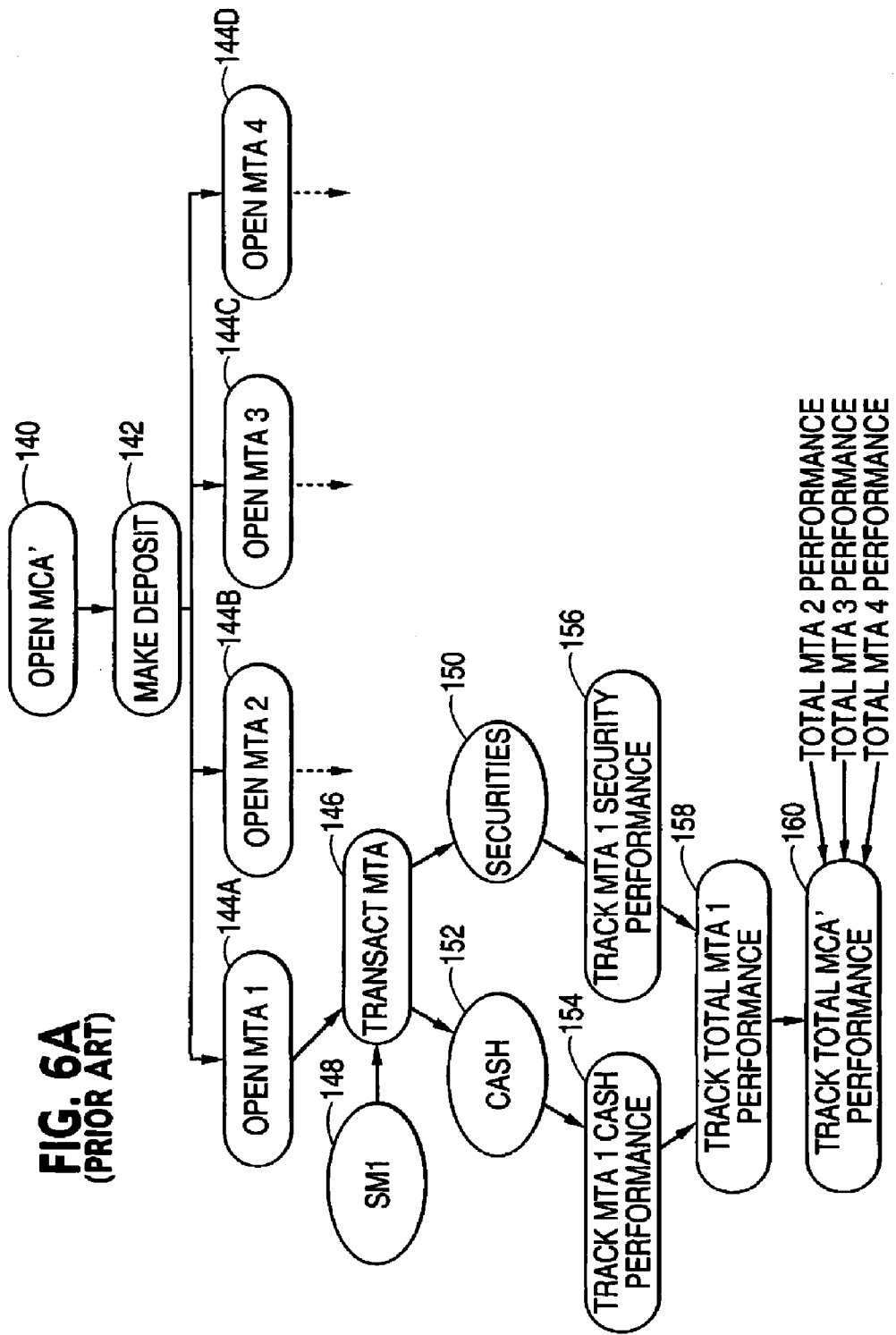
FIG. 6A depicts the tracking of performance of the multiple managed trading accounts and the compiled managed client investment account in the architecture of FIG. 1B.
Figure 8A:
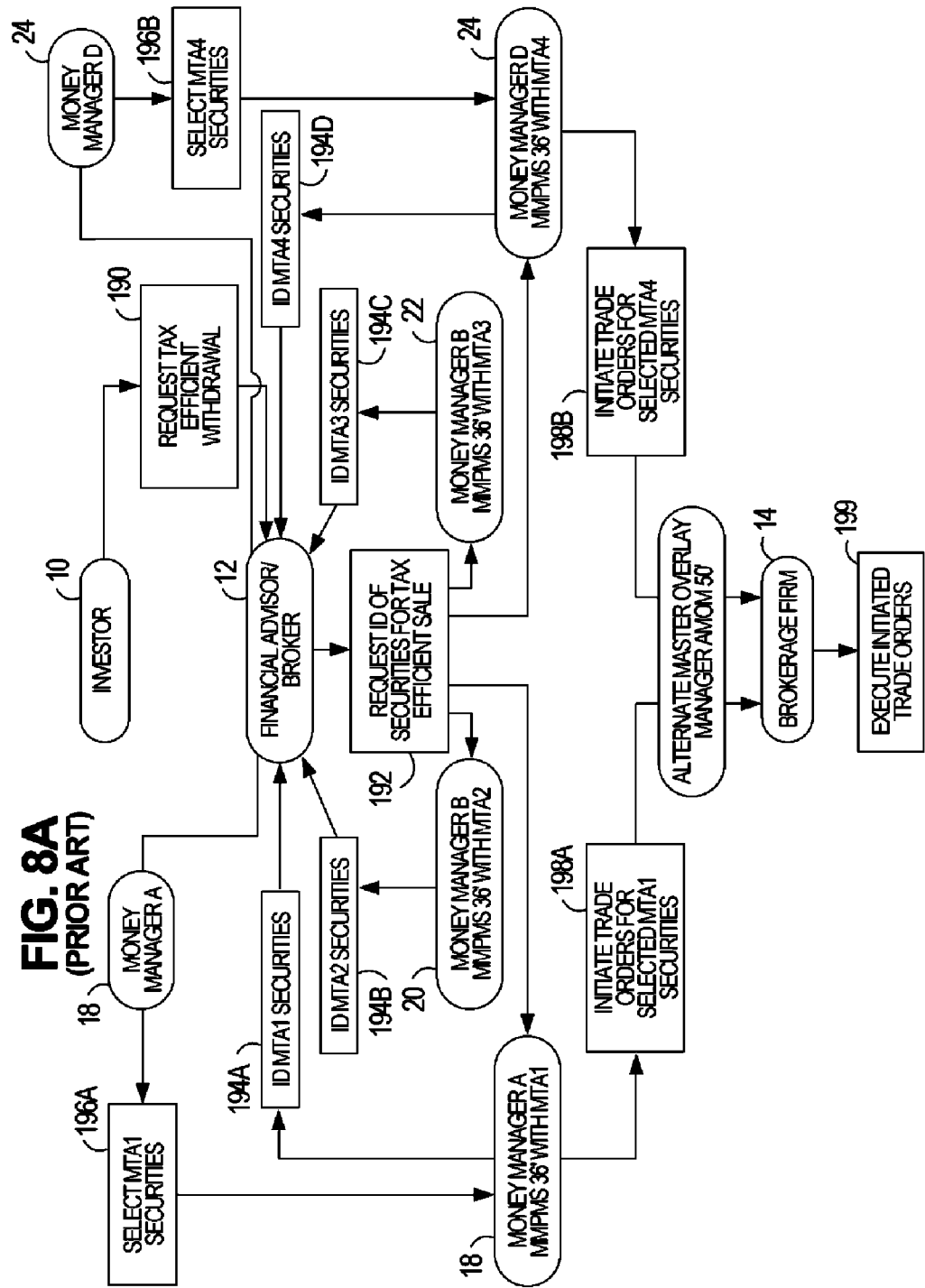
FIG. 8A depicts the initiation and execution of tax efficient trades in the architecture of FIG. 1B.
Figure 11:
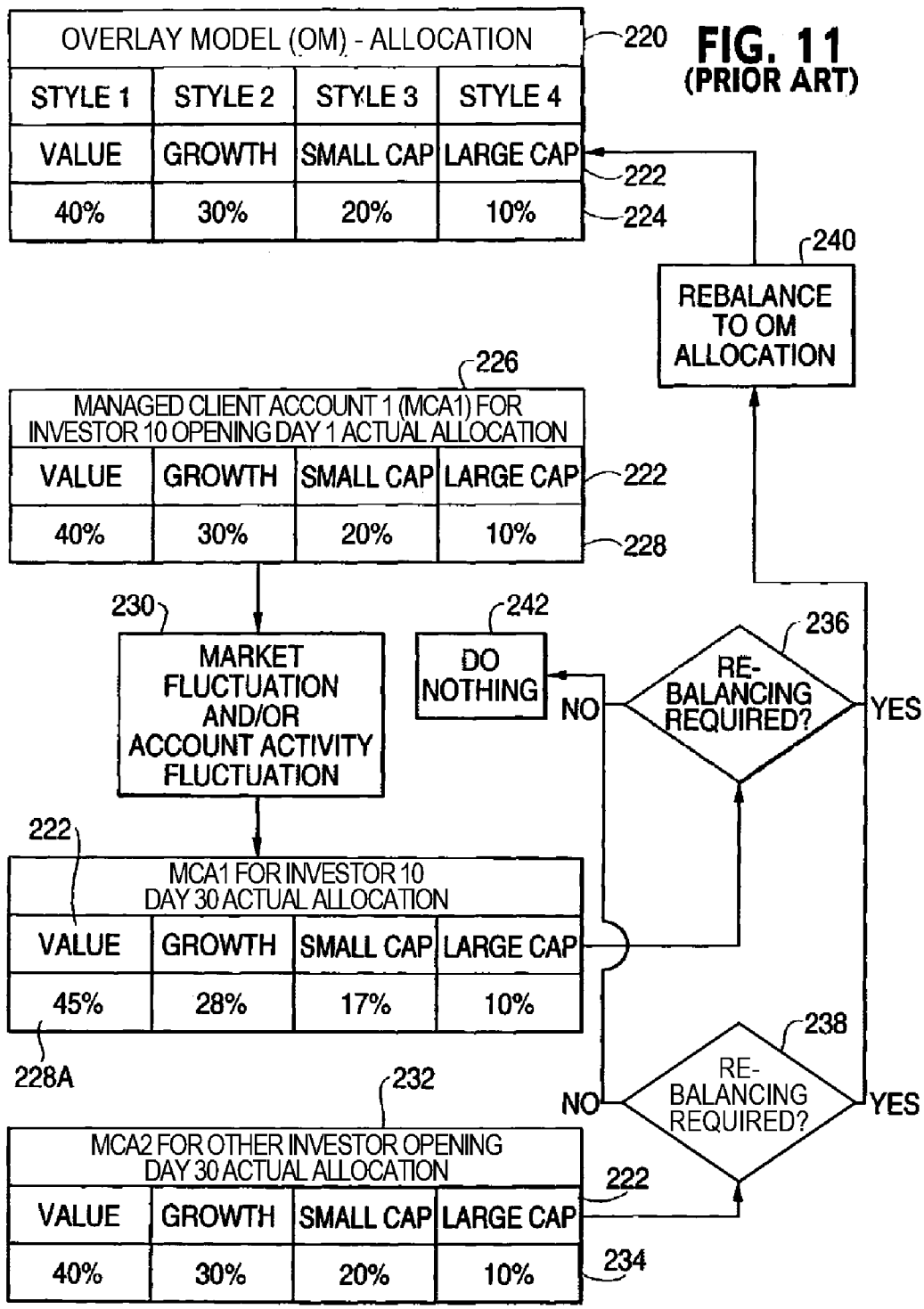
FIG. 11 depicts the rebalancing of style allocation drift across multiple styles in the multi-style managed client investment account in the architecture of FIG. 1A.
Figure 12:
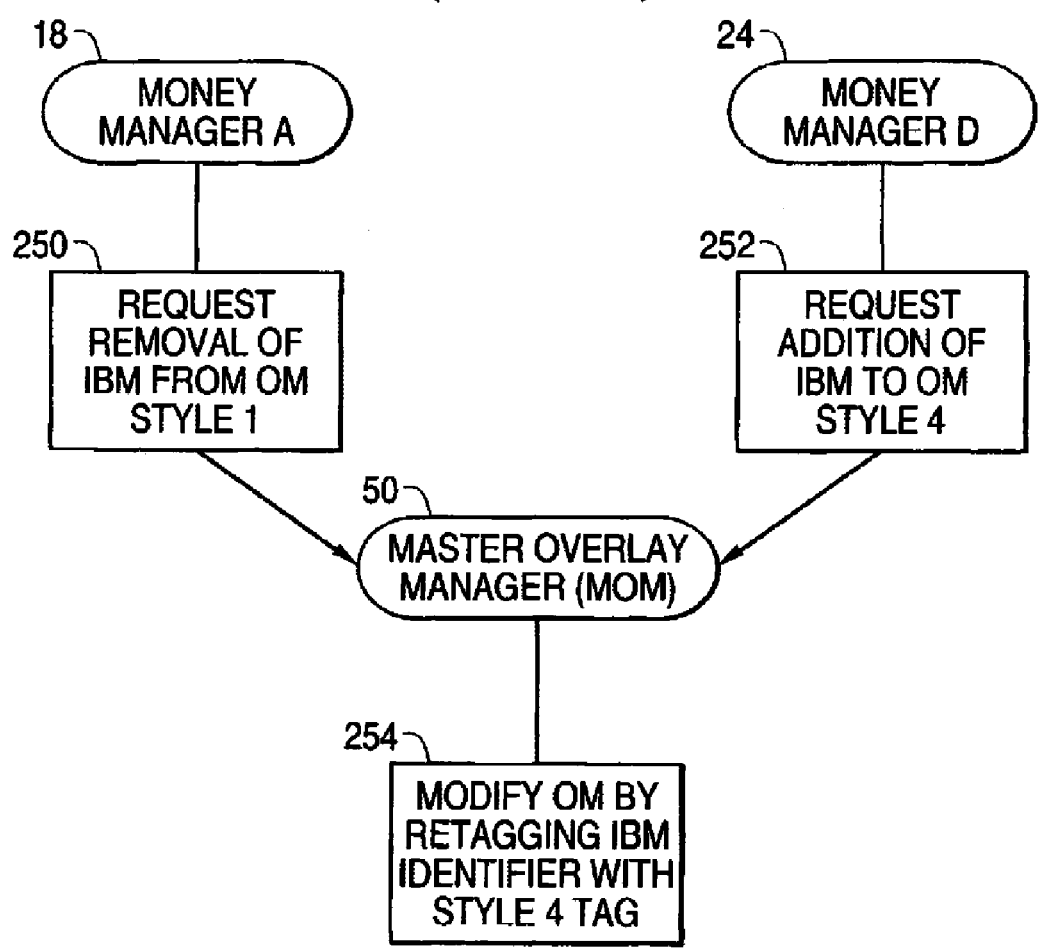
FIG. 12 depicts retagging of a security identifier in the overlay model shown in FIG. 9 to effectively net transactions for different styles in the multi-style managed client investment account, in the architecture of FIG. 1A.

FIG. 23A further details a stylized master client account (SMCA) 1282, suitable for use in the FIG. 13 architecture. As discussed above with reference to FIG. 6, the SMCA 1282 includes information necessary to accurately track both security and cash performance on both a style-by-style basis and a total client account basis. If desired, the SMCA 1282 could beneficially include a listing of current positions in the securities held within the SMCA and in total cash within each style of the SMCA. As indicated, the SMCA includes 100 shares of IBM, 200 shares of CKFR, etc. Minimally, however, the SMCA includes a listing of current untagged cash positions for each style. As indicated, the SMCA includes $2000.00 in the style 1 portion, $1000.00 in the style 2 portion, etc. Finally, also minimally, the SMCA includes a listing of all security and cash transactions, including initial and subsequent security purchase, dividends paid, interest accrued, securities moved, and cash moved. As indicated, the SMCA includes a hundred shares of IBM, purchased as tax lot KTFC on Jan. 3, 1985, and 200 shares of CKFR, purchased as tax lot CHFP on Jan. 5, 2003, etc. Also listed are IBM dividends (IBMDIV), interest, and transactions relating to the sale of GM (SGM), the purchase of IBM securities (PIBM), a withdrawal of cash (WCASH), a deposit of cash (DCASH), and a transfer out of KO securities (TOKO), and transfer in of KO securities (TIKO), etc.

Each of the positions, if included, i.e. for securities, total cash, and untagged cash and each of the transactions is tagged with a single style indicator. This tagging allows the MOM 1050 to track all cash and securities associated with the SMCA on a style-by-style basis for the multiple styles, i.e. style1-style4. For example, each security identifier within the SMCA representing a tax lot of purchased securities which currently reside in the SMCA is tagged, or otherwise associated with, the specific style represented in the SMCA, and thus to a specific one of style1-style4. As shown, the IBM securities purchased on Jan. 3, 1985, are associated with style1 within the SMCA. The KO securities purchased on Nov. 9, 2002, are tagged with a "2" and therefore associated with style2 within the SMCA. It is worth noting that the IBM securities purchased on Jan. 10, 2003, are tagged with a "2" indicating their association with style2 within the SMCA. Correspondingly, the IBM dividend deposited in the SMCA is divided in proportion to the IBM holdings in style1 and style2. Accordingly, the dividend is reflected into entries, one tagged and hence, associated with style1 and the other tagged so as to be associated with style2. Interest on, for example, the allocated cash which remains in the SMCA, is divided between the four styles in proportion to the cash allocations. Other entries in the SMCA, and their tagging will be discussed further below. It should however be recognized that the tagging within the SMCA facilitates various functions of the MOM 1050 and MMPMS 1036.

Tax Efficient Trading

Figure 24:
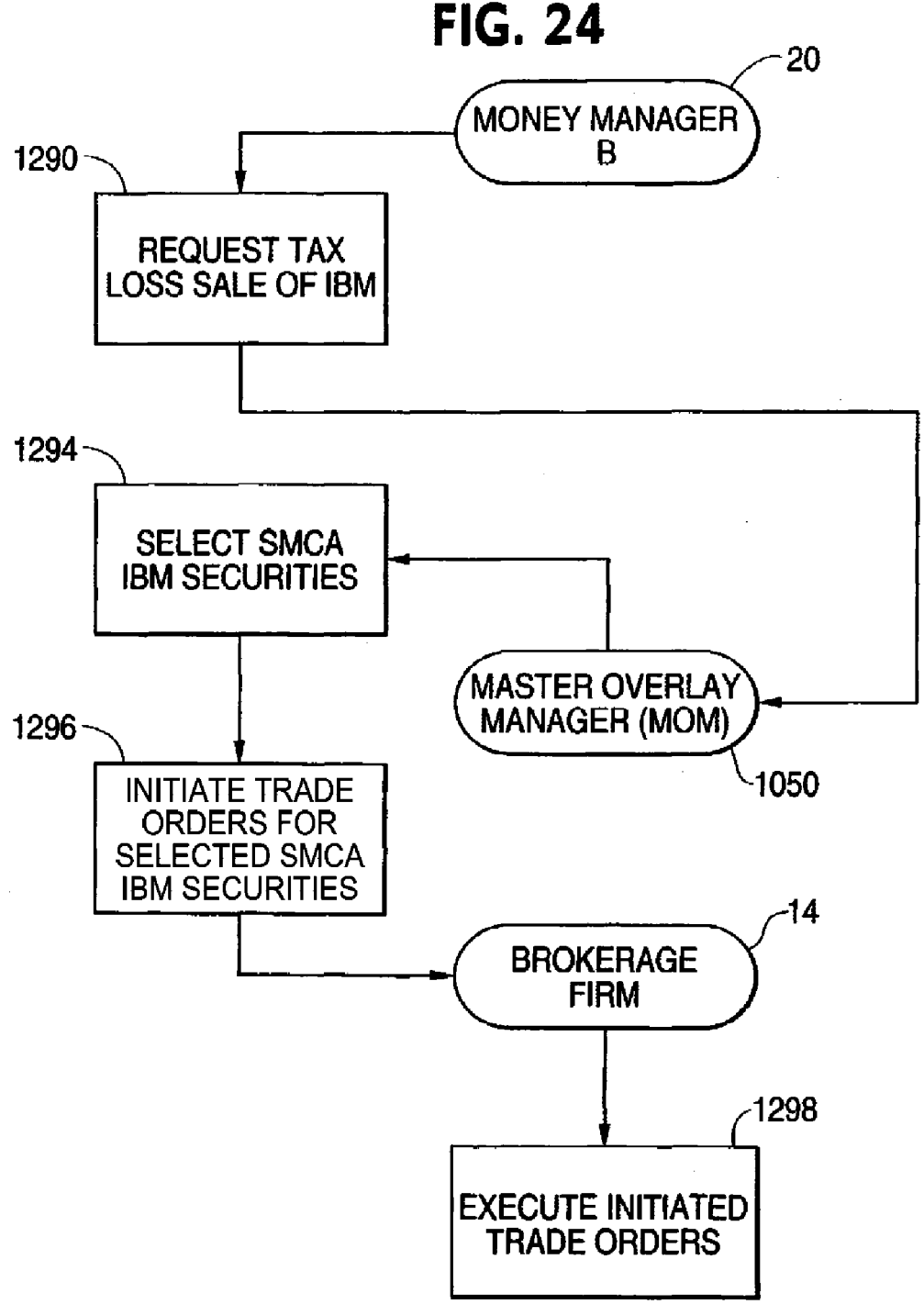
FIG. 24 depicts the processing performed by the master overlay manager portfolio management system shown in FIG. 15 to initiate a tax loss sale, in accordance with the present invention.

FIG. 24 depicts the processing performed by the processor 1050A of the MOM 1050 in executing the SMCA tax efficient trading function 1050A2, shown in FIG. 15. As shown, in step 1290, the money manager B 20 requests a tax loss sale of IBM securities. This request is preferably transferred to the MOM 1050 via the interface between the MMPMS 1036 and the MOM 1050. Alternatively, the request could be initiated by the financial advisor 12 on behalf of the investor 10. In any case, the processor 1050A of the MOM 1050, executes the tax efficient trading function 1050A2 to select the IBM securities shown in FIG. 23A, which have been tagged with style1 and were purchased on Jan. 3, 1985, rather than the IBM securities tagged with the style2 indicator, which were purchased on Jan. 10, 2003, in step 1294. The reason the style1 lot was selected could be because it has a higher cost basis or the sale would result in a long term rather than short term gain.

The processor 1050A then executes the generate trade order with tag function 1050A5 to generate the trade order for the IBM securities and lot KTFC in step 1296. The generated trade orders are then forwarded to the brokerage firm 14 and executed in step 1298.

It should be noted that the MOM 50 of the FIG. 1A architecture had no need to select between securities of the same type in different styles, since the same types of securities are not allowed in different styles in the architecture of FIG. 1A. Although not shown in FIG. 24, the processor 1050A may beneficially also execute the SMCA tag transaction function 1050A7 to transfer shares of IBM tagged with the style2 to replace the shares of IBM sold at the request of money manager 20 in style1 and thus remain within a tolerance level of compliance with the COM. Hence, these transferred shared would be retagged from style2 to style1. Additionally, any required cash movement to compensate for any difference in the cost of the IBM shares sold from tax lot KTFC and those transferred from tax lot TUVY would be made by the processor 1050A so that the performance of style1 and style2 within the SMCA would be unaffected by the transfers required to perform the tax efficient trading in FIG. 24.

Thus, although the processor 1050A identifies shares of IBM from tax lot KTFC which were purchased in 1985, rather than the IBM shares in tax lot TUVY which were purchased in 2003, in order to minimize the tax consequences for the investor 10, IBM shares are transferred from style2 to style1, and the performance of these style1 and style2 portions of the SMCA are unaffected.

Figure 25:
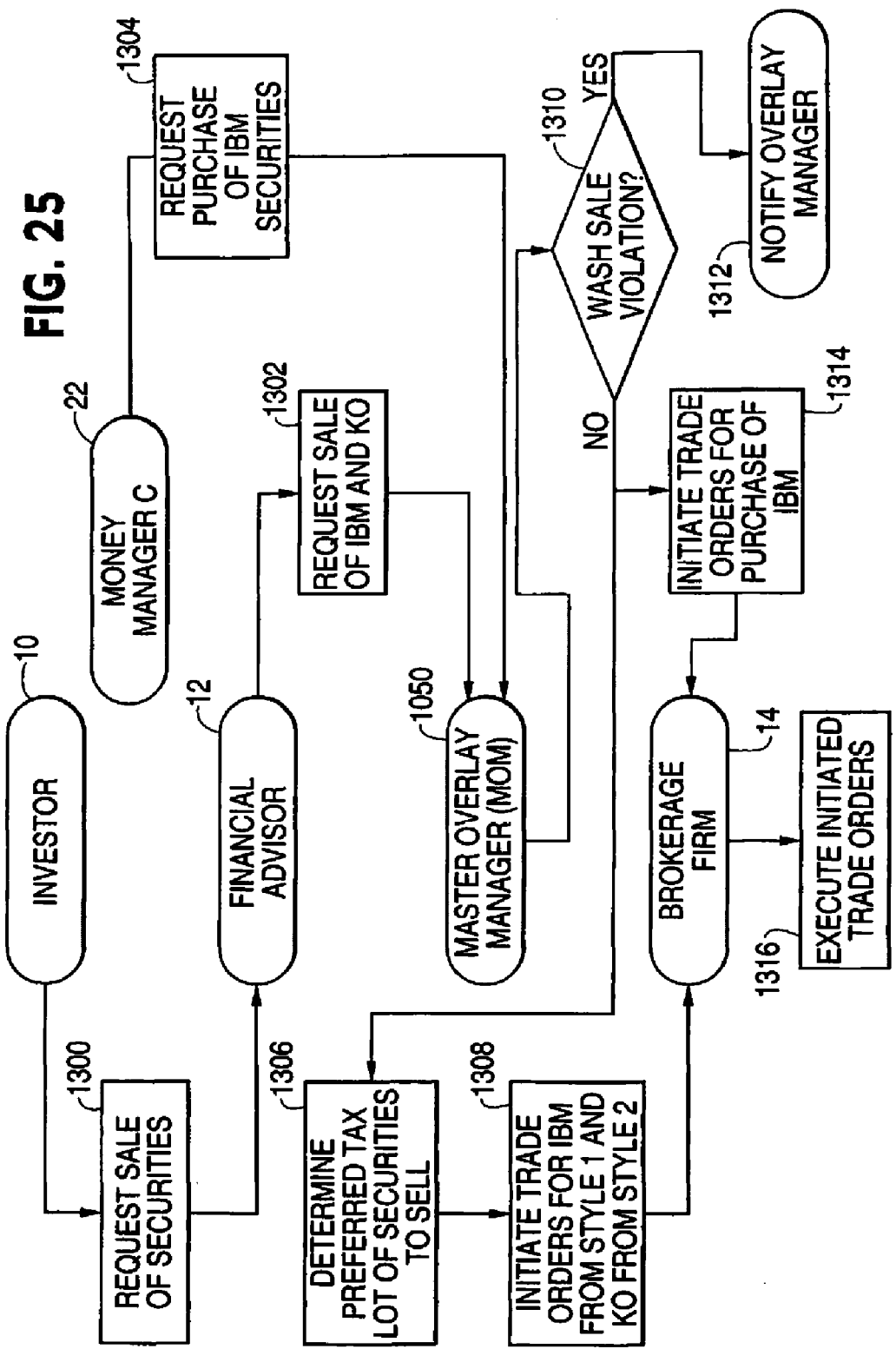
FIG. 25 depicts the processing performed by the master overlay manager portfolio management system shown in FIG. 15 to initiate the sale of a preferred tax lot of securities and to avoid a wash sale violation, in accordance with the present invention.

FIG. 25 depicts another scenario in which the MOM 1050 may be called upon to determine the preferred tax lot of securities to sell in order to avoid unfavorable tax consequences. As shown in FIG. 25, the investor 10 requests the sale of securities in step 1300. The request is forwarded to the financial advisor 12. The financial advisor 12 requests a sale of IBM and KO securities in step 1302 and forwards this request to the overlay manager, represented by the MOM 1050. At substantially the same time, the money manager C 22 also requests the purchase of IBM securities in step 1304 and forwards this request via the interface between the MMPMS 1036 and the MOM 1050, to the MOM 1050A processor. The MOM executes the SMCA tax efficient trading function 1050A2 to determine, in step 1306, the preferred tax lot of IBM and KO securities to sell. The preferred tax lots would be selected from the entire SMCA, because one or both of the IBM and KO securities may be held in the SMCA under multiple styles.

The processor 1050A then executes the generate trade order function 105A5, in step 1308, to initiate the trade order for the IBM securities to be sold from the style1 holdings in the SMCA and the KO securities from the style2 holdings in the SMCA based upon the determination in step 1306. The initiated trade orders are forwarded to the brokerage firm 14 and executed in step 1316.

The processor 1050A also executes the SMCA wash sale function 1050A3, in step 1310 to determine if the requested purchase of IBM securities in style3 holdings will result in a wash sale violation. Regardless of the exact timing of the buy and sell trade orders, the processor 1050A considers, in step 1310, whether or not a wash sale violation will occur. That is, if the sale of IBM securities from the preferred tax lot will result in a loss, this loss will be considered in the wash sale violation determination performed in step 1310. If not, the sale may not be considered a wash sale violation as determined in step 1310, if the IBM securities are purchase. The converse is still true. If the IBM securities are purchased, then the preferred tax lot to be sold will result in a loss, the sale will by flagged as a wash sale violation.

If, in step 1310, the processor 1050A determines that a wash sale violation will occur, a notification is issued to the overlay manager as indicated in step 1312. If not, the generate trade order function 1050A5 is executed to generate a trade order for the purchase of the requested IBM securities. This order is also forwarded to the brokerage firm 14 and executed in step 1316.

It may of course be desirable, if the sale and purchase request are received substantially simultaneously, for the processor 1050A to execute the SMCA tag transaction function and move IBM shares from style1 to style3 and to transfer cash from style3 to style1 in payment of the transferred IBM securities. This will avoid the trades to both sell and purchase IBM securities and accordingly, reduce the cost to the investor. Furthermore, depending upon the number of securities desired in the purchase and sell request, it may eliminate any possibility of a wash sale violation in connection with the requested purchase and sale of IBM securities. However, if the investor intended to harvest a tax loss, this goal would not be fulfilled through a simple transfer of securities.

As discussed above with reference to FIG. 25, the functionality of the processor 1050A of the MOM 1050 allows the MOM 1050 the ability to make individual discretionary decisions in transacting the SMCA based upon relevant factors, or at the discretion of the overlay manager, investor or financial advisor. As described with reference to FIG. 25, the MOM 1050 may select securities on the basis of tax preferences rather than trade those securities requested to be traded by a money manager or the financial advisor. Thus, as shown in FIG. 24, the MOM 1050 may select a preferred tax lot to sell or as described with reference to FIG. 25, may avoid purchase and sell orders by transferring securities between different styles within the SMCA. Such transfers will be further described with reference to FIG. 31 below.

Dynamic Cash Distribution

Figure 26A:
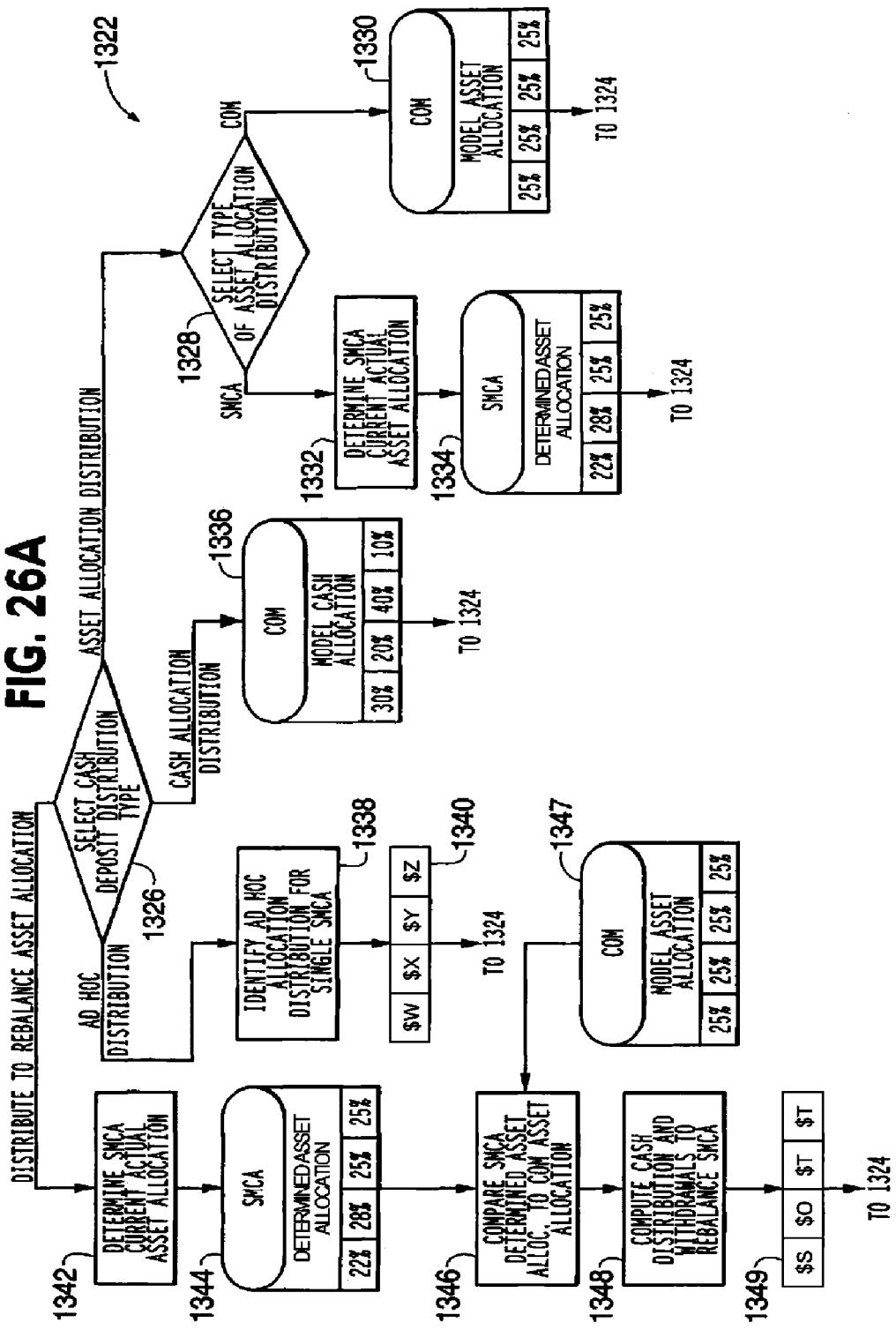
FIG. 26A details one of the steps performed in the processing of FIG. 26, in accordance with the present invention.

FIG. 26 depicts a dynamic cash distribution process which can be performed by the MOM 1050. As shown in FIG. 26, the MOM 1050 receives an additional cash deposit made to the SMCA in step 1320. In step 1322, which will be further detailed in FIG. 26A, the MOM processor 1050A determines the cash deposit distribution, and in step 1324, deposits the cash into cash buckets 1128A-D in accordance with the determined distribution as has been previously described with reference to FIG. 17.

Referring now to FIG. 26A, the process performed in step 1322 is further detailed. Here again, the processor 1050A performs the processing shown in FIG. 26A, by first selecting a cash deposit distribution type. Preferably four types of distribution are available for selection, including asset allocation distribution, cash allocation distribution, rebalanced asset allocation distribution, and ad hoc distribution.

If asset allocation distribution is selected in step 1326, the processor 1050A further selects a type of asset allocation distribution in step 1328. The type of distribution may be based on either the COM model asset allocation 1330 or a current actual asset allocation in the SMCA which is determined in step 1332 can be read from SMCA, and shown as the SMCA determined asset allocation 1334.

If cash allocation distribution is selected, the processor 1050A will distribute the deposit in accordance with the COM model cash allocation 1336. As shown, this will result in 30% of the deposit being allocated to style1 in the SMCA, 20% to style2 in the SMCA, 40% to style3 in the SMCA and 10% to style4 in the SMCA. This should be compared with the equal distribution to the different styles within the SMCA if the COM model asset allocation 1330 is utilized or the distribution of 22% to style1 of the SMCA, 28% to style2 of the SMCA, and 25% to both style3 and style4 in the SMCA if the SMCA determined asset allocation 1334 is used for distributing the cash deposit.

If rebalanced asset allocation distribution is selected in step 1326, the processor 1050A proceeds to determine the SMCA current actual asset allocation. As discussed above, the SMCA determined asset allocation 1344 is identical to the SMCA determined asset allocation 1334 discussed above. The processor 1050A next compares, in step 1346, the determined asset allocation to the COM model asset allocation. The COM model asset allocation 1347 is identical to the COM model asset allocation 1330 discussed above. The processor 1050A will now compute the cash distribution and withdrawals to rebalance the SMCA to the COM based on the comparison performed in step 1446. Thus, as indicated, a distribution 1349 requires S dollars be deposited to style1 of the SMCA, O dollars to style2 of the SMCA and T dollars to both style3 and style4 of the SMCA.

If an ad hoc distribution is selected, the processor 1050A will, typically based upon an input from the overlay manager, identify an ad hoc allocation distribution for the SMCA in step 1338. As shown, a distribution 1340 with W dollars being deposited in style1 of the SMCA, X dollars being deposited in style2 of the SMCA, Y dollars being deposited in style3 of the SMCA and Z dollars being deposited in style4 of the SMCA is identified by the processor 1050A based upon the input of the overlay manager or financial advisor or other source.

It should be noted that the process described with reference to FIGS. 26 and 26A can be reversed for withdrawals. However, in the case of withdrawals, if the withdrawal to rebalance asset allocation is selected, cash withdrawals would be taken from the over weighted styles first in an attempt to bring the SMCA back in line with the COM.

Specific cash deposits and withdrawals would be tagged with the appropriate style and reflected in the SMCA. For example, in FIG. 23A, the SMCA shows a deposit in style1 of $100.00 on Feb. 27, 2003. For each style with a DCASH identifier tagged with the appropriate style number in the SMCA. These deposits could then be traded or would be included in the cash portion of the market value of the style within the SMCA to which it has been tagged. This allows the individual money managers to trade within their respective accounts with their cash balance. The resulting purchased securities are also tagged with the appropriate style.

Cash Balance Tracking

FIG. 27 depicts the algorithm used to build cash balances for each style within the SMCA. This algorithm may be executed by the MOM 1050 as part of the generate SMCA statement function 1050A6, the rebalance SMCA function 1050A1, or another function identified in FIG. 15, as necessary.

As described above, cash deposits are initially divided and allocated to individual styles within the SMCA. As for example shown in FIG. 23A, the SMCA includes what may be characterized as a "cash bucket" for each style for entry of the allocated deposited funds. Deposited and withdrawn funds are not tagged, so the amounts (positions) shown in the lower entry or "cash buckets" of the SMCA will sometimes be referred to as untagged cash.

Untagged cash withdrawals from an individual style in the SMCA are subtracted from the untagged cash deposits. This results in the untagged cash values shown in each of the lower four entries in the exemplary SMCA of FIG. 23A. It is perhaps worth emphasizing here that untagged deposits and withdrawals are those deposits to and withdrawals from the SMCA itself. That is, untagged deposits and withdrawals reflect the free flow of cash into and out of the SMCA rather than cash flows between styles within the SMCA. For example, cash flows resulting from a purchase or sale of shares of a security for a particular style within the SMCA are considered tagged, but the sale of a security that did not belong to any style, e.g. a security left over from an old account, will result in untagged cash that is split among styles based on the COM cash allocation.

As shown in FIG. 27, the untagged cash balance, such as that set forth in the bottom four entries of the exemplary SMCA is now modified by any dividends, interest or other tagged flows into or out of the specific style of interest within the SMCA. More particularly, dividends, interest and other flows are added or subtracted to the untagged cash balance to obtain a cash balance for both untagged and tagged funds which have flowed into and out of the particular style in the SMCA.

For example, if a dividend is paid on shares of the security, such as IBM, held in the style on a certain date, that cash dividend will be distributed to that particular style within the SMCA. Thus, as shown in FIG. 23A, the exemplary SMCA includes a dividend paid on IBM shares which has been distributed proportionally to styles 1 and 2 within the SMCA, as identified by the "IBMDIV$^1$" and "IBMDIV$^2$" entries in the SMCA. The entry of dividends from IBM shares in two styles reflects the fact that IBM shares were held on the dividend date in both style1 and style2 of the SMCA.

The exemplary SMCA shown in FIG. 23A also indicates interest flows to each of style1-style4. These interest flows are identified by "INTEREST$^1$", "INTEREST$^2$", "INTEREST$^3$", and "INTEREST$^4$". It should be recognized that although the interest entries in FIG. 23A reflect deposits of interest payments to the SMCA, interest payments out of the account would be similarly reflected but with the cash amounts being enclosed in parentheses to indicate a debit rather than a credit.

Other tag flows could, for example, include the removal of cash from one style to another for any number of reasons, including rebalancing. In the exemplary SMCA shown in FIG. 23A, a flow of cash from style3 to style1 is indicated by the two tagged transactions characterized as "WCASH$^3$" "DCASH$^1$".

After computing the tagged and untagged cash balance, any further modifications to the computed balance are made to reflect purchases and/or sales of shares of securities from the style of interest in the SMCA. Hence, the funds obtained from the sale of shares of securities from the style of interest in the SMCA are added to the untagged and tagged cash balance, and the funds required for purchases of security shares for the style are subtracted form the untagged and tagged cash balance to compute a total cash balance for the style in the SMCA. For example, if a purchase of IBM shares has been made, or if a trade order to purchase IBM shares has been generated, the funds for this purchase can be subtracted from the untagged and tagged cash balance to compute the total cash balance for the style. Similarly, if a sale of IBM shares has been consummated, or an order for the sale of such shares initiated, the untagged and tagged cash balance can be modified to reflect the cash returned to the SMCA as a result of the sale.

As shown in the exemplary SMCA of FIG. 23A, the cash in style4 has increased as a result of a sale of GM shares. This sale has been characterized in the SMCA of FIG. 23A as "SGM$^4$". A purchase of IBM securities for style2 of the SMCA is also reflected in FIG. 23A. The purchase is characterized by the "PIBM$^2$" entry.

In summary, a processor 1050A of the MOM 1050, by executing the generate SMCA statement function 1050A6, can compute an accurate cash balance for each style within the SMCA reflecting both deposits and withdrawals into and out of the SMCA as well as the dividends, interest, other flows, and purchases and sales of securities within individual styles reflected in the SMCA.

It is perhaps worth noting here that the processor 1050A of the MOM 1050 can easily flow funds between the different styles within the SMCA without any need to interface with the client account being maintained by the brokerage firm (CA) or the custodial client account (CCA) maintained by the custodian, which need only maintain total untagged positions in cash and securities. Hence, the MOM 1050 can, at the discretion of the overlay manager or based on any desired factors, flow cash from one style to another style independent of the brokerage firm and custodian for any desired purpose. Thus, unlike in the architecture of FIG. 1B, movements of cash are performed without the need to enter a withdrawal and corresponding deposit within a single CA or CCA, or between independent but related CAs or CCAs managed trading account. The architecture of FIG. 1A of course does not provide for cash flows between different styles within the master client account (MCA) since only a single cash bucket for the entire MCA is maintained.

FIG. 28 illustrates the movement of cash between styles within the SMCA to rebalance the SMCA across style allocation. For example, there may be instances in which there is a desire to purchase shares of a security for a particular style within the SMCA but the style may have an insufficient cash balance to cover the purchase. Therefore, the processor 1050A of the MOM 1050 will need to transfer or flow cash from another style within the SMCA which is over weighted to the style for which the purchase of the shares is desired.

As shown in FIG. 28, the COM 1280 allocates equally between the four models forming COM 1280. Thus, the four styles, i.e. style1-style4, within the SMCA 1282 receive equal allocations.

However, as shown, the market value of each of the individual styles within the SMCA has changed over time. Style1 and style4 are perfectly aligned with their style model, i.e., SM1 and SM4, allocations, as can be seen by comparing the individual style current market values against the style targets in FIG. 28. However, style2 and style3 are now out of alignment with their style model, i.e. SM2 and SM3, allocations. Therefore, style2 is under weighted by $10,000.00 in total ($5,000.00 in securities and $5,000.00 in cash). Style3 is over weighted by $10,000.00 (all $10,000.00 in securities). Thus, it is at a minimum desirable to purchase $5,000.00 in securities for style2 and to sell $10,000.00 in securities from style3. This will result in style2 and style3 both having $245,000.00 in securities.

However, style2, which began with a zero cash balance, will have a ($5,000.00) cash balance as a result of the purchase of the securities. On the other hand, style3, which began with a $5,000.00 cash balance will now have a $15,000.00 cash balance as a result of the sale of securities. Therefore, the processor 1050A of MOM 1050 will, preferably in an overnight process, flow $5,000.00 from style3 to style2 within the SMCA, thereby resulting in style2 having a zero cash balance and style3 having a $10,000.00 cash balance. This will also result in each of the styles, i.e. style1-style4, having securities in line with the target security allocation in the COM of 98%, i.e. $245,000.00. However, models 2 and 3 will remain outside the 2% market value cash target, i.e. $5,000.00.

FIG. 29 illustrates another technique for transferring or flowing cash between styles within the SMCA. As shown in FIG. 29, the COM allocation and SMCA style market value allocation are identical to those described with reference to FIG. 28. The targets within the COM are also identical to those discussed above with reference to FIG. 28. However, in FIG. 29, the processor 1050A of the MOM 1050 flows $10,000.00 from style3 to style2. This results in each of the styles having a starting cash balance on the following morning of $5,000.00. Thus, each of the styles is aligned with both the 2% cash target and 98% security target in the COM 1280.

It should be recognized that if desired, the flow of cash could be performed prior to any purchasing or sales of securities to bring the cash balances of each style in the SMCA into alignment with the cash target in the COM if an insufficient amount of cash is available for this purpose, cash could be moved so that each of the styles has a cash balance as close to the cash target in the COM as possible on a prorated basis. It will also be understood that other techniques for moving cash to rebalance the SMCA can be performed as previously described.

Rebalancing Style Allocations in Multiple Single Managed Client Accounts (SMCAs)

Figure 30:
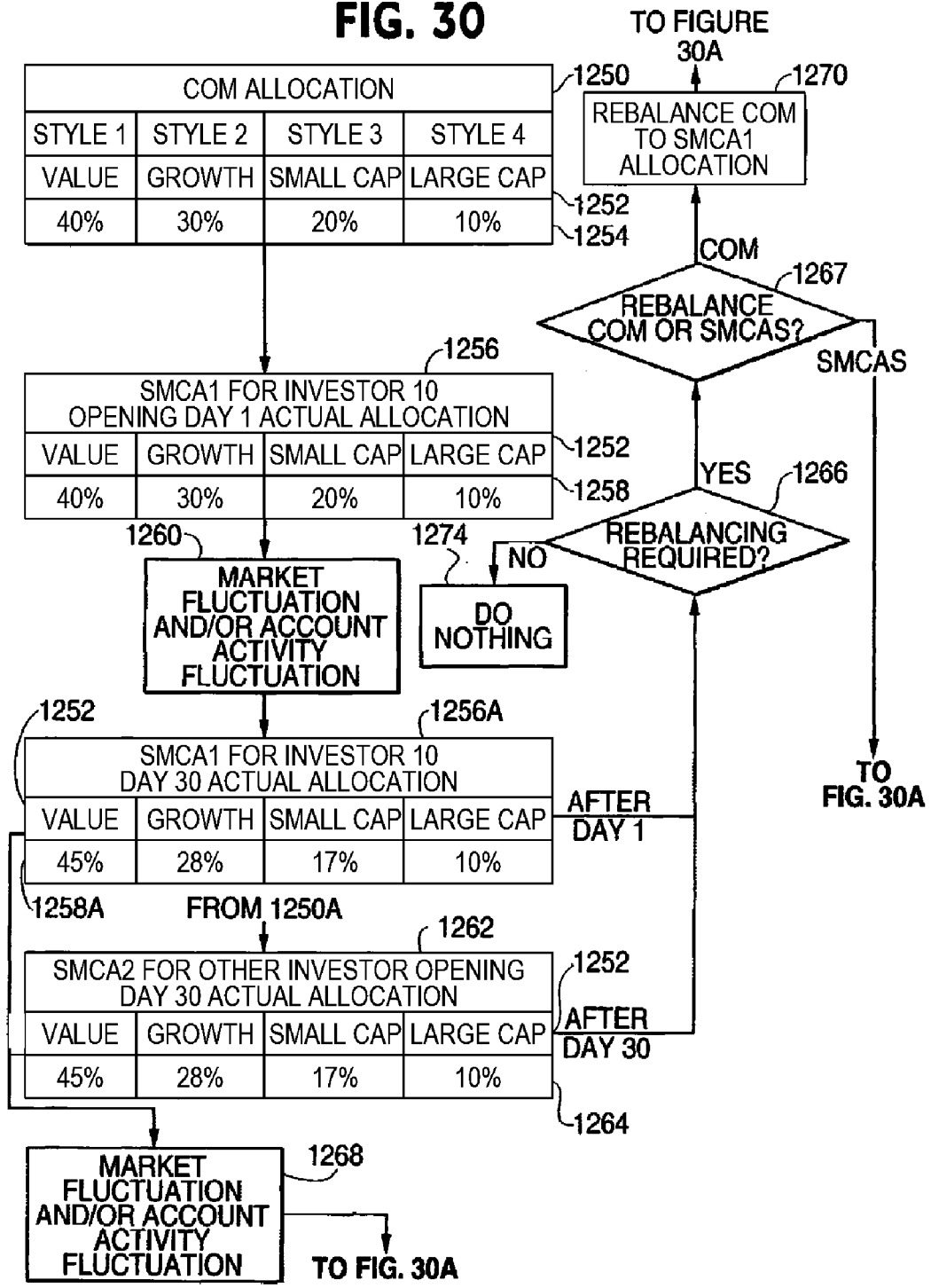
FIG. 30 depicts a process performed by the master overlay manager portfolio management system to rebalance multiple stylized master client investment accounts for different investors managed under a single overlay manager, in accordance with the present invention.
Figure 30A:
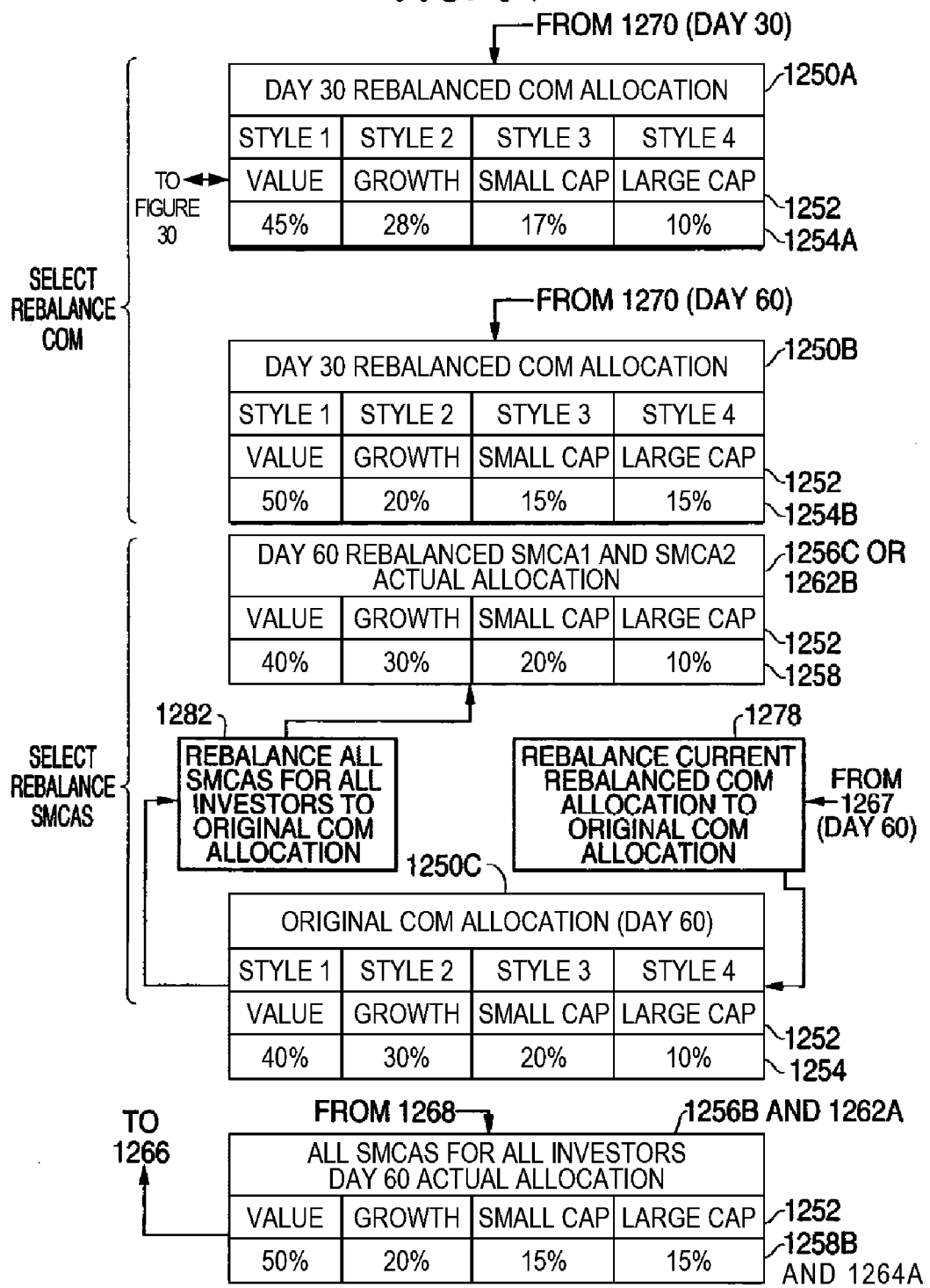

As discussed above with reference to FIGS. 16 and 17, using the FIG. 13 architecture, the initial allocations are set and money manager selected based on a selected risk category for the investor. FIGS. 30 and 30A depict a COM 1250, which could serve as the COM shown in FIG. 15, having the initial allocation 1250, or across the styles 1252. The styles correspond to style1-style4 depicted in FIG. 16. An exemplary computation of security drift and determination as to whether or not rebalancing is required will be described below with reference to FIGS. 30 and 30A. As shown, the COM 1250 has an allocation 1254 of 40% value, for 30% growth, 20% small cap, and 10% large cap. The master overlay manager (MOM) 1050, as shown in FIG. 15, opens a first of the SMCAs to be managed under the COM at the designated allocation. Hence, SMCA1 for investor 10, identified with reference numeral 1256, is opened on a particular date, referred to as day one, with the styles 1252 and an actual allocation 1258 of 40% value, 30% growth, 20% small cap, and 10% large cap. As time lapses, the allocations between these four styles in the SMCA1 for investor 10 will fluctuate as indicated by block 1260. The values of the securities within the individual styles will move in line with the stock market or other fluctuations. We will assume, for purposes of this example, that after thirty days, the actual allocations 1258A for styles 1252 in SMCA1 for investor 10 fluctuate to 45% value, 28% growth, 17% small cap, and 10% large cap.

The processor 1050A of the MOM 1050, executes the cross style drift function 1050A4 to determine in step 1266 if rebalancing of the COM 1250 is required. For example, the threshold previously discussed with reference to FIGS. 20A, 21A and 21B could, if desired, be utilized in determining whether or not to rebalance the COM 1250. If it is determined that no rebalancing is required, no further action is taken as indicated in step 1274. If however, rebalancing is required, the processor 1050A executes function 1050A1 to determine if rebalancing of the COM or SMCA is required in step 1267. Rebalancing of the COM is performed in step 1270.

As shown in FIG. 30A, this results in a rebalanced COM 1250A having styles 1252 but with a modified allocation corresponding to the actual allocation of the SMCA1 on day thirty. Hence, as shown in FIG. 30A, the rebalanced COM 1250A on day thirty has an allocation of 45% value, 28% growth, 17% small cap, and 10% large cap. Referring again to FIG. 30, on day thirty, another SMCA, i.e. SMCA2, is opened for another investor, i.e. an investor other than investor 10. The funds or other assets deposited at the time of opening the SMCA2 are allocated in accordance with the modified allocation 1254A in the rebalanced COM 1250A shown in FIG. 30A. Hence, as shown in FIG. 30, the initial deposit for SMCA2 is allocated in accordance with the rebalanced COM 1250A allocation 1254A. Therefore, the initial deposit is allocated at 45% value, 28% growth, 17% small cap, and 10% large cap.

It should be recognized that by rebalancing the COM allocation for fluctuations in the actual account allocation of SMCA1, and using the modified allocation in the rebalanced COM for allocations to newly opened accounts, rebalancing of each of the multiple SMCAs being managed in accordance with a single COM allocation can be avoided. This in turn substantially reduces the number of trades required across the multiple SMCAs and thus, the cost to the investors for whom the SMCAs are maintained. As time continues to pass, further market fluctuations and/or account activity fluctuations will occur in the currently managed SMCAs for the multiple investors. For example, as shown in FIG. 30A, on day sixty, SMCA1 and SMCA2 have further fluctuated. Accordingly, the actual allocation in each of SMCA1 and SMCA2 has fluctuated to 50% value, 20% growth, 15% small cap, and 15% large cap. Accordingly, a further rebalanced COM 1250B is generated with an across style allocation corresponding to that of the SMCAs currently being managed. Accordingly, as shown in FIG. 30A, the rebalanced COM 1250B on day sixty has an allocation 1254B with 50% value, 20% growth, 15% small cap, and 15% large cap.

Hence, as fluctuations occur between day thirty and day sixty as indicated in step 1268 of FIG. 30, the SMCAs on day sixty, i.e. SMCA1 1256B and SMCA2 1262A, have actual allocations 1258B and SMCA1 and 1264A and SMCA2, which are different than the actual allocation in these accounts on day thirty. Accordingly, the processor 1050A of MOM 1050 will again execute the necessary functionality to perform steps 1266 to determine if rebalancing is required, and if so, step 1267 to determine if the COM or SMCAs are to be rebalanced. In this case, the processor 1050A has again determined to rebalance the COM and therefore executes step 1270.

However, had the processor 1050A in step 1267 determined that rebalancing of the SMCAs was now required, in step 1278, the current rebalanced COM 1250A is rebalanced to the original COM allocation of COM 1250. Accordingly, as shown in FIG. 30A, on day sixty the COM is again rebalanced to have an allocation of 40% value, 30% growth, 20% small cap, and 10% large cap, as indicated by allocation 1254 and COM 1250C. The SMCAs are now rebalanced by the processor 1050A by executing the rebalance SMCA function 1050A1, to rebalance all of the SMCAs for all investors to the original COM allocation, in step 1282. As shown in FIG. 30A, the actual allocation of both SMCA1 and SMCA2 are rebalanced on day sixty to the allocations in COM 1250C, i.e. the original COM allocation. Accordingly, SMCA1 and SMCA2 will be rebalanced to have 40% value, 30% growth, 20% small cap, and 10% large cap. Thus, if the processor 1050A selects the rebalance SMCAs in step 1267 on day sixty, all of the SMCAs being managed under the same COM will be transacted to be in line with the original COM allocation 1254.

It should be understood that although in the example shown in FIGS. 30 and 30A, the rebalancing of the SMCA1 and SMCA2 has brought these accounts exactly into line with the original COM allocation in COM 1250C, as has been previously discussed, the rebalancing may be performed such that the resulting actual allocation in SMCA1 and SMCA2 are only transacted to more closely, but not exactly, align with the original COM allocation. Further, it will be recognized that using the technique described above, the amount of required trading to rebalance the actual SMCA allocations to the COM allocation can be significantly decreased and hence the cost and efforts required in managing multiple accounts under thousands of different COM allocations can also be drastically reduced. The above-described process may be performed on a regular periodic basis, such daily or monthly. The process may also be performed at the discretion of the overlay manager.

As will also be understood, using the above technique, each account which is opened will have the same, or approximately the same, allocation. Therefore, less rebalancing of the SMCAs is required, resulting in less trading and less cost. Furthermore, because of the reduced trading, there is less likelihood of the investor being subjected negative tax consequences.

The processor 1050A of the MOM 1050 may rebalance the COM to the original allocations based on any desired factors or at the discretion of the overlay manager. For example, the rebalancing of the COM to the original allocation may be performed periodically or on the basis of a threshold variation of the actual allocation in the SMCAs to a predefined tolerance, or based on other factors. All of the SMCAs then being managed in accordance that COM can now be easily rebalanced back to the original allocation. In a practical implementation this will typically result in the avoidance of trading due to minor fluctuations within the SMCAs. Furthermore, the overlay manager, represented by the MOM 1050 is given the flexibility to dynamically rebalance the COM to thereby reduce the trading within the SMCAs.

Netting Security Transactions

Figure 31:
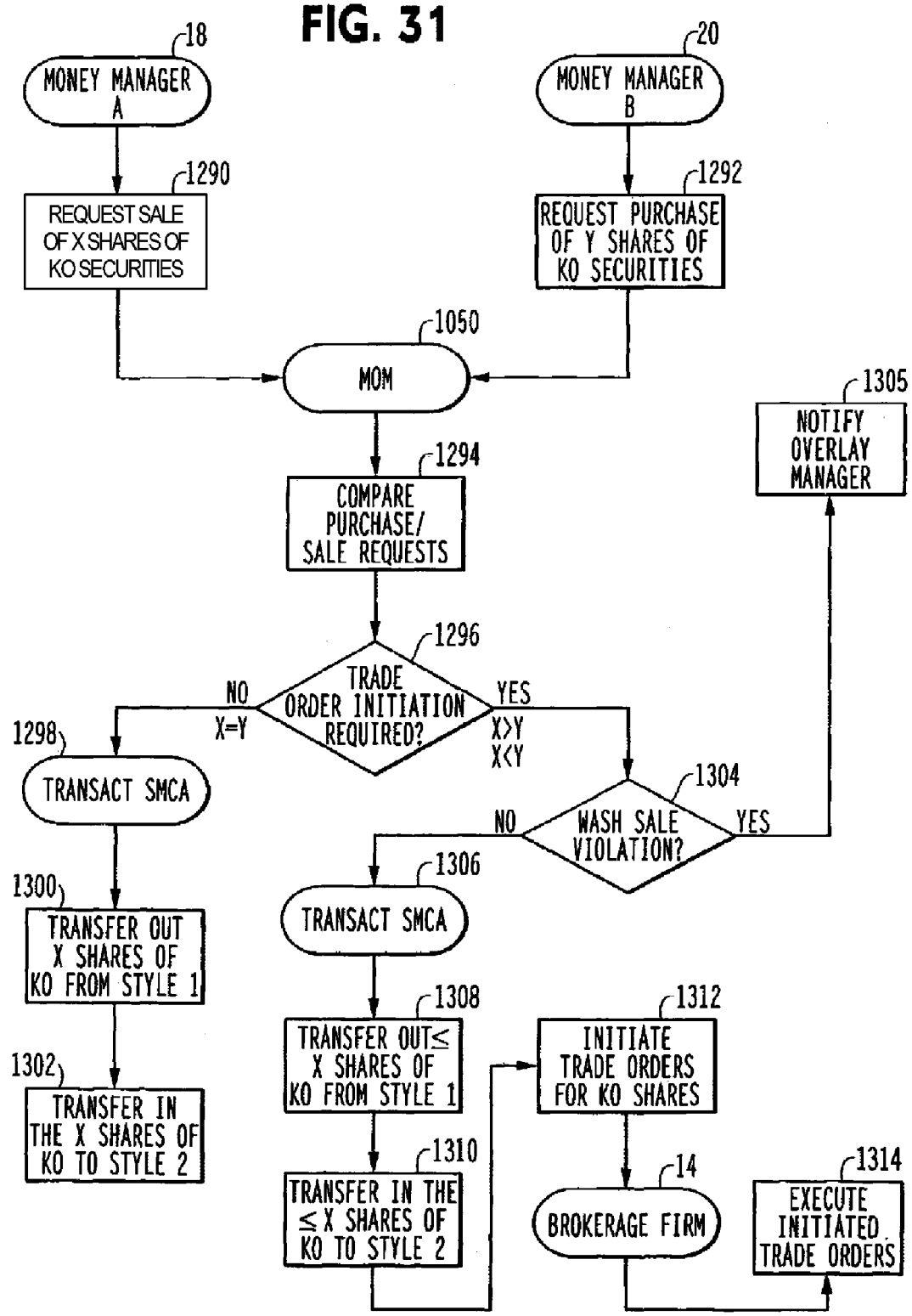
FIG. 31 depicts the processing performed by the master overlay manager portfolio management system to net transactions, in accordance with the present invention.

FIG. 31 depicts the processing performed by the processor 1050A of the MOM 1050 in netting trades requested by different entities, for example by different money managers. As shown, money manager A 18 requests, in step 1290, the sale of X shares of KO securities. This request is submitted to the processor 1050A of the MOM 1050. As also shown, the money manager B 20 requests a purchase of Y shares of KO securities in step 1292. This latter request is also submitted to the MOM processor, prior to the forwarding of trade orders for the requested sale of KO securities to the brokerage firm 14. In practice, these requests may either be received outside of the normal hours of trading or at approximately the same time during the trading day. However, in all cases both requests must be pending, i.e. unexecuted during the processing shown in FIG. 31.

The processor 1050A of the MOM 1050 executes the generate trade order function 1050A5 to process the request. Preferably, the requests are received digitally from the respective MMPMS 1036 operated by money manager A 18 and money manager B 20 via the interface between the MMPMSs and MOM 1050. The processor, in accordance with the generate trade function 1050A5, compares the received purchase and sell requests in step 1294. The processor 1050A then determines, in step 1296, if trade order initiation is required.

If the values of X and Y are equal it will be unnecessary to initiate a trade order. Accordingly, the processor 1050A will proceed by transacting the SMCA in step 1298. In this case, transacting the SMCA will result in a transfer out of X shares of KO securities from style1 of the SMCA and transfer in of those same securities to style2 of the SMCA. Accordingly, in this particular example, step 1298 corresponds to steps 1124A and 1124B of FIG. 17. As indicated in step 1300, the processor 1050A transfers out X shares of KO from style1 of the SMCA and in step 1302 transfers in the same X shares of KO securities to style2 to fulfill the requests of money manager A 18 and money manager B 20. As shown in the SMCA of FIG. 23A, entries corresponding to the transfer out of fifty shares of KO securities is entered in the SMCA with the identifier "TOKO[1]". The transfer of the same securities to style2 of the SMCA is entered in the SMCA using the identifier "TIKO[2]".

If the value of X is either greater than or less than the value of Y, initiation of a trade order will be required. Accordingly, in step 1304, the processor 1050A in accordance with the execution of the generate trade order function 1050A shown in FIG. 15, determines if a wash sale violation will occur by executing the SMCA wash sales function 1050A3. More particularly, a determination will be made if KO shares have been previously sold within the violation period at a loss. If so, the overlay manager is notified by the MOM in step 1305. If not, the processor 1050A proceeds to transact the SMCA in step 1306. In step 1308 all, or less than all, of the X shares of KO stock are transferred out of style1 of the SMCA. In step 1310, the same shares are transferred in to style2 of the SMCA. In step 1312, the processor 1050A generates a trade order to either sell any untransferred shares of KO securities from style1 of the SMCA, if the value of X is greater than the value of Y. On the other hand, if the value of Y is greater than the value of X, the processor 1050A will generate a trade order for the purchase of additional shares of KO securities which when added to the X shares transferred to style2 will result in style2 having an additional Y shares of KO securities. The trade order is forwarded to the brokerage firm 14 and executed by the brokerage firm in step 1314 as shown in FIG. 31.

Here again, the transfer out and transfer in of the shares of KO securities are entered in the SMCA as has been previously discussed. Furthermore, a purchase entry or sale entry for any shares associated with a trade order would also be entered using an SKO[1] or TKO[2] indicator.

Thus, by performing the above-described processing the MOM 1050 avoids the initiation of unnecessary trades. Furthermore, the original cost basis of the KO securities transferred out of style1 of the SMCA is preserved. However, cash in the amount of the current fair market value of the transferred securities will be moved to style1 of the SMCA from the cash balance in style2 of the SMCA. Furthermore, if the shares in style1 have lost value with respect to the original purchase price, there is no sale which could subsequently result in a wash sale violation. To the extent that no trade order is initiated, the client account (CA) maintained at the brokerage firm and the custodian client account (CCA) maintained by the custodian are unaffected by the netting of the requested trades.

As described above, the architecture depicted in FIG. 13 allows for a single managed client account to be maintained for an investor, as in the architecture of FIG. 1A, but returns the ability to manage relevant portions of the account back to the individual money managers. Thus, the money managers perform functions similar to those performed in the architectures of FIGS. 1 and 1B, but without the need for multiple managed trading accounts.

Using the architecture of FIG. 13, each money manager can direct the transacting of a relevant portion of a single managed client account, can make adjustments to the portion of the SMCA for which they are responsible, rebalance the applicable portion of the SMCA and generate accurate performance statements for both cash and securities for the applicable portion of the SMCA. Furthermore, each money manager is allowed to trade its own cash balance within the SMCA.

On the other hand, the architecture of FIG. 13 still allows a single overlay manager to oversee the entire account. However, unlike in the architecture of FIG. 1A, the overlay manager, utilizing the architecture of FIG. 13, can generate accurate reports at both the style and entire SMCA levels. Furthermore, cash performance at the style level can also be accurately tracked. This ability to track both cash and security performance provides greater flexibility both in terms of the transacting and analysis of the SMCA.

EXAMPLE

The opening, transacting and management of an exemplary account will now be described with reference to FIGS. 32-42.

Figure 32:
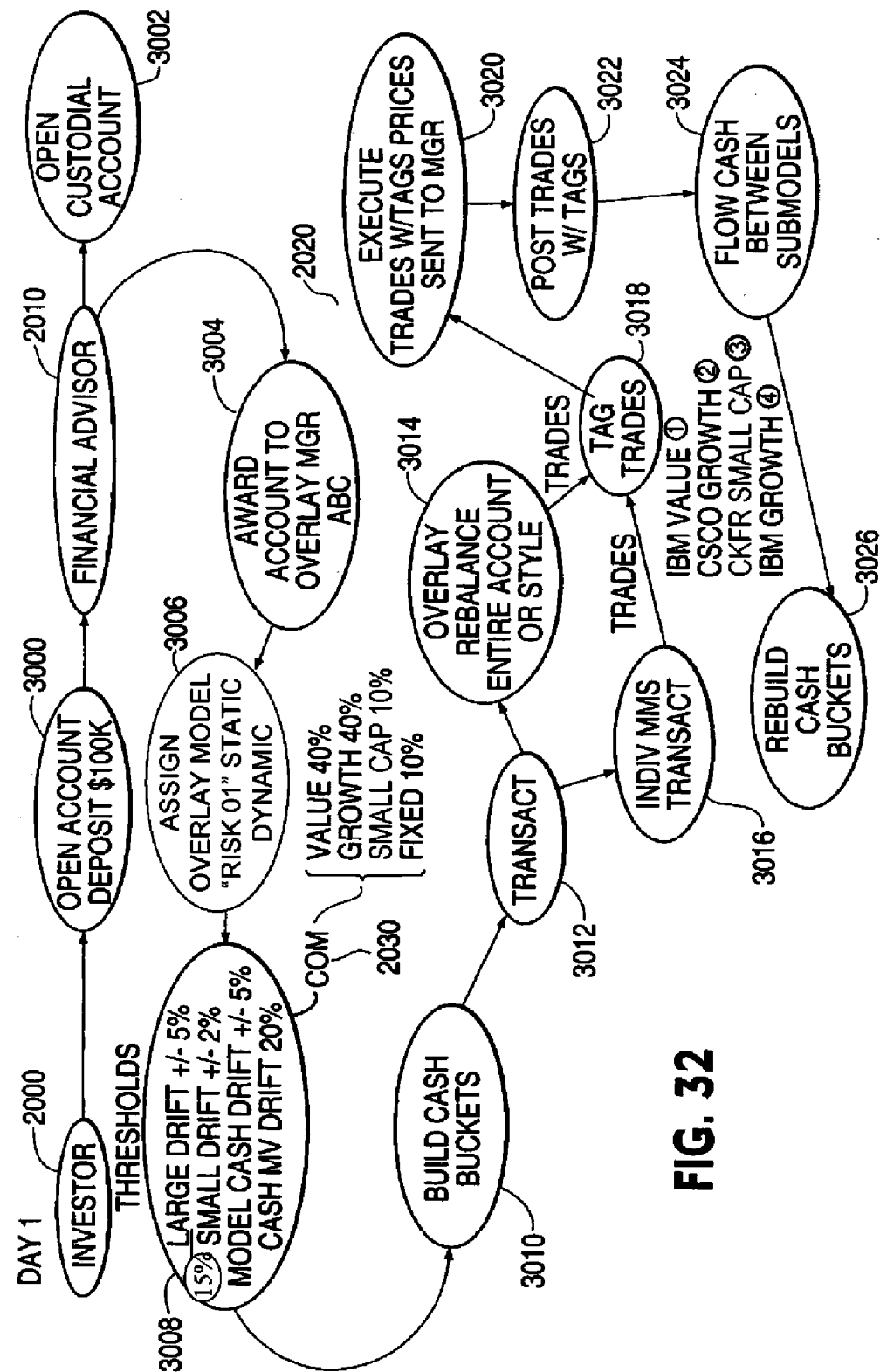
FIG. 32 depicts a practical example of opening an account for an investor, initially allocating funds to different styles within a stylized master client investment account and the initially transacting the account, in accordance with the present invention.

FIG. 32 depicts a typical scenario for opening and managing a multiple strategy portfolio. Investor John Doe 2000 approaches his financial advisor 2010 to open a multiple strategy portfolio account 3000. John Doe possesses $100,000 in cash. The financial advisor 2000 typically via a brokerage firm as previously described, opens a custodial account for John Doe in step 3002, and awards the $100,000 to be managed by a overlay manager 2020 in step 3004. In this case the overlay manager 2020 will be manager ABC, who will be represented by a MOM, such as MOM 1050 of FIG. 15. The overlay manager 2020 assigns an overlay model, as shown as COM 2030, to John Doe's account in step 3006, based on the financial advisor recommendation. In this case John Doe receives overlay model Risk 01. Risk 01 has an allocation of 40% value, which is called ABC Val, 40% growth, which is called ABC Grow, 10% small cap, which is referred to as ABC Sm, and 10% fixed income which is referred to as ABC FI. The four codes, i.e. ABC Val, ABC Grow, ABC Sm, and ABC FI, correspond to the individual styles that will be used to tag the appropriate securities, transactions and cash buckets going forward. For purposes of this example, the same distribution can be used for cash allocation.

Once the overlay model 2030 has been assigned to John Doe's account the overlay manager 2020 assigns the drift parameters on that account in step 3008. In John Doe's case, a drift parameter of plus or minus 5% is arranged for any large allocation, and plus or minus 2% on any small allocation. An indicator is also assigned, identifying the divider between large allocation and small allocations to be 15%. Therefore, the ABC Val and ABC Grow models will have an allowable drift of plus or minus 5% from the overlay model 2030 and the ABC Sm and ABC FI will have an allowable drift of plus or minus 2% from the overlay model 2030.

The overlay manager 2020 also assigns the cash drift for John Doe's account in step 3008. In John Doe's case the allowable cash drift from the overlay model 2030 is plus or minus 5%, and the allowable cash drift from the account market value (MV) is plus 20%. If cash drift exceeds either of the thresholds, a rebalancing of the cash drift must be performed, or at least will be considered.

Once the model 2030 has been assigned and the drift parameters have been set, the account is added to the trading system of the overlay manager 2020. At this time the cash buckets are established in step 3010. One cash bucket is established for each individual style, so ABC Val, ABC Grow, ABC Sm and ABC FI will each have an individual cash bucket. Both the ABC Value cash bucket and the ABC Growth cash bucket will receive $40,000 or 40% of the $100,000, and both the ABC Sm cash bucket and the ABC FI cash bucket will receive $10,000 or 10% of the $100,000, as shown in FIG. 35. Once the buckets are built in step 3010 the account can be transacted in step 3012.

There are two ways to transact the account. The overlay manager 2020 can choose to rebalance the entire account or a particular style in step 3014, using either a total account rebalancer or the style rebalancer as has been discussed above. An individual manager responsible for any of the four models, i.e. Value, Growth, Small Cap and Fixed, can also decide to individually direct the overlay manager 2020 to transact or, if authorized by the overlay manager, to itself transact their individual portion or style of the account, as indicated by step 3016. In either case trades are initiated for John Doe's account.

Each of those transactions is tagged with the appropriate sub model or style code in step 3018. For instance, if IBM securities are purchased into Value, they are tagged ABC Val, if Cisco securities are purchased into Growth, they are tagged ABC Grow, if CheckFree securities are purchased into Small Cap, they are tagged ABC Sm, and if IBM is also purchased into Growth, even though IBM securities have already been purchased into Value, such securities will be tagged ABC Grow. The reference numeral 1 may be used to indicate ABC Val, the reference numeral 2 to indicate ABC Grow, the reference numeral 3 to indicate ABC Sm, and the reference numeral 4 to indicate ABC Fi.

The tagged transactions are forwarded to the broker to be executed in step 3020. Once executed, the prices are also returned to the overlay manger 2020 in step 3020. The overlay manager 2020 posts the trades to the account of John Doe in step 3022. The trades are posted with the appropriate tags as previously described.

After the trades are posted, the overlay manager 2020 analyzes the account to see if there are any flows necessary between individual style positions of the account. For example, if in accordance with a certain style model within the COM 2030, securities have been over bought and therefore more cash has been spent than was allotted to that style, cash from a style that is over weighted in terms of either cash or securities will be flowed from the over weighted style to the under weighed style in step 3024. In the case of this example, as indicated in FIG. 33, the ABC Val portion of the account has excess cash and the ABC Grow portion of the account is deficient in cash. Therefore, cash in the amount of $1,000 will be flowed from ABC Val to ABC Grow. Once the cash has been flowed, the entire account, including the cash buckets, are rebuilt in step 3026. The cash necessary for each individual style is recalculated by taking the cash deposited into the account minus the purchases for the style, plus or minus any flows into or out of the style. Once that is done the cash balance for each style is calculated and returned to the overlay manager to be traded on day 2.

It is perhaps worth reemphasizing that the initiated trade orders are, prior to being executed, sent to the brokerage firm with the tags included. When the brokerage firm executes the trade, the transactions, with the prices, are forwarded back to the overlay manager, also with the tags. It should also be noted that the process of opening the account, and depositing and allocating the $100,000, has been described earlier with reference to FIGS. 16-17.

Figure 36:
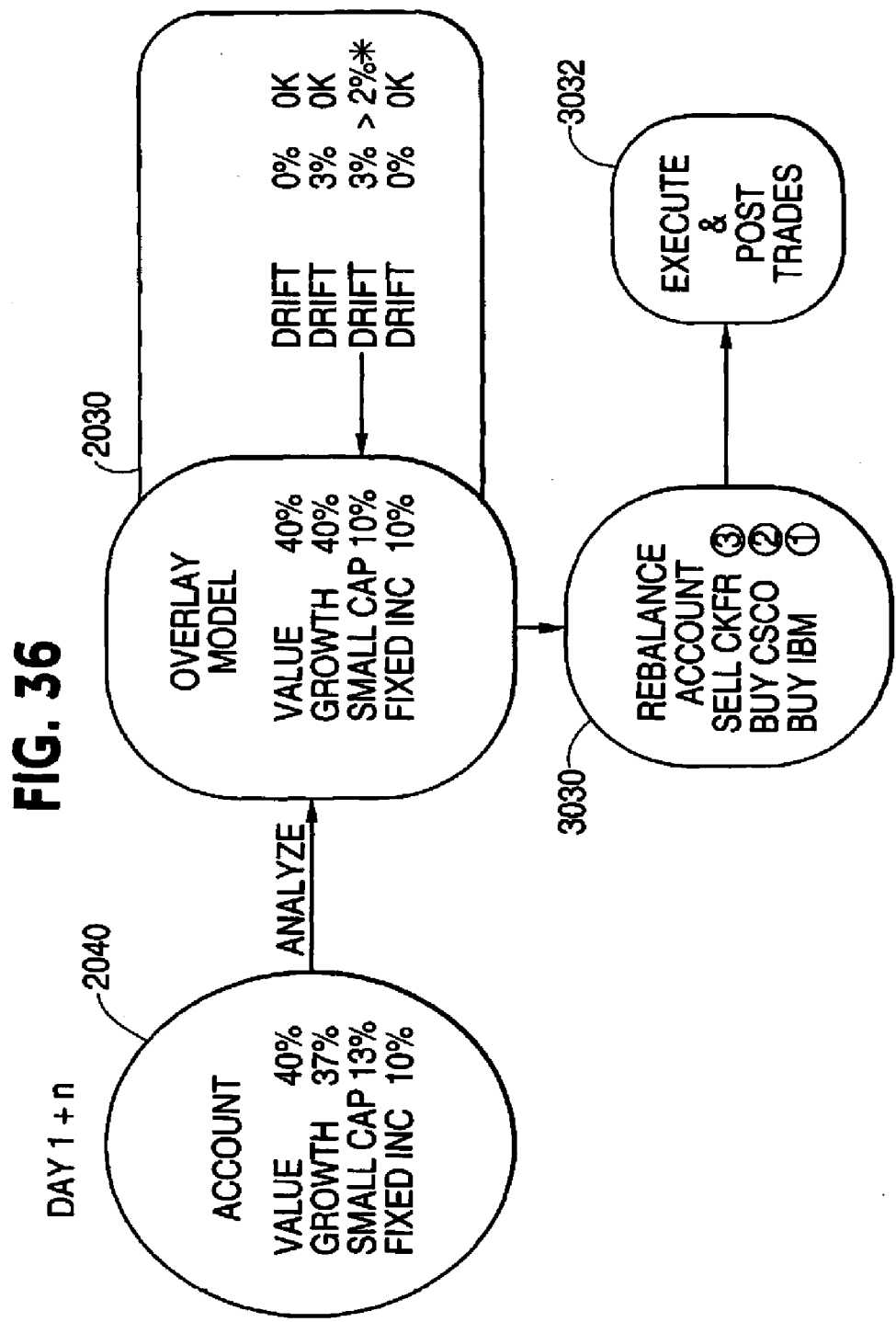
FIG. 36 depicts a practical example of the rebalancing of the stylized managed client investment account shown in FIGS. 33-35, in accordance with the present invention.

FIGS. 33-36 show the process performed by the MOM, e.g. MOM 1050 described above, which represents overlay manager 2020, for analyzing the account drift and rebalancing the account, and the result of the rebalancing for drift. The MOM initially analyzes John Doe's account 2040, and determines that the account has drifted. More particularly, as shown in FIG. 36, the Growth portion has diminished or decreased to 37%, and the Small Cap portion has increased to 13%, of the entire market value of the account 2040.

The MOM also determines that the drift in the Growth portion of the account 2040 does not exceed the threshold parameters for the account 2040 in the COM 2030, that were set earlier in step 3008 of FIG. 32. The process for rebalancing was discussed above with reference to FIGS. 18-21.

However, the MOM determines that the drift for Small Cap drift of 3% in account 2040 is greater than the drift parameter for John Doe's account 2040 of 2%. This is therefore determined to violate the small allocation drift rule and the account 2040 is deemed to be out of balance and must be rebalanced to its overlay model 2030. The process of rebalancing the account, which was discussed earlier in FIG. 17, will now be performed.

To rebalance account 2040, the MOM initiates trade orders to sell down approximately $3,000 worth of securities from the Small Cap portion of account 2040, assuming the value of the account has not changed. In this case, the MOM initiates trade orders to sell the CheckFree securities and tags them with the appropriate style ABC Sm, as indicated by 3, in step 3030 of FIG. 36. The MOM next flows the $3,000 of cash generated by execution, in step 3032, of the CheckFree sale, and flows that cash to the Growth portion of the account 2040. The MOM also initiates orders to purchase Cisco and IBM securities with the $3,000 transferred to the under weighted Growth portion of the account in step 3030. The Cisco and IBM order is tagged as ABC Grow for ABC Growth, as indicated by the 2, as shown in FIG. 36. The order is also executed in step 3032. The cash that was used to purchase the securities will also be tagged with ABC Grow. The executed trades and cash flows are posted with the proper tags for the trades and the flows of cash, as shown in FIGS. 33-35.

Figure 37:
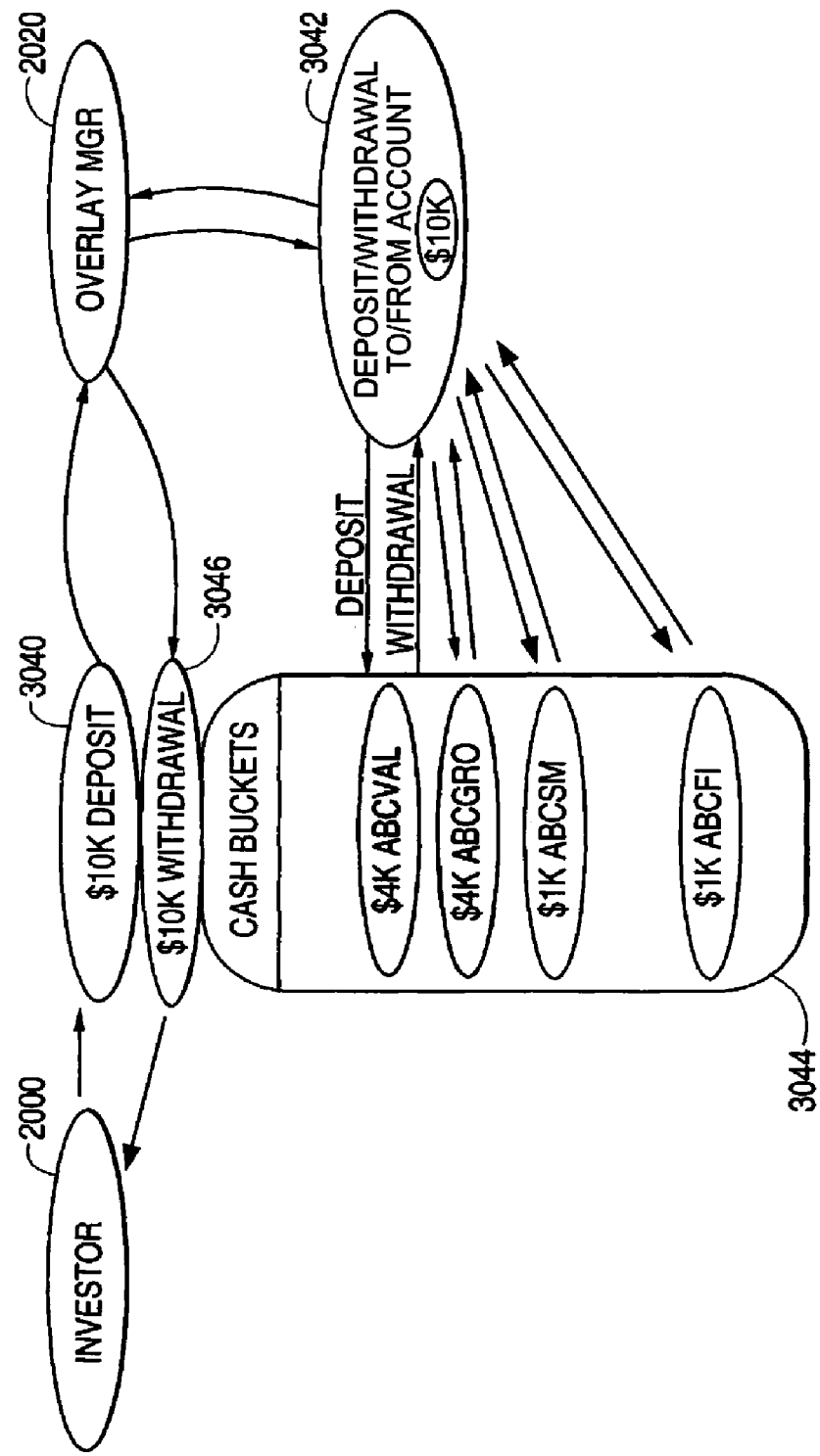
FIG. 37 depicts a practical example of the distribution of deposits and withdrawals within the stylized managed client investment account shown in FIGS. 33-35, in accordance with the present invention.

FIG. 37 addresses a scenario in which John Doe makes an additional deposit, in step 3040, of $10,000 into the account 2040. The overlay manger 2020 receives the $10,000 as a deposit in step 3042. The deposit is automatically, in step

3044, broken up by the MOM based on a cash allocation that the overlay manager 2020 had previously selected.

In John Doe's case, the overlay model 2030 requires that the cash be broken up based on the original cash allocation shown in FIG. 32. Using the 40-40-10-10 cash allocation, the MOM divides the $10,000 deposit, in step 3044, as $4,000 to ABC Val, $4,000 to ABC Grow, $1,000 to ABC Sm, and $1,000 to ABC FI. Allocations of such deposits have been previously described with reference to FIG. 26. Each money manager can direct the transacting of just the portion of the deposit which has been included in the applicable style bucket to purchase additional securities.

The process is reversed when John Doe makes a withdrawal request. For example, as shown in step 3046, if John Doe were to make a $10,000 withdrawal, the overlay manger 2020, via the MOM, would withdraw $10,000 from the account 2040. More particularly, the money would be withdrawn from each individual style cash bucket in correspondence with the original cash allocation. Therefore, in step 3044, $4,000 would be removed from ABC Val, $4,000 from ABC Grow, $1,000 from ABC Sm and $1,000 from ABC FI.

FIG. 34 shows the result of the deposit. As shown, the cash balance for ABC Val and ABC Grow has increased from $1,000 to $5,000. ABC Sm and ABC FI now have $2,000 each in their cash balance. The cash buckets are rebuilt.

The cash will not be tagged until it is flowed. However, the deposit is recorded on the day the deposit is received. Using the current cash allocation in the overlay model 2030 the cash buckets will be rebuilt.

The technique used to distribute cash in FIG. 37 is only one of five techniques for distributing free cash, deposits and withdrawals within the account 2040. FIG. 26A illustrates all five techniques for splitting cash.

FIG. 34 depicts how the overlay manager 2020, via the MOM, moves cash and securities within the account 2040 for John Doe. For example, if the overlay manager 2020 wishes to move $3,000 from value to small cap, the overlay manager 2020, again via the MOM, would initiate a sequence to remove $3,000 and tag that removal of $3,000 as leaving the value portion of account 2040, and enter the $3,000 into the small cap portion of account 2040 by small cap tagging the $3,000. This processing was discussed earlier with reference to FIGS. 26-29.

The overlay manager 2020, via the MOM, can also move securities within the account 2040 for John Doe. If the overlay manager 2020 wishes to move $4,000 worth of IBM securities from value to growth, the MOM will move the securities by retagging and delivery out of the ABC Val style, and into the ABC Grow style. The MOM will also tag and move cash in the opposite direction, so cash will be flowed out of ABC Grow and flowed into ABC Value at the proper market value for the moved IBM securities. This processing was discussed in detail with reference, for example, to FIG. 31. In each case the cash flows and the security flows are tagged in order to properly record the applicable style, resulting in proper performance recording.

Figure 38:
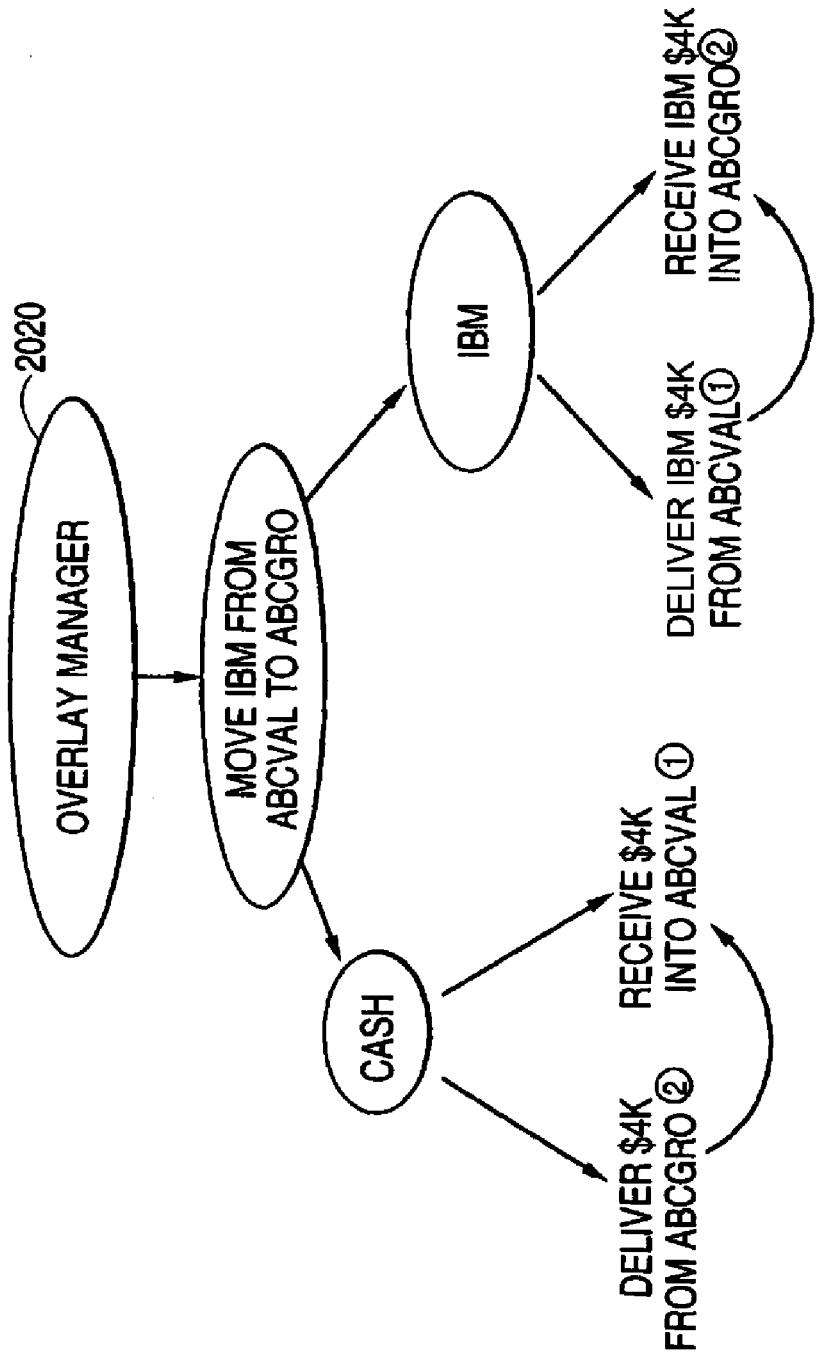
FIG. 38 depicts a practical example of the movement of securities between different styles within the stylized managed client investment account shown in FIGS. 33-35, in accordance with the present invention.

FIG. 38 depicts a more descriptive example of how the cash and securities are moved when the overlay manager 2020 decides to move IBM securities in John Doe's account 2040 from ABC Val to ABC Grow, as described above. The overlay manager 2020, via the MOM, can move securities within the account 2040 for John Doe. If the overlay manager 2020 wishes to move $4,000 worth of IBM securities from value to growth, the MOM will move the securities by delivering the IBM out of ABC Value, and retagging it and receiving it into ABC Grow. The MOM will also tag and move cash in the opposite direction, so cash will be flowed out, or delivered out, of ABC Grow and flowed into (or received into) ABC Value at the proper market value for the moved IBM securities. This processing was discussed in detail with reference, for example, to FIG. 31. In each case the cash flows and the security flows are tagged in order to properly record the applicable style, resulting in proper performance recording.

Figure 39:
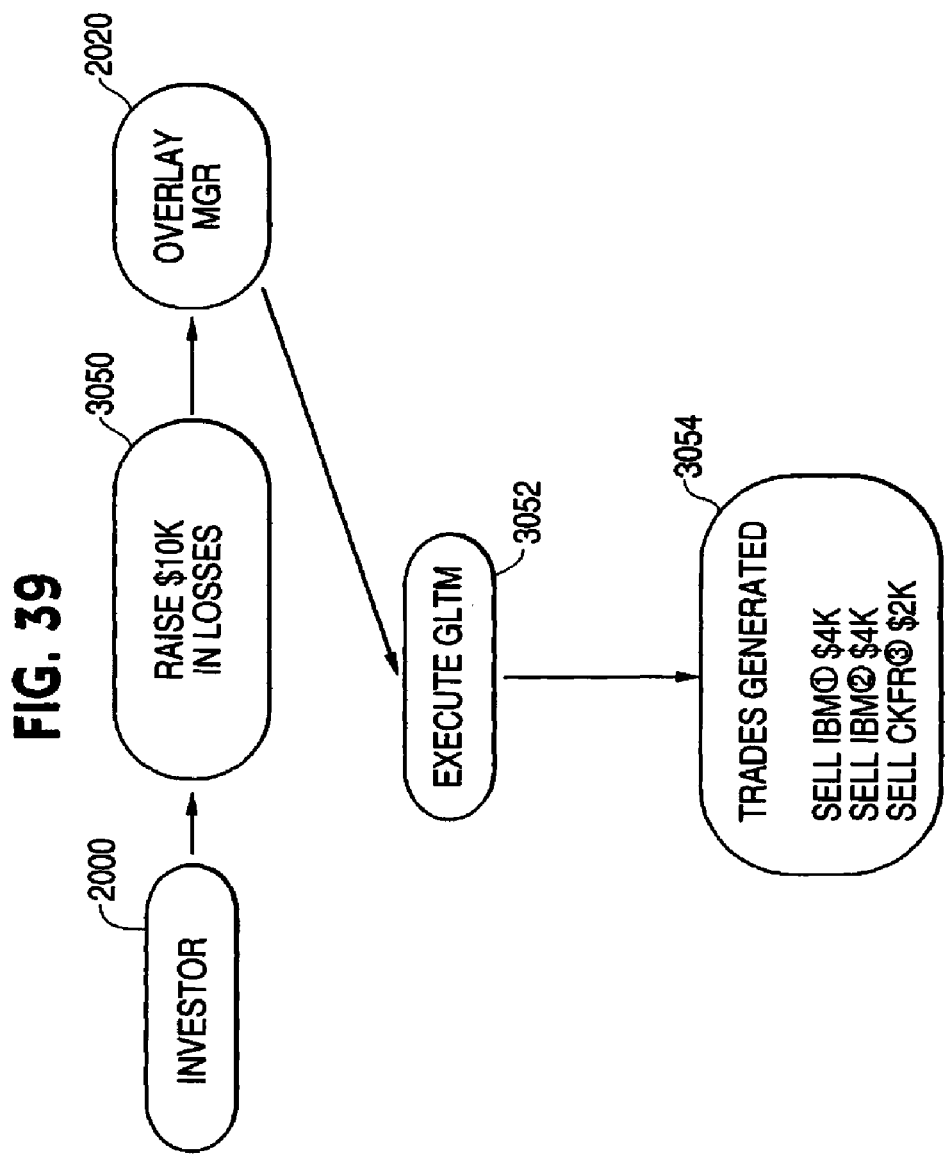
FIG. 39 depicts a practical example of the generation of loss trades in the stylized managed client investment account of FIGS. 33-35, in accordance with the present invention.
Figure 40:
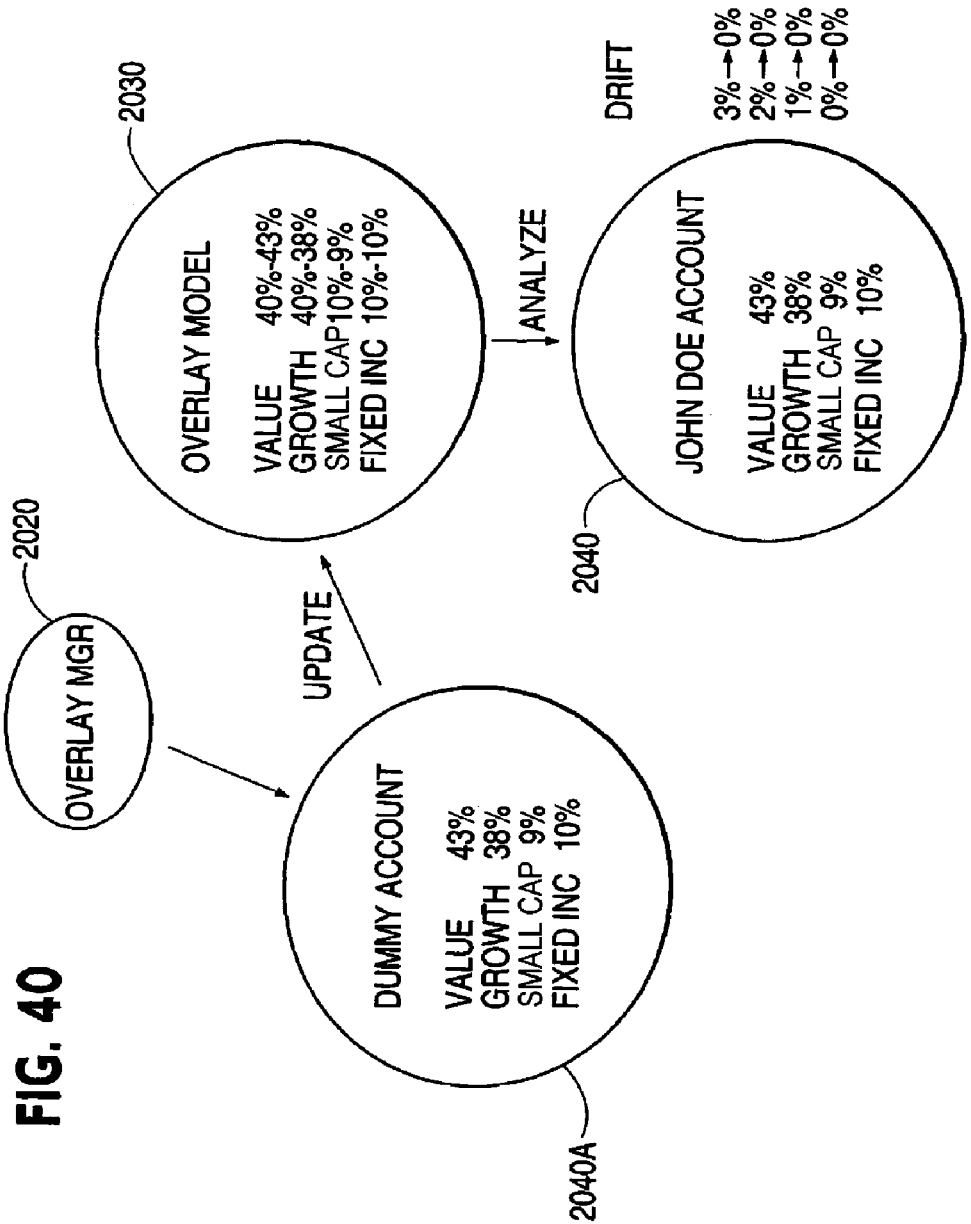
FIG. 40 depicts a practical example of a dynamic overlay model suitable for use in managing the stylized managed client investment account shown in FIGS. 33-35, in accordance with the present invention.

FIG. 39 illustrates a process performed by the MOM to perform a tax aware trade for investor John Doe. In this example, John Doe 2000 requests in step 3050, that $10,000 in losses be harvested from his multiple strategy portfolio account 2040, possibly to offset gains made elsewhere. The MOM representing the overlay manager 2020 uses, in step 3052, the gain/loss trade modeling tools, shown as the tax efficient trading function in FIG. 15, to determine how best to raise $10,000 in sales, while minimizing taxes for John Doe. The gain/loss trade modeling tool determines, in step 3054, the most efficient sales to harvest the losses. In this example it determines that a sale of $4,000 of IBM securities from ABC Val and $4,000 of IBM securities from ABC Grow, as well as $2,000 of CheckFree securities from ABC Sm is preferred, and tags each initiated trade order accordingly. The cash from the sales would remain in the individual buckets as shown in FIG. 34. This raises the cash balance for Value from $6,000 to $10,000, for Growth from $1,000 to $5,000, and for Small Cap from $5,000 to $7,000. FIG. 40 shows the process for using a dynamic overlay model in conjunction with John Doe's account 2040. The dynamic model will have a dummy account 2040A which is associated the overlay model 2030. As the current individual style allocated in the dummy account 2040A fluctuates, the current individual style allocation is used to update the overlay model 2030. So whereas John Doe's original overlay model 2040 included an allocation of 40-40-10-10, since the dummy account 2040A has moved to an asset allocation of 43-38-9-10, the MOM, either automatically or based on an instruction from the overlay manager 2020, updates the overlay model 2030 to have an asset allocation of 43-38-9-10.

Therefore when the MOM executes the automated drift process to analyze the drift in John Doe's account 2040, John Doe's account 2040 matches up perfectly with what is found in the updated overlay model 2030. This assumes that the John Doe account has had no custom transaction activity that would prevent such a match. Since no drift is found, there is no need to perform any trading in John Doe's account 2040. This reduces the costs to the money manager, the investor and the brokerage firm. FIGS. 33-35 therefore remain unchanged. No transactions occurred in John Doe's account 2040 and therefore there are no entries into the spreadsheet in FIGS. 33-35. FIGS. 30 and 30A are a more detailed depiction of the processing associated with the dynamic master overlay model 2030.

Figure 41:
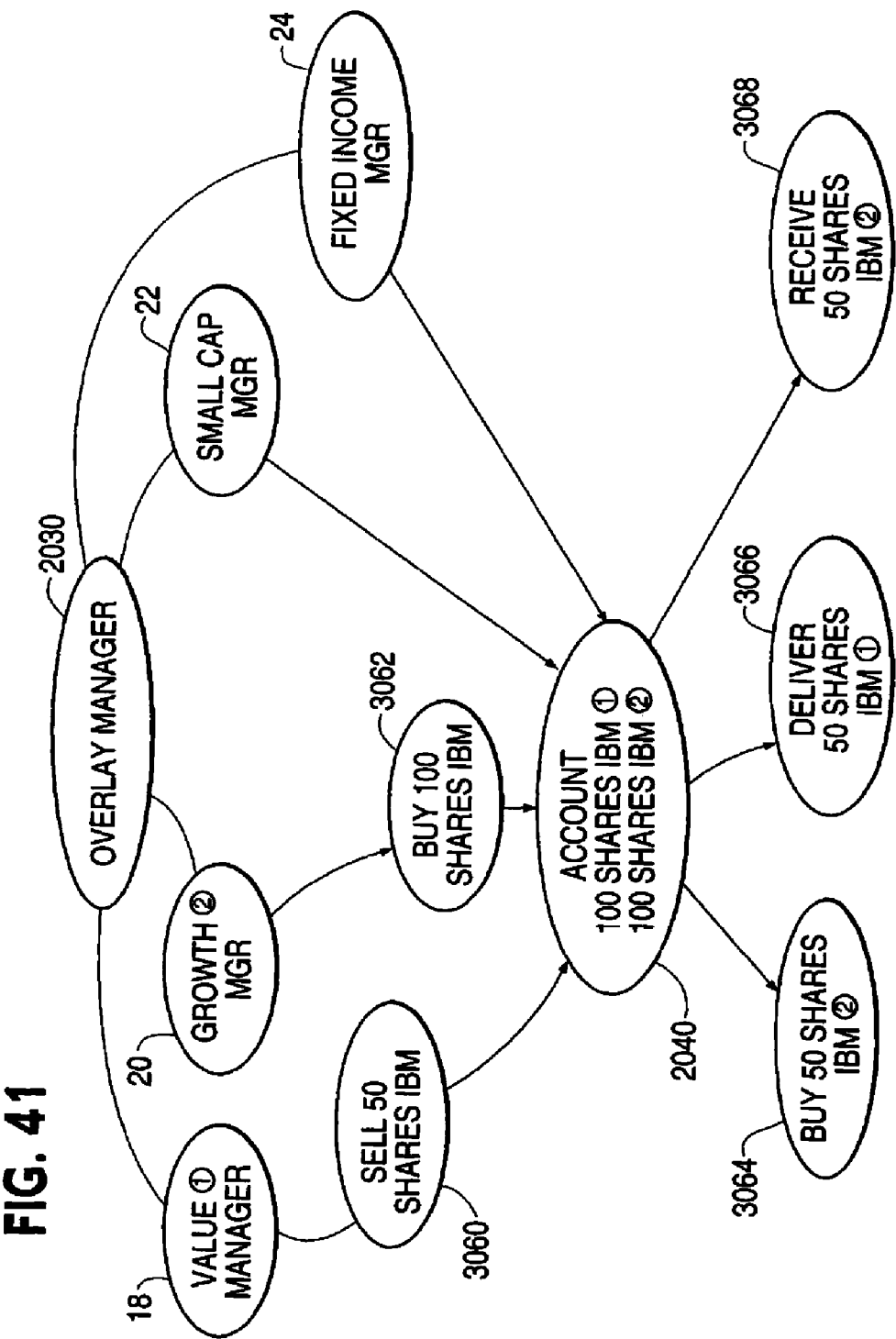
FIG. 41 depicts a practical example of the netting of transactions in the stylized managed client investment account shown in FIGS. 33-35, in accordance with the present invention.

FIG. 41 shows the process that would occur if, in John Doe's account 2040, two managers wished to buy and sell the same security at the same time. In this example, the value money manager 18 wishes to sell 50 shares of his IBM security lot while the Growth money manager 20 wishes to add on a 100 shares to his 100-share position of IBM securities. Conventionally, John Doe would be saddled with buying and selling the same securities, and performing two separate transactions. However, the MOM allows John Doe to make only one transaction and actually move the IBM shares between styles in the account 2040.

In this example, the Value manager's 50 share sell order directive for IBM, shown in step 3060, will be translated to deliver 50 shares of IBM from the Value style to the Growth style in the account 2040, as indicated in steps 3066 and 3068. The Growth manager, rather than buying the entire 100 shares will now be required to only buy 50 shares of IBM as indicated by step 3064. Fifty shares of IBM will be purchased with cash out of the ABC Grow, and 50 shares will be moved from Value to Growth. Both transactions will be tagged.

As the growth manager receives the 50 shares of IBM from value, the cash required to purchase the shares from Value will be transferred from Growth to Value and will be tagged appropriately as well. As illustrated in FIG. 35, the MOM will deliver $2,000 of IBM shares to Growth and receive $2,000 back from Growth. Meanwhile the MOM will essentially purchase $4,000 worth of IBM securities for Growth, $2,000 going towards straight purchase and $2,000 being moved from Growth to Value and being tagged accordingly.

Figure 42:
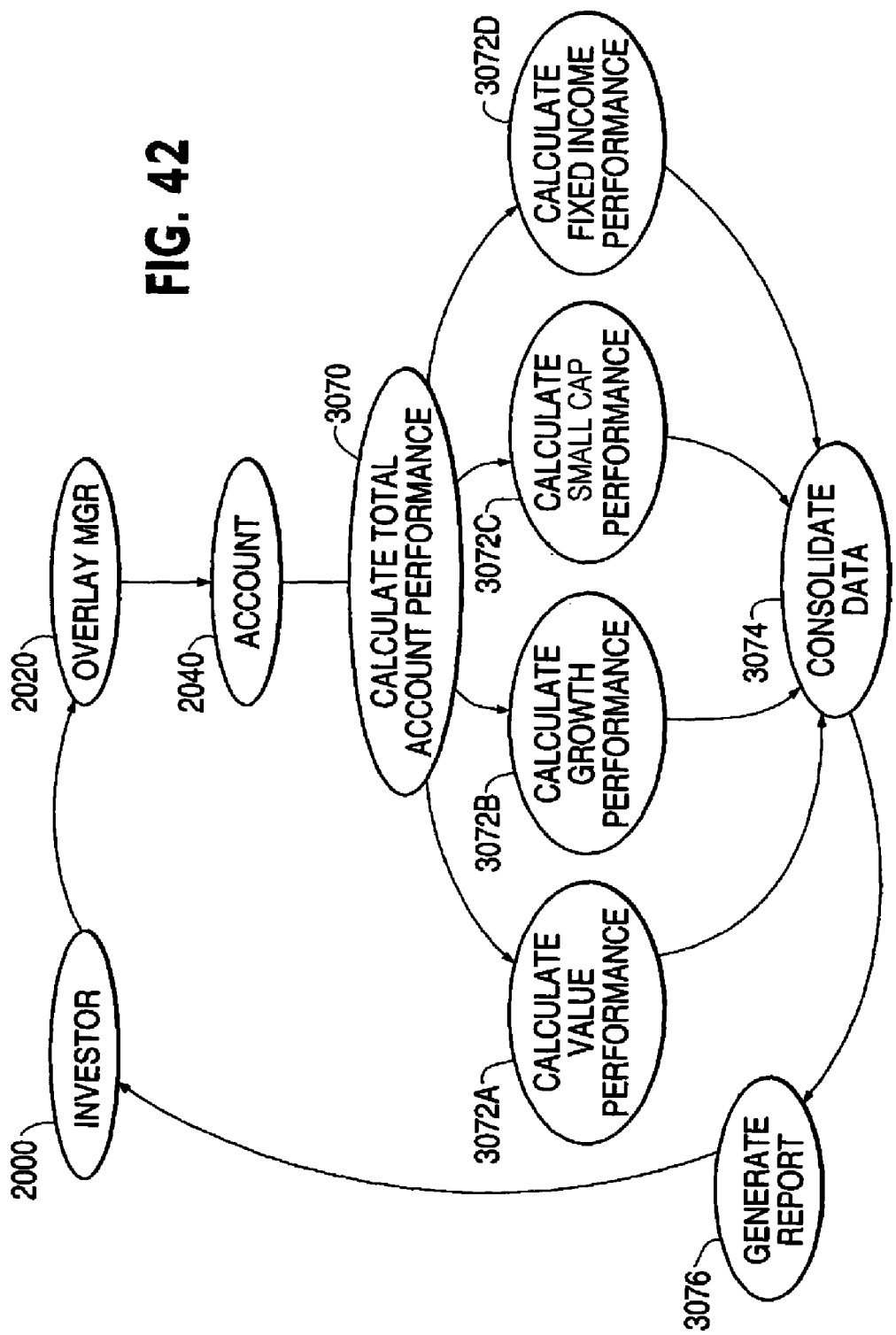
FIG. 42 depicts a practical example of the reporting of accurate performance information for the stylized managed client investment account of FIGS. 33-35, in accordance with the present invention.

FIG. 42 illustrates the reporting process for multiple strategy portfolio account 2040 of John Doe 2000. The overlay manager 2020, which manages the entire account, uses the MOM to calculate the total account performance in step 3070. The MOM then generates performance numbers for each of the four styles within the account 2040, i.e. Value, Growth, Small Cap and Fixed Income in steps 3072A-3072D. It is possible to generate accurate performance numbers for each of the individual styles because the transactions and cash are tagged. The performance for a particular style is calculated separately from other styles. Generally speaking, performance for a particular style is generated by calculating the performance for all positions and transactions associated with that style. Thus, if a security is held in more than one style, the individual tax lots and transactions associated with that security are broken up by style and added into the appropriate calculation. Also, cash transactions, including but not limited to flows in and out of a style, are included in the transactions mentioned above. As cash flows move in and out of each individual style, the tagging of the cash allows the proper tracking of the flows from each individual style. So the tagging of the flows between the styles within the account 2040, actually allow for the accurate performance calculations. Once the performance numbers for the total account and the individual styles are generated they can be consolidated in step 3074, and used to produce a performance and holdings report for the investor in step 3076. The report is then forwarded to the investor in one consolidated statement. Such generation and forwarding of reports can be performed on either an ad hoc basis, driven by the overlay manager 2020, or on a periodic basis automatically by the MOM.

Figure 43:
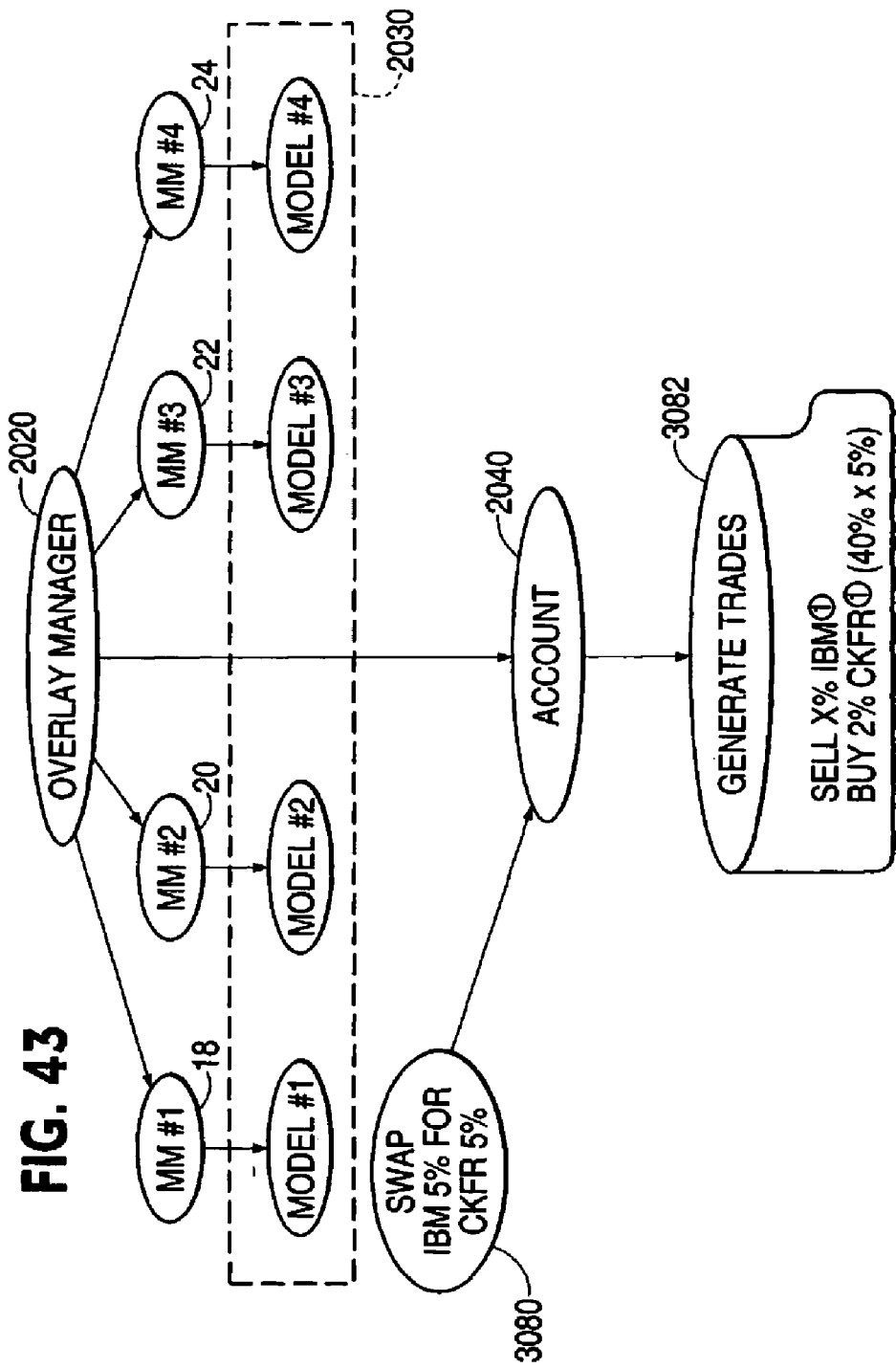
FIG. 43 depicts a practical example of a security swap within the stylized manager client investment account shown in FIGS. 33-35, in accordance with the present invention.

As depicted in FIG. 43, the overlay manager 2020 can use the swap tool, which is shown as the cross style swap function in FIG. 15, to enact trades on John Doe's account 2040. The swap tool was previously discussed with reference to FIGS. 22 and 22A. One of the money managers 18-24 for John Doe's account 2040 enters a swap in his portion of the overlay model 2030. The swap is a one-for-one target swap of 5% of IBM securities for 5% of CheckFree securities, as indicated by request 3080. However, since the money manager does not know the overlay model level of IBM securities in John Doe's account 2040, he enters via an MMPMS, such as MMPMS 1036 of FIG. 14, the appropriate percentage in his portion of the overlay model 2030. If this portion of the overlay model 2030 makes up 40% of the entire overlay model, 5% is entered, since 5% of 40% is 2%.

Once the money manager has entered the swap, he contacts the overlay manager 2020 to enact the swap. The overlay manager, via the MOM, executes the swap tool, requesting the target swap of IBM for CheckFree. The MOM, executing the swap tool, will sell down the amount of IBM held in John Doe's account 2040, as shown in step 3082.

The level of IBM securities that John Doe is presently holding is irrelevant, because the swap tool is producing a target swap and thus is most concerned with the ending level, which is the 2% level of CheckFree. The swap tool then generates a trade block that contains a sell of IBM securities and a buy of 2% of John Doe's account for CheckFree securities, as indicated in step 3082.

Figure 44:
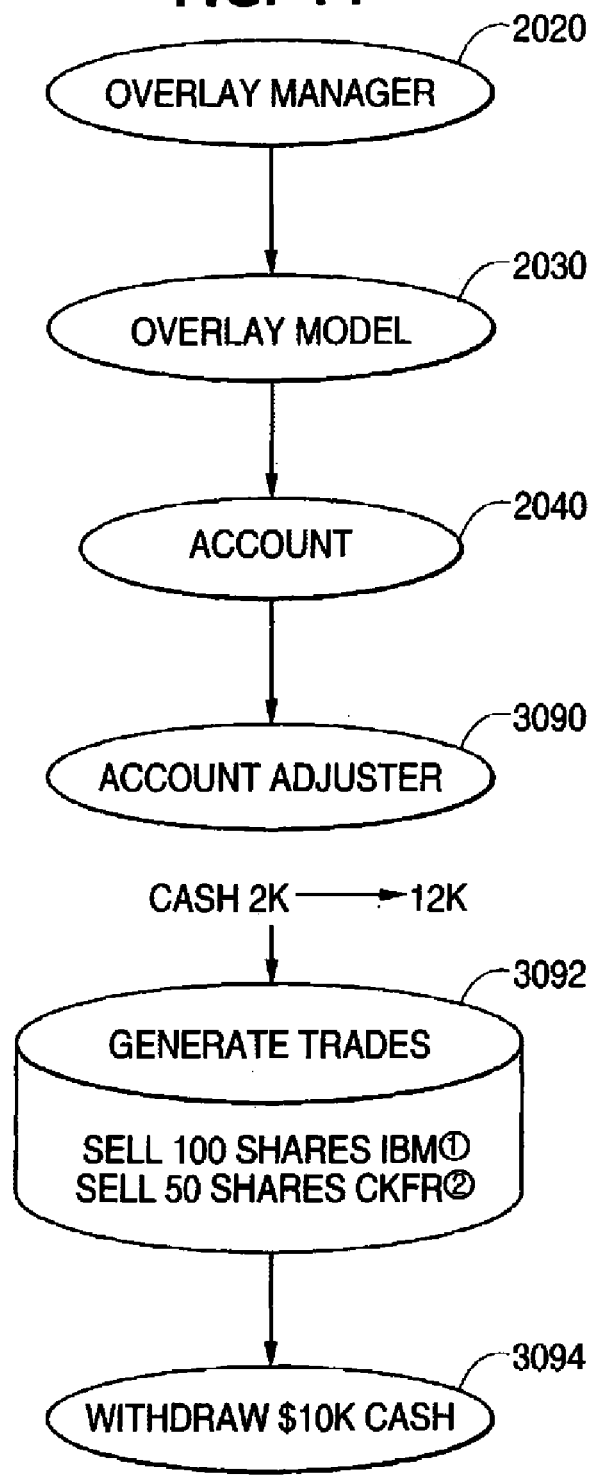
FIG. 44 depicts a practical example of the initiation of trades to adjust the stylized managed client investment account shown in FIGS. 33-35, in accordance with the present invention.

As shown in FIG. 44, the overlay manager 2020, via the MOM, can execute the account adjuster tool, which is discussed with reference to FIG. 25, to make custom adjustments to John Doe's account 2040. For example, if John Doe wishes to withdraw $10,000 from his account 2040, there are a number of options to accomplish this. The overlay manager 2020 first selects the technique to be used to generate trades. Trades can be prorated across the account, meaning that sales used to raise cash will be generated in proportion to the positions found, e.g. 10 shares from a 100 share position, 5 shares from a 50 share position, etc. Another option is to request that as few trades as possible be generated. Also, trades can be generated evenly across all positions, e.g. 8 shares from 100-share position, 8 shares from 50-share position, etc. Once the technique is selected, the overlay manager 2020 identifies the amount of cash to be withdrawn from the cash balance shown for John Doe's account 2040—in this case it would be $10,000. Therefore, if John Doe has $2,000 available prior to any transactions being performed, the overlay manager 2020 would change this to $12,000. This indicates to the adjuster 3090 that John Doe wishes to raise his cash balance so that excess cash can be withdrawn.

After the overlay manager 2020 enters this information, the MOM recalculates the security positions, and the account adjuster 3090 calculates the sales, such as 100 shares of IBM securities from model #1 and 50 shares of CheckFree securities from model #2, to generate, in step 3092, the trade orders to obtain the excess cash based on the technique chosen by the overlay manager 2020 above. The overlay manager 2020 would then withdraw the cash in step 3094.

Figure 45:
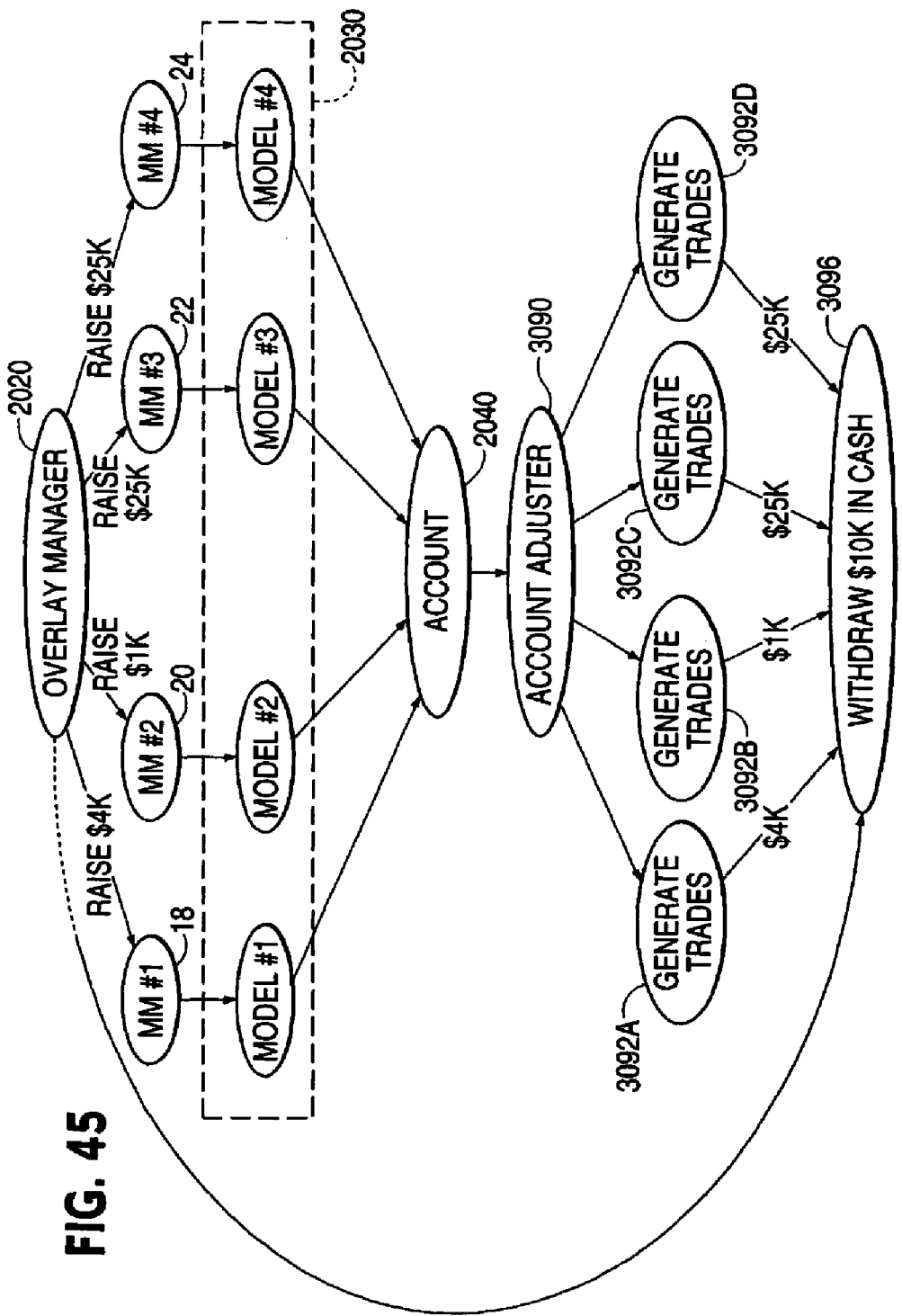
FIG. 45 depicts another practical example of the generation of trade to adjust the stylized manager client investment account shown in FIGS. 33-35, in accordance with the present invention.

The individual managers have the ability to raise cash within their respective portions of the account 2040 as well. This is shown in FIG. 45. The difference is that the money managers cannot access the entire account. To raise cash, the overlay manager 2020 must provide instructions to each money manager with the amount of cash to raise. Each money manager must then execute the account adjuster 3090 to generate trade orders to raise a particular amount of cash in steps 3092A-3092D.

For example, money manager 18 could raise $4,000, money manager 20 could raise $1,000, and money managers 22 and 24 could each raise $2,500. The overlay manager in step 3096 then withdraws the cash.

FIG. 46 shows how a wash sale can be prevented in John Doe's account 2040. If money manager 18 sells down his holdings of IBM securities on December 1 at a loss, IBM securities cannot be bought back within the next 31 days without creating a wash sale violation. Under current U.S. law, a wash sale violation will prevent John Doe from writing off the loss in the sale of IBM securities against gains for tax purposes. So when money manager 18 sells down IBM securities, the MOM places a restriction on the account 2040 to not buy back IBM securities until January 1 as indicated by step 3099. If money manager 20 attempts to buy IBM securities on December 31, a message is generated indicating that the purchase of IBM securities is restricted, and no trade order is generated by the MOM, as indicated in step 3098. On January 1, money manager 20 can purchase IBM securities without any tax consequences and the trade order will be initiated by the MOM, as indicated in step 3096.

It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

The invention claimed is:

1. A method, comprising:
    receiving a request for a withdrawal of an amount of cash from a single investment account comprising a plurality of investment styles, including a first investment style and a second investment style, wherein each investment style includes a respective plurality of assets, including a respective cash bucket for holding any cash, wherein the investment account is managed with a model that specifies an asset allocation across the plurality of investment styles, wherein the first investment style is overweighted with respect to the model;
    subsequent to receiving the request, instructing the first investment style to raise a desired amount of cash, wherein one or more trades of one or more securities are generated for the first investment style to raise the desired amount of cash for the respective cash bucket of the first investment style; and
    automatically performing in accordance with the received request, withdrawal collection of the requested amount of cash from the investment account by first performing withdrawal of cash from the respective cash bucket of the overweighted first investment style to reduce the overweighting with respect to the model, and then performing respective withdrawals of cash from at least the respective cash buckets of the first investment style and the second investment style, wherein a respective amount of cash withdrawn from the respective cash buckets of the first investment style and the second investment style is based upon the model that specifies the asset allocation across the plurality of investment styles,
    wherein the prior steps are performed by one or more computers associated with a portfolio management system.

2. The method of claim 1, wherein the asset allocation comprises a model cash allocation and a model asset allocation, and wherein the withdrawal collection is performed in accordance with the model cash allocation or the model asset allocation.

3. A system, comprising:
    a database configured to store information associated with at least a single investment account comprising a plurality of investment styles, including a first investment style and a second investment style, wherein each investment style includes a respective plurality of assets, including a respective cash bucket for holding any cash, wherein the investment account is managed with a model that specifies an asset allocation across the plurality of investment styles, wherein the first investment style is overweighted with respect to the model; and
    a processor configured to access the database and configured to:
        receive a request for a withdrawal of an amount of cash from the investment account, instruct, subsequent to receiving the request, the first investment style to raise a desired amount of cash, wherein one or more trades of one or more securities are generated for the first investment style to raise the desired amount of cash for the respective cash bucket of the first investment style, and
        automatically perform, based on the request, withdrawal collection of the requested amount of cash from the investment account by first performing withdrawal of the first asset cash from the respective cash bucket of the overweighted first investment style to reduce the overweighting with respect to the model, and then performing respective withdrawals of cash from at least the respective cash buckets of the first investment style and the second investment style, wherein a respective amount of cash withdrawn from the first investment style and the second investment style is based upon the model that specifies the asset allocation across the plurality of investment styles.

4. The system of claim 3, wherein the asset allocation comprises a model cash allocation and a model asset allocation, and wherein the withdrawal collection is performed by the processor in accordance with the model cash allocation or the model asset allocation.

5. A system, comprising:
    means for receiving a request for a withdrawal of an amount of a first asset cash from a single investment account comprising a plurality of investment styles, including a first investment style and a second investment style, wherein each investment style includes a respective plurality of assets, including a respective cash bucket for holding any cash, wherein the investment account is managed with a model that specifies an asset allocation across the plurality of investment styles, wherein the first investment style is overweighted with respect to the model;
    means for instructing, subsequent to receiving the request, the first investment style to raise a desired amount of cash, wherein one or more trades of one or more securities are generated for the first investment style to raise the desired amount of cash for the respective cash bucket of the first investment style; and
    means for automatically performing, in accordance with the received request, withdrawal collection of the requested amount of cash from the investment account by first performing withdrawal of cash from the respective cash bucket of the overweighted first investment style to reduce the overweighting with respect to the model, and then performing respective withdrawals of cash from at least the respective cash buckets of the first investment style and the second investment style, wherein a respective amount of cash withdrawn from the respective cash buckets of the first investment style and the second investment style is based upon the model that specifies the asset allocation across the plurality of investment styles.

6. The method of claim 1, wherein the model is a first model, wherein the asset allocation is a first asset allocation, wherein the first investment style is associated with a second model that specifies a second asset allocation within the first investment style, and wherein prior to automatically performing withdrawal collection, the method further comprises:
    rebalancing one or more securities within the first investment style according to the second model,
    wherein the prior step is performed by one or more computers associated with the portfolio management system.

7. The method of claim 1, wherein the model specifies proportions of cash across at least the first investment style and the second investment style, and wherein the respective amount of cash withdrawn from the first investment style and the second investment style is based upon the proportions specified by the model.

8. The system of claim 3, wherein the model is a first model, wherein the asset allocation is a first asset allocation, wherein the first investment style is associated with a second model that specifies a second asset allocation within the first investment style, and wherein prior to automatically performing withdrawal collection, the processor is further configured to:

rebalance one or more securities within the first investment style according to the second model.

9. The system of claim 3, wherein the model specifies proportions of cash across at least the first investment style and the second investment style, and wherein the respective amount of cash withdrawn from the first investment style and the second investment style is based upon the proportions specified by the model.

10. The system of claim 5, wherein the asset allocation comprises a model cash allocation and a model asset allocation, and wherein the withdrawal collection is performed in accordance with the model cash allocation or the model asset allocation.

11. The system of claim 5, wherein the model is a first model, wherein the asset allocation is a first asset allocation, wherein the first investment style is associated with a second model that specifies a second asset allocation within the first investment style and wherein prior to automatically performing withdrawal collection, one or more securities within the first investment style are rebalanced according to the second model.

12. The system of claim 5, wherein the model specifies proportions of cash across at least the first investment style and the second investment style, and wherein the respective amount of cash withdrawn from the first investment style and the second investment style is based upon the proportions specified by the model.

13. The method of claim 1, wherein the request for the withdrawal is received from an overlay manager or investor associated with the single investment account.

14. The method of claim 1, wherein each of the plurality of investment styles is managed by a respective money manager.

15. The method of claim 6, wherein the generated one or more trades are associated with rebalancing the one or more securities.

16. The system of claim 3, wherein the request for the withdrawal is received from an overlay manager or investor associated with the single investment account.

17. The system of claim 3, wherein each of the plurality of investment styles is managed by a respective money manager.

18. The system of claim 8, wherein the generated one or more trades are associated with rebalancing the one or more securities.

19. The system of claim 5, wherein the request for the withdrawal is received from an overlay manager or investor associated with the single investment account.

20. The system of claim 11, wherein the generated one or more trades are associated with rebalancing the one or more securities.

* * * * *